US012452398B2

(12) United States Patent
Momonoi et al.

(10) Patent No.: US 12,452,398 B2
(45) Date of Patent: Oct. 21, 2025

(54) STEREOSCOPIC DISPLAY APPARATUS AND STEREOSCOPIC DISPLAY METHOD

(71) Applicant: Samsung Electronics Co., Ltd., Suwon-si (KR)

(72) Inventors: Yoshiharu Momonoi, Kanagawa (JP); Keisuke Ozawa, Kanagawa (JP); Takayuki Sasaoka, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 18/495,311

(22) Filed: Oct. 26, 2023

(65) Prior Publication Data

US 2024/0114122 A1    Apr. 4, 2024

Related U.S. Application Data

(63) Continuation of application No. PCT/KR2023/013157, filed on Sep. 4, 2023.

(30) Foreign Application Priority Data

Sep. 26, 2022  (JP) .................................. 2022-152079
May 29, 2023  (JP) .................................. 2023-087913

(51) Int. Cl.
*H04N 13/305*     (2018.01)
*H04N 13/32*      (2018.01)
(Continued)

(52) U.S. Cl.
CPC .......... *H04N 13/305* (2018.05); *H04N 13/32* (2018.05); *H04N 13/351* (2018.05); *H04N 13/398* (2018.05)

(58) Field of Classification Search
CPC .... H04N 13/305; H04N 13/32; H04N 13/351; H04N 13/398; H04N 13/307;
(Continued)

(56) References Cited

U.S. PATENT DOCUMENTS 3,834,785 A * 9/1974 Kimura ................... G03H 1/22
                                                        359/33
6,061,179 A * 5/2000 Inoguchi ................ H04N 13/32
                                                        348/E13.028
(Continued)

FOREIGN PATENT DOCUMENTS

JP      2003-140083 A    5/2003
JP      2010-127973 A    6/2010
(Continued)

OTHER PUBLICATIONS

International Search Report dated Dec. 14, 2023, issued in International Patent Application No. PCT/KR2023/013157.
(Continued)

*Primary Examiner* — Tung T Vo
(74) *Attorney, Agent, or Firm* — Jefferson IP Law, LLP

(57) ABSTRACT

The disclosure is to optimize and display a clear stereoscopic image while securing a depth. A stereoscopic display apparatus is provided. The stereoscopic display apparatus includes a display, a display driver configured to display an elemental image of a stereoscopic image on the display, a light source controller including a first lens array positioned on a rear surface of the display and including a plurality of first cylinder lenses arranged at a preset pitch, a second lens array positioned on a rear surface of the first lens array and including a plurality of second cylinder lenses arranged at a pitch that is wider than the pitch of the first cylinder lenses, a plurality of light sources positioned on rear surfaces of the second cylinder lenses, and a diffusion sheet positioned between the display and the first lens array and positioned at a position including a focal point of each first cylinder lens, and a light source driver configured to drive a line light source illuminating the elemental image.

20 Claims, 53 Drawing Sheets

(51) Int. Cl.
  *H04N 13/351* (2018.01)
  *H04N 13/398* (2018.01)
(58) Field of Classification Search
  CPC ...... H04N 13/322; H04N 13/354; G02B 3/00;
       G02B 3/06; G02B 5/02; G02B 30/27
  USPC .......................................................... 348/51
  See application file for complete search history.

(56) References Cited

U.S. PATENT DOCUMENTS

| | | | | |
|---|---|---|---|---|
| 6,101,031 | A * | 8/2000 | Yoshimura | G03B 21/625 359/456 |
| 6,113,251 | A * | 9/2000 | Miyata | G03B 21/625 362/333 |
| 6,304,288 | B1 * | 10/2001 | Hamagishi | H04N 13/346 348/E13.05 |
| 6,533,420 | B1 * | 3/2003 | Eichenlaub | H04N 13/349 348/E13.043 |
| 6,940,646 | B2 * | 9/2005 | Taniguchi | H04N 13/31 359/464 |
| 8,111,353 | B2 * | 2/2012 | Ogasawara | G02B 3/0056 359/619 |
| 8,408,775 | B1 * | 4/2013 | Coleman | G02F 1/133526 362/616 |
| 9,784,983 | B1 | 10/2017 | Zha | |
| 9,915,773 | B1 * | 3/2018 | Huang | G02B 6/005 |
| 10,854,146 | B1 * | 12/2020 | Chen | G02B 30/24 |
| 11,126,008 | B2 | 9/2021 | Momonoi | |
| 11,415,793 | B2 * | 8/2022 | Clarke | G09G 5/14 |
| 11,483,546 | B2 | 10/2022 | Kroon et al. | |
| 11,619,767 | B2 | 4/2023 | Lo et al. | |
| 2002/0012166 | A1 * | 1/2002 | Nakamura | G03B 21/625 359/460 |
| 2002/0118452 | A1 * | 8/2002 | Taniguchi | H04N 13/31 348/E13.059 |
| 2003/0169332 | A1 * | 9/2003 | Ebina | G02B 3/0056 348/59 |
| 2004/0240777 | A1 * | 12/2004 | Woodgate | H04N 13/398 385/11 |
| 2005/0078370 | A1 * | 4/2005 | Nishihara | G02B 30/27 359/464 |
| 2005/0099688 | A1 * | 5/2005 | Uehara | G02B 30/30 359/462 |
| 2006/0012676 | A1 * | 1/2006 | Tomita | H04N 13/302 348/51 |
| 2006/0227418 | A1 | 10/2006 | Takaki | |
| 2007/0019067 | A1 * | 1/2007 | Tsubaki | H04N 13/305 348/E13.043 |
| 2007/0165164 | A1 * | 7/2007 | Sugiyama | G02F 1/133528 349/117 |
| 2007/0165304 | A1 * | 7/2007 | Tomita | G02B 30/26 348/42 |
| 2007/0223232 | A1 * | 9/2007 | Hwang | F21V 5/02 362/330 |
| 2008/0252720 | A1 * | 10/2008 | Kim | H04N 13/359 348/59 |
| 2009/0002818 | A1 * | 1/2009 | Iwabu | G02B 3/0068 359/457 |
| 2009/0244682 | A1 * | 10/2009 | Saishu | H04N 13/305 359/463 |
| 2010/0091354 | A1 * | 4/2010 | Nam | G02B 30/27 359/298 |
| 2010/0097449 | A1 * | 4/2010 | Jeong | H04N 13/32 348/E13.001 |
| 2010/0165221 | A1 * | 7/2010 | Krijn | H04N 13/305 359/465 |
| 2012/0320288 | A1 * | 12/2012 | Baek | G02B 30/27 349/200 |
| 2012/0327076 | A1 * | 12/2012 | Yang | H04N 13/359 345/419 |
| 2013/0003176 | A1 * | 1/2013 | Yang | H04N 13/32 359/464 |
| 2013/0082999 | A1 * | 4/2013 | Ahn | H04N 13/398 345/212 |
| 2013/0127816 | A1 * | 5/2013 | Hwang | H04N 13/324 345/212 |
| 2013/0155377 | A1 | 6/2013 | Huang | |
| 2013/0169704 | A1 * | 7/2013 | Tanaka | G02B 30/27 345/691 |
| 2013/0181968 | A1 * | 7/2013 | Uemura | G02B 30/31 345/212 |
| 2014/0078194 | A1 * | 3/2014 | An | H04N 13/31 345/691 |
| 2014/0118825 | A1 * | 5/2014 | Shikii | G02B 30/35 359/464 |
| 2014/0160563 | A1 * | 6/2014 | Hasegawa | G02B 30/27 359/463 |
| 2014/0267639 | A1 * | 9/2014 | Tatsuta | H04N 13/305 348/59 |
| 2014/0267955 | A1 * | 9/2014 | Hibayashi | G02F 1/133514 349/12 |
| 2015/0035873 | A1 * | 2/2015 | Shima | G09G 3/3413 345/690 |
| 2015/0189261 | A1 * | 7/2015 | Kaneko | H04N 13/337 348/57 |
| 2016/0211397 | A1 * | 7/2016 | Kerzabi | H10F 71/00 |
| 2016/0234487 | A1 | 8/2016 | Kroon et al. | |
| 2016/0353092 | A1 * | 12/2016 | Bruder | H04N 13/32 |
| 2017/0276953 | A1 * | 9/2017 | Huang | G02B 3/005 |
| 2018/0115771 | A1 * | 4/2018 | Kwon | H04N 13/317 |
| 2018/0306957 | A1 * | 10/2018 | Huang | H04N 13/305 |
| 2019/0182476 | A1 * | 6/2019 | Kikuchi | H04N 13/398 |
| 2019/0387220 | A1 * | 12/2019 | Osmanis | G06T 3/4038 |
| 2020/0073170 | A1 * | 3/2020 | Blum | G02B 3/0056 |
| 2020/0084434 | A1 | 3/2020 | Koerber et al. | |
| 2020/0174279 | A1 | 6/2020 | Ishihara et al. | |
| 2023/0336705 | A1 * | 10/2023 | Ha | G02B 30/27 |
| 2023/0393413 | A1 * | 12/2023 | Huh | G02F 1/133526 |
| 2024/0012181 | A1 * | 1/2024 | Raymond | B42D 25/425 |
| 2024/0036349 | A1 * | 2/2024 | Hwang | H04N 13/305 |
| 2024/0282895 | A1 * | 8/2024 | Kimura | H10H 20/855 |
| 2024/0369851 | A1 * | 11/2024 | Momonoi | G09G 3/003 |

FOREIGN PATENT DOCUMENTS

| | | |
|---|---|---|
| JP | 2014-112147 A | 6/2014 |
| JP | 5760428 B2 | 8/2015 |
| JP | 2017-078776 A | 4/2017 |
| JP | 2019-086710 A | 6/2019 |
| JP | 6791058 B2 | 11/2020 |
| JP | 2023-143631 A | 10/2023 |
| KR | 10-2013-0132062 A | 12/2013 |
| KR | 10-2014-0087434 A | 7/2014 |
| KR | 10-2016-0017172 A | 2/2016 |
| KR | 10-2016-0027166 A | 3/2016 |
| KR | 10-2020-0104796 A | 9/2020 |
| WO | 2021/178397 A1 | 9/2021 |

OTHER PUBLICATIONS

Liu et al., Time-multiplexed light field display with 120-degree wide viewing angle, vol. 27, No. 24 / 25, Nov. 2019, Optics Express 35728.

Extended European Search Report dated Jun. 24, 2025, issued in European Application No. 23872833.1-1207.

* cited by examiner

STEREOSCOPIC DISPLAY APPARATUS AND STEREOSCOPIC DISPLAY METHOD

CROSS-REFERENCE TO RELATED APPLICATION(S)

This application is a continuation application, claiming priority under § 365(c), of an International application No. PCT/KR2023/013157, filed on Sep. 4, 2023, which is based on and claims the benefit of a Japanese patent application number 2022-152079, filed on Sep. 26, 2022, in the Japanese Intellectual Property Office, and of a Japanese patent application number 2023-087913, filed on May 29, 2023, in the Japanese Intellectual Property Office, the disclosure of each of which is incorporated by reference herein in its entirety.

BACKGROUND

1. Field

The disclosure relates to a stereoscopic display apparatus and a stereoscopic display method.

2. Description of Related Art

Technology (for example, see Patent Document 1) for displaying stereoscopic images has been proposed for a long time, and particularly, light field technology (for example, see non-patent document 1) is attracting attention as technology for displaying stereoscopic images.

The above information is presented as background information only to assist with an understanding of the disclosure. No determination has been made, and no assertion is made, as to whether any of the above might be applicable as prior art with regard to the disclosure.

PRIOR ART DOCUMENT

[Patent Document 1] Japanese Patent No. 5760428
[Patent Document 2] Japanese Patent No. 6791058
[Non-Patent Document 1] Boyang Liu, Xinzhu Sang, Xunbo Yu, Xin Gao, Li Liu, Chao Gao, Peiren Wang, Yang Le, and Jingyan Du, "Time-multiplexed light field display with 120-degree wide viewing angle," Opt. Express (2019) 27, 35728-35739

SUMMARY

However, the light field technology has a theoretic limit to resolutions. Accordingly, a three-dimensional (3D) display for securing a depth or breadth while improving a resolution is required.

Aspects of the disclosure are to address at least the above-mentioned problems and/or disadvantages and to provide at least the advantages described below. Accordingly, an aspect of the disclosure is to provide a stereoscopic display apparatus and a stereoscopic display method for appropriately displaying a clearer three-dimensional image while securing a depth.

Additional aspects will be set forth in part in the description which follows and, in part, will be apparent from the description, or may be learned by practice of the presented embodiments.

In accordance with an aspect of the disclosure, a stereoscopic display apparatus is provided. The stereoscopic display apparatus includes a display, a display driver configured to display an elemental image (element image) of a stereoscopic image on the display, a light source controller including a first lens array positioned on a rear surface of the display and including a plurality of first cylinder lenses arranged at a preset pitch, a second lens array positioned on a rear surface of the first lens array and including a plurality of second cylinder lenses arranged at a pitch that is wider than the pitch of the first cylinder lenses, a plurality of light sources positioned on a rear surface of each second cylinder lens, and a diffusion sheet positioned between the display and the first lens array and positioned at a position including a focal point of each first cylinder lens, and a light source driver configured to drive the plurality of light sources illuminating the elemental image.

In accordance with another aspect of the disclosure, a stereoscopic display method performed by a stereoscopic display apparatus is provided. The stereoscopic display method includes a display, a display driver configured to display an elemental image of a stereoscopic image on the display, a light source controller including a first lens array positioned on a rear surface of the display and including a plurality of first cylinder lenses arranged at a preset pitch, a second lens array positioned on a rear surface of the first lens array and including a plurality of second cylinder lenses arranged at a pitch that is wider than the pitch of the first cylinder lenses, a plurality of light sources positioned on a rear surface of each second cylinder lens, and a diffusion sheet positioned between the display and the first lens array and positioned at a position including a focal point of each first cylinder lens, and a light source driver configured to drive the plurality of light sources illuminating the elemental image, the method includes displaying a plurality of elemental images on the display, and sequentially driving the plurality of light sources.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings in which.

Throughout the drawings, like reference numerals will be understood to refer to like parts, components, and structures.

DETAILED DESCRIPTION

Figure 1:
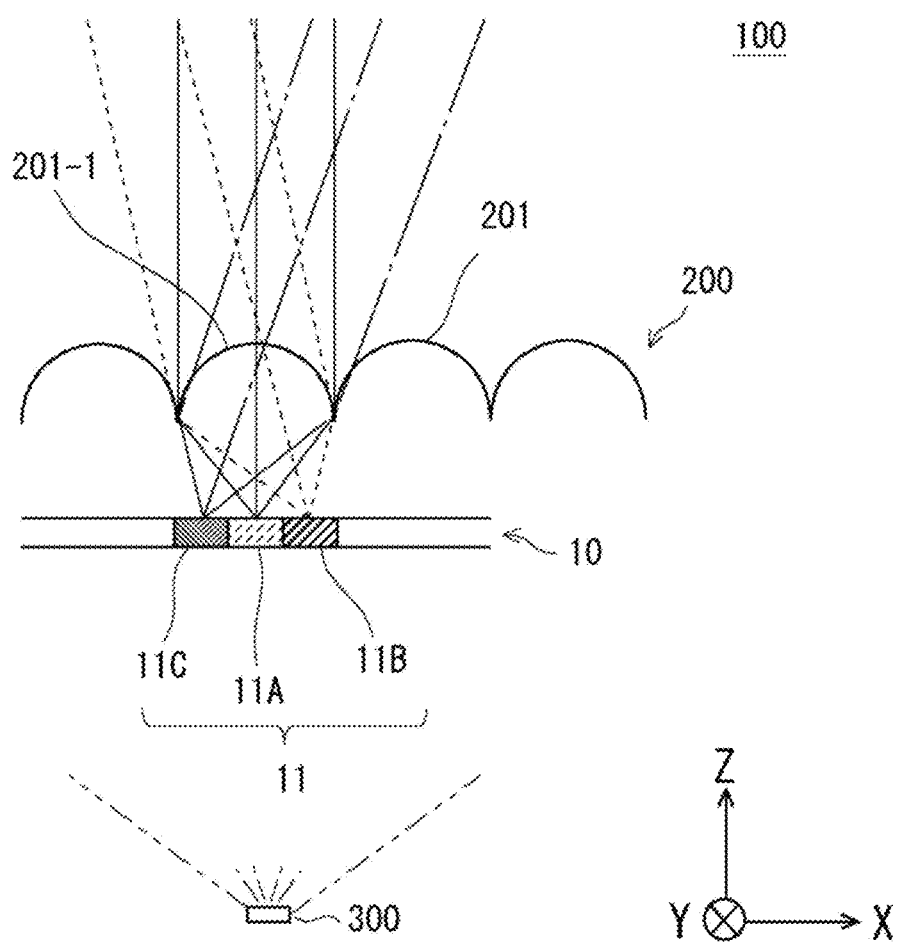
FIG. 1 is a view illustrating a display principle of a related stereoscopic display apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

<Preliminary Examination by the Inventor>

Technology (hereinafter, referred to as stereoscopic display technology) for displaying stereoscopic images has been proposed for a long time. The stereoscopic display technology is classified into a method using glasses and a method using no glasses.

It is known that the method using the glasses has issues, such as the inconvenience of wearing the glasses or the occurrence of distortion depending on a viewing position.

The method using no glasses includes a horizontal parallax method and a method that obtains both horizontal and vertical parallax. Patent Document 1 mentioned above discloses technology of time-division transferring light from a backlight source to the left and right eyes by switching a backlight optical system shutter in which a shutter, a prism, a lenticular sheet, or the like, are combined. Accordingly, a high-definition and three-dimensional display using no glasses is possible. However, light efficiency is reduced due to the use of the shutter and natural motion parallax may not be obtained in a wide range.

Hereinafter, specific issues of a stereoscopic display apparatus for realizing a three-dimensional display without glasses will be described with reference to FIGS. 1 to 6.

In the following description, a direction (depth direction) being perpendicular to a main surface of a display of the stereoscopic display apparatus is referred to as a Z-axis direction, a direction being parallel to the main surface of the display and being a left-right direction of a screen is referred to as a X-axis direction, and a direction being parallel to the main surface of the display and being an up-down direction (also referred to as a vertical scanning direction) of the screen is referred to as a Y-axis direction.

Figure 2:
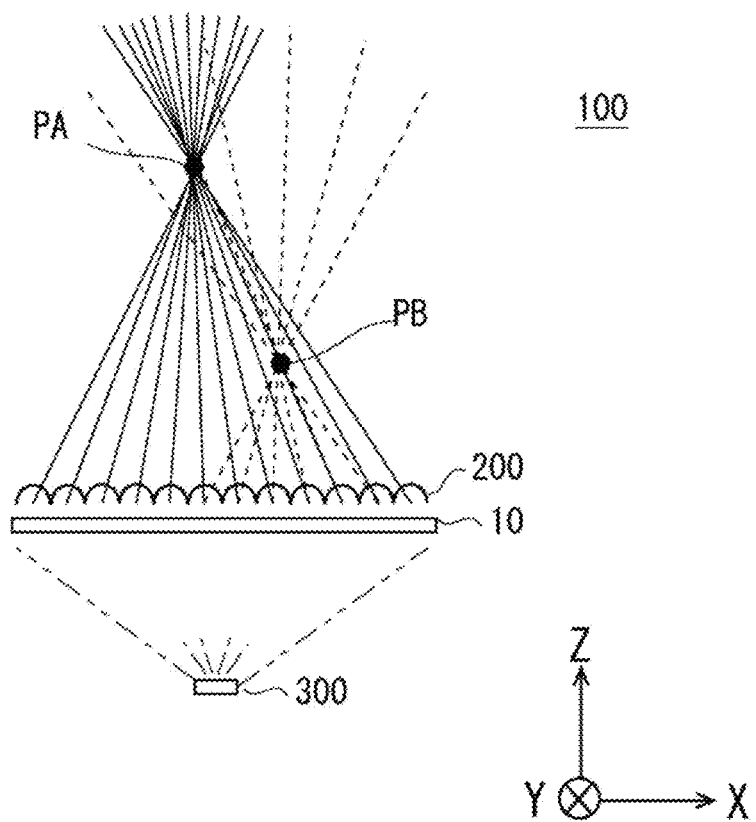
FIG. 2 is a view illustrating a display principle of a related stereoscopic display apparatus according to an embodiment of the disclosure.
Figure 3:
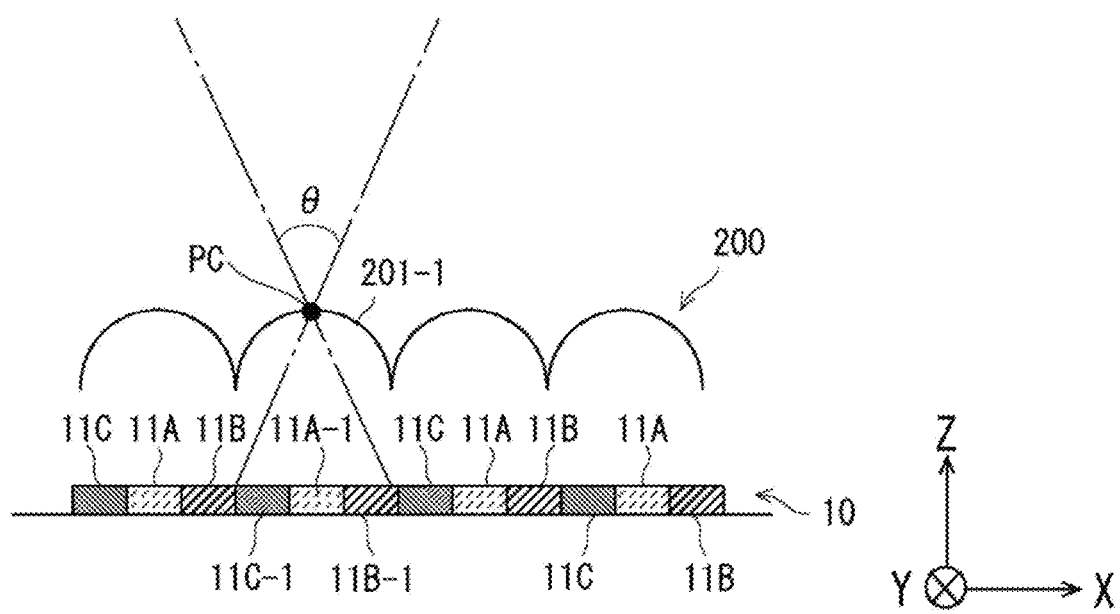
FIG. 3 is a view illustrating a display principle of a related stereoscopic display apparatus according to an embodiment of the disclosure.
Figure 4:
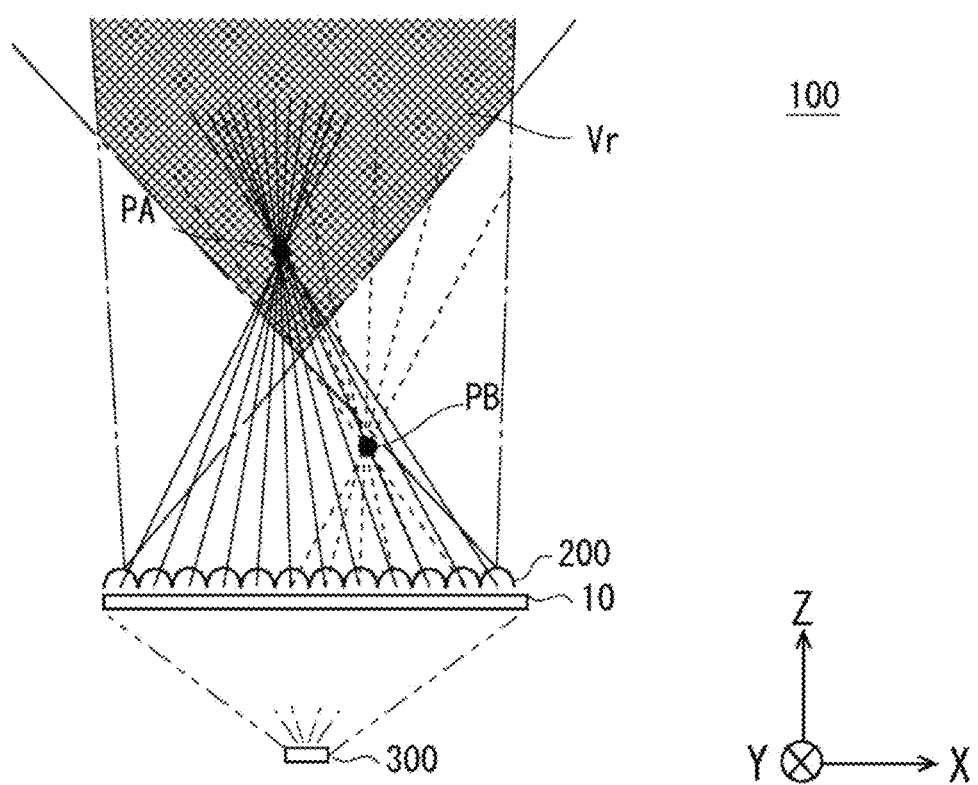
FIG. 4 is a view illustrating a field of view of a related stereoscopic display apparatus according to an embodiment of the disclosure.
Figure 5:
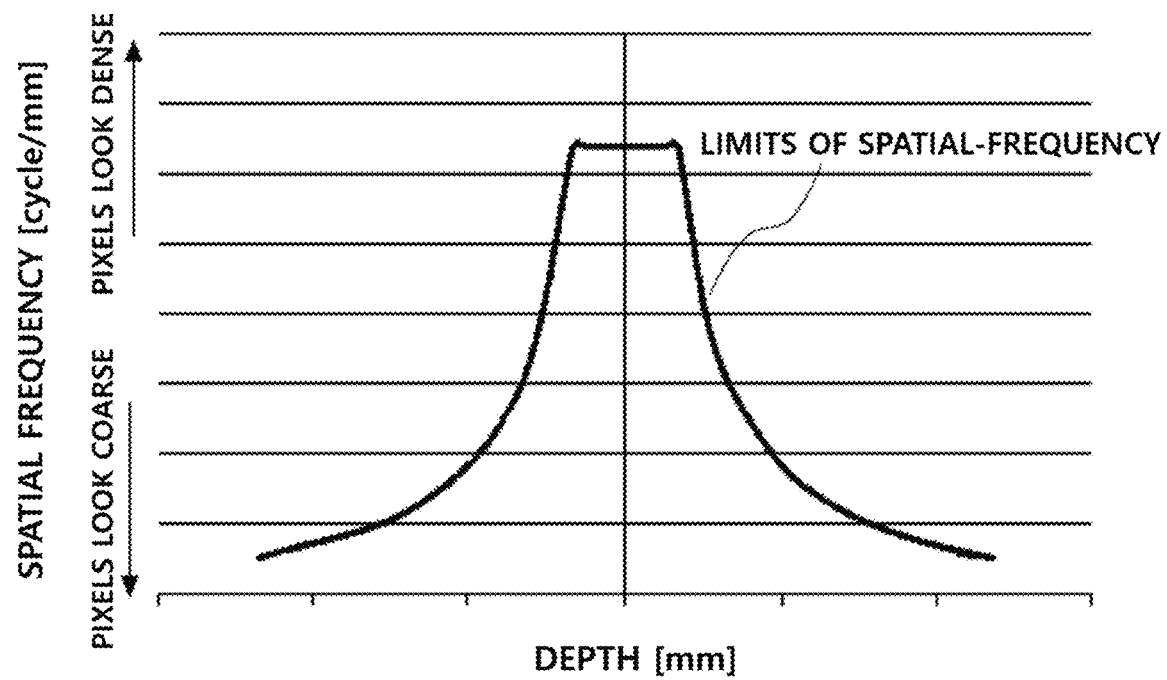
FIG. 5 is a view representing a relationship between depth and limits of spatial frequency of a related stereoscopic display apparatus according to an embodiment of the disclosure.
Figure 6:
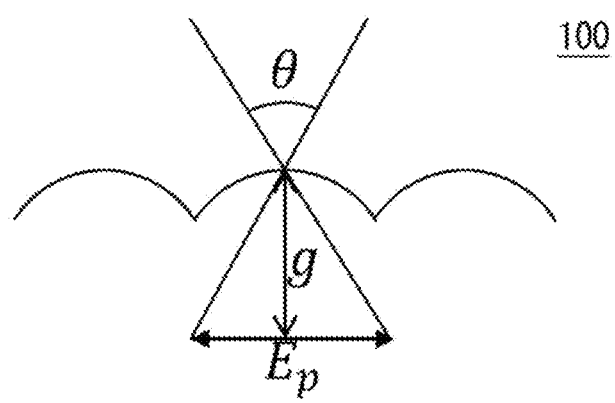
FIG. 6 is a view illustrating a viewing angle and a lens-pixel distance in a related stereoscopic display apparatus according to an embodiment of the disclosure.

FIGS. 1 to 3 are views illustrating a display principle of a related stereoscopic display apparatus according to various embodiments of the disclosure. FIG. 4 is a view illustrating a field of view of a related stereoscopic display apparatus according to an embodiment of the disclosure. FIG. 5 is a view representing a relationship between depth and limits of spatial frequency of the related stereoscopic display apparatus according to an embodiment of the disclosure. FIG. 6 is a view illustrating a viewing angle and a lens-pixel distance in the related stereoscopic display apparatus according to an embodiment of the disclosure.

Referring to FIGS. 1 to 6, a stereoscopic display apparatus 100 may be a light reproduction type stereoscopic display apparatus. For example, the stereoscopic display apparatus 100 may be a naked eye 3D display, such as an integral photography display or a light field display. Specifically, the stereoscopic display apparatus 100 may display a group of multi-view images to generate a user's binocular parallax or motion parallax that occurs when the user moves his/her viewpoint, thereby allowing the user to perceive a stereoscopic image. The stereoscopic display apparatus 100 may include a display 10, a lens array 200, and a light source 300.

The lens array 200 may be an arrangement of a plurality of lens elements 201. The lens elements 201 are also called exit pupils, and control light emission directions of elemental images that are displayed on the display 10. An elemental image may refer to two images including different image information for each eye. For example, the two different images may reproduce a three-dimensional effect when the two eyes view from different viewpoints.

The display 10 may be a liquid crystal display (LCD), an organic light emitting diode (OLED), or the like, and a display area of the display 10 may have a rectangular shape and include a plurality of pixels (display pixels) 11. For example, the display 10 may include pixels 11A, 11B, and 11C. Referring to FIG. 1, in the related stereoscopic display apparatus 100, the lens elements 201 may be positioned on the pixels 11 such that light from the pixels 11 has directivity. For example, in a case in which a distance between the pixel 11 and a principal point of the lens element 201 is a focal distance of the lens element 201, light from the pixel 11 may be emitted as parallel light through the lens element 201.

In an example of FIG. 1, light from a pixel 11A located at a center below a lens element 201-1 may be emitted upward as indicated by a solid line. Light from a pixel 11B located to the right of the pixel 11A may be emitted in an upper left direction as indicated by dotted lines. In addition, light from a pixel 11C located to the left of the pixel 11A may be emitted in an upper right direction as indicated by dashed-dotted lines. In this way, light from each pixel 11 located below the lens element 201 may be light having a certain direction.

Referring to FIG. 1, because light from the pixel 11 has directivity, a point with a depth of one point may be expressed as a group of light rays for each pixel 11, as shown in FIG. 2. For example, a point PA may be a point at which light from a pixel 11A located below each lens element 201 converges. A point PB may be a point at which light from a pixel 11B located below each lens element 201 converges. The pixel 11A located below each lens element 201 may correspond to the same location of a photographed object, and the location may be realized at the point PA. Likewise, the pixel 11B located below each lens element 201 may correspond to the same locations of the photographed object, and the location may be realized at the point PB. In this way, the stereoscopic display apparatus 100 may express a point having a three-dimensional depth as light converging at a certain point in a space.

Here, a number of the pixels 11 located below each lens element 201 may be limited. In an example of FIG. 3, it is assumed that three pixels 11A, 11B, and 11C are located below each lens element 201. For example, three pixels 11A-1, 11B-1, and 11C-1 may be located below a lens element 201-1. In addition, in the lens element 201 neighboring the lens element 201-1, a light ray may be expressed by the pixels 11 located below the neighboring lens element 201. Accordingly, in the lens element 201-1, a light ray may be expressed in a range of an elemental image located immediately below the lens element 201-1. For example, a range of points capable of being expressed by the lens element 201-1 may be a range of an angle (viewing angle θ) that is set by a principal point PC of the lens element 201-1 and a width of an elemental image. In a range out of the viewing angle θ, light by an elemental image located below the neighboring lens element 201 may appear. Accordingly, it may be impossible to express an intended stereoscopic image. Accordingly, an overlapping range of a display range displayed through the lens element 201 from the elemental image may be an observable range (field of view).

In an example of FIG. 4, a hatched area $V_r$ may represent a field of view corresponding to a portion where display ranges from end to end of a screen of the display 10 overlap. By designing both ends of the screen such that viewing angles at both the ends of the screen face slightly inward, light from both the ends may be observable in the hatched area $V_r$. Viewing angles in a screen may continuously change in the screen, and because all light rays in the screen are observable in an area where light rays from both the ends intersect each other, the area $V_r$ may be a display range.

Thereafter, a relationship between an amount of depth and a spatial frequency of a stereoscopic image that is displayed by the stereoscopic display apparatus 100 will be described with reference to FIGS. 5 and 6.

Referring to FIG. 5, a three-dimensional image displayed by the stereoscopic display apparatus 100 may have a property in which the further locations where pixels constituting the three-dimensional image are displayed are away from the display 10, the coarser a displayable spatial frequency becomes. The reason may be because pixels constituting an elemental image have widths. When a pixel width is $P_p$, a distance (hereinafter, referred to as a "lens-pixel distance") between the lens element 201 and pixels displayed on the display 10 is g, and a spatial frequency is v (cycle/mm), a depth amount $D_L$ of a display limit may be expressed by Equation 1 below.

(1)
$$D_L = \frac{g}{2vP_p} \qquad \text{Equation 1}$$

However, it may be impossible to display a three-dimensional image with a spatial frequency that is finer than a lens width of the lens element 201 of the lens array 200. Accordingly, in an area being close to the display 10, a spatial frequency of a displayed three-dimensional image may be a spatial frequency set by the lens width of the lens element 201. To display a three-dimensional image with a finer spatial frequency at a depth (a depth where the spatial frequency is not limited by the lens width) being away from the display 10, the lens-pixel distance g may need to increase.

Referring to FIG. 6, a relationship between the elemental image width Ep, the viewing angle θ, and the lens-pixel distance g may be expressed by Equation 2, below.

(2)
$$\theta = 2\tan^{-1}\left(\frac{E_p}{2g}\right) \qquad \text{Equation 2}$$

As seen from Equation 2, under a condition of the same elemental image width Ep, the greater lens-pixel distance g may result in the smaller viewing angle θ. Meanwhile, increasing the elemental image width Ep may increase the lens width, resulting in a coarse spatial frequency v. For example, the depth amount DL, the viewing angle θ, and the spatial frequency v reaching a maximum may be in a trade-off relation. Accordingly, in a light reproduction type stereoscopic apparatus having motion parallax in a wide range, it may be desired to realize a clear three-dimensional display rather than a stagnant resolution.

Meanwhile, non-patent document 1 mentioned above discloses technology of realizing a three-dimensional display without any glasses by using time division, like patent document 1. The technology described in non-patent document 1 widens a display range in a plurality of parallax directions by using a backlight of a cylindrical lens that switches a plurality of light sources through time division and a lenticular sheet on a front surface of a LCD. However, there is an issue that a resolution of a displayed field is reduced to 1/the number of parallax.

At least one of the following embodiments may resolve the issue.

First Embodiment

First, a first embodiment of the disclosure will be described. A stereoscopic display apparatus according to the current embodiment of the disclosure may include a cylinder lens array and a lenticular sheet on a rear surface of a display to switch a plurality of light sources through time division. Accordingly, a display range may be expanded in a plurality of parallax directions. In addition, the stereoscopic display apparatus according to the current embodiment of the disclosure may adopt a high-definition display method of widening a light emission range of light sources, in addition to a parallax display method. In addition, the stereoscopic display apparatus according to the current embodiment of the disclosure may use different lighting types for individual areas or fields of the display 10 and optimize display content for each area or field, thereby appropriately displaying a clearer three-dimensional image while securing a depth.

Figure 7:
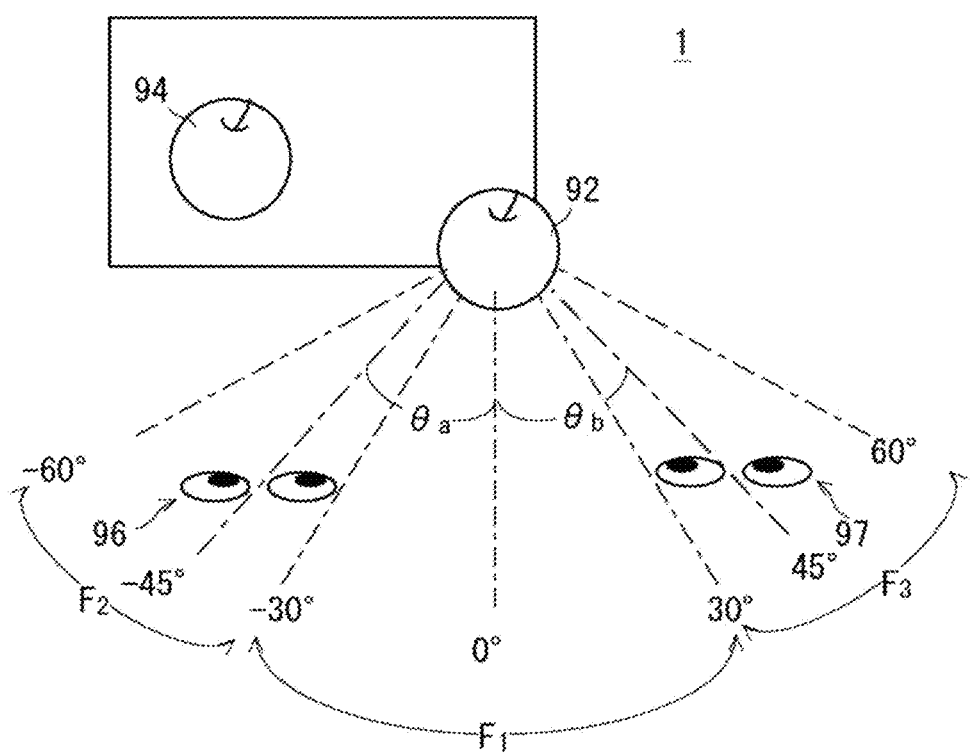
FIG. 7 is a view illustrating observation methods in two types of display methods according to an embodiment of the disclosure.

FIG. 7 is a view illustrating observation methods in two types of display methods according to an embodiment of the disclosure.

Observation Method in the Parallax Display Method

Referring to FIG. 7, in the parallax display method, a stereoscopic display apparatus 1 may display a stereoscopic image 92. In the parallax display method, a field of view is limited, as described above. Users 96 and 97 observe the stereoscopic image 92 displayed on the stereoscopic display apparatus 1 in comfortable postures within fields of view.

The stereoscopic image 92 may be configured as a group of light rays from the stereoscopic display apparatus 1. Humans recognize a depth by binocular parallax, that is, a difference between retinal images of the left and right eyes, caused by looking at an object with both eyes. In addition, a depth may be recognized by motion parallax, that is, changes in a retinal image caused by relative motion between an observer and an object. In this way, the users 96 and 97 may observe the stereoscopic image 92.

The users 96 and 97 may move their heads left and right within the fields of view, and in this case, the users 96 and 97 may observe different stereoscopic images 92 at their positions. In FIG. 7 the users 96 and 97 are shown to be located at left and right positions. Because the users 96 and 97 observe the stereoscopic image 92 in different directions, the users 96 and 97 may observe the different stereoscopic images 92. For example, in a case in which the stereoscopic image 92 displays an apple, the user 96 may observe a right side of the apple and the user 97 may observe a left side of the apple.

Herein, angles at which the users 96 and 97 observe the stereoscopic image 92 are referred to as observation angles. The observation angles may be angles (of which absolute values are equal to or smaller than 90°) of directions in which the users 96 and 97 observe with respect to a Z-axis direction. An observation angle of a user (not shown) located exactly in the Z-axis direction with respect to the stereoscopic image 92 may be 0°, an observation angle $\theta_a$ of the user 96 may be −45°, and an observation angle $\theta_b$ of the user 97 may be 45°.

Because the directions in which the users 96 and 97 observe the stereoscopic image 92 is opposite to directions (display directions of the stereoscopic image 92) in which the stereoscopic image 92 is displayed with respect to the users 96 and 97, the observation angle is also referred to as a "display angle". The display angle may be an angle (of which an absolute value is equal to or smaller than 90°) between the Z-axis direction and the display direction of the stereoscopic image 92.

In addition, according to the first embodiment of the disclosure, the stereoscopic display apparatus 1 may display an elemental image of a depth area for each display angular range through time division (field division) to express a depth of one scene of the stereoscopic image 92. The stereoscopic display apparatus 1 may divide a field, for example, into three fields F1, F2, and F3. The field F1 may be a field that displays the stereoscopic image 92 in a display angular range of −30° to 30°. The field F2 may be a field that displays the stereoscopic image 92 in a display angular range of −60° to −30°. The field F3 may be a field that displays the stereoscopic image 92 in a display angular range of 30° to 60°. By repeatedly displaying the three types of fields at high speed, the users 96 and 97 having an observation angular range of −60° to 60° may observe the stereoscopic image 92.

A display direction corresponding to a central display angle of an assigned display angular range is referred to as a main display direction. In the display angular range of −30° to 30°, a main display direction may be a display direction corresponding to a display angle 0°. In the display angular range of −60° to 30°, a main display direction may be a display direction corresponding to a display angle −45°. In the display angular range of 30° to 60°, a main display direction may be a display direction corresponding to a display angle 45°.

Observation Method of the High-Definition Display Method

In the high-definition display method, the stereoscopic display apparatus 1 may display a two-dimensional image 94 in a +Z-axis direction. The users 96 and 97 may recognize the two-dimensional image 94 displayed on the stereoscopic display apparatus 1 as a two-dimensional image. Accordingly, the observed two-dimensional image 94 may be uniform regardless of observation angles.

The first embodiment of the disclosure may be characterized in that the stereoscopic display apparatus 1 divides light emission of light sources into areas and selects one of the parallax display method or the high-definition display method for each area. Applying different display methods to different areas may be referred to as area segmentation, and performing display driving and light source driving by a method corresponding to each area may be referred to as an area control.

The stereoscopic display apparatus 1 may display the stereoscopic image 92 for an area to which the parallax display method is applied. An area to which the parallax display method is applied may be also referred to as a depth area. Meanwhile, the stereoscopic display apparatus 1 may display the stereoscopic image 94 for an area to which the high-definition display method is applied. An area to which the high-definition display method is applied may be also referred to as a high-definition area. Hereinafter, the stereoscopic image 92 and the two-dimensional image 94 may be collectively referred to as display images.

Figure 8:
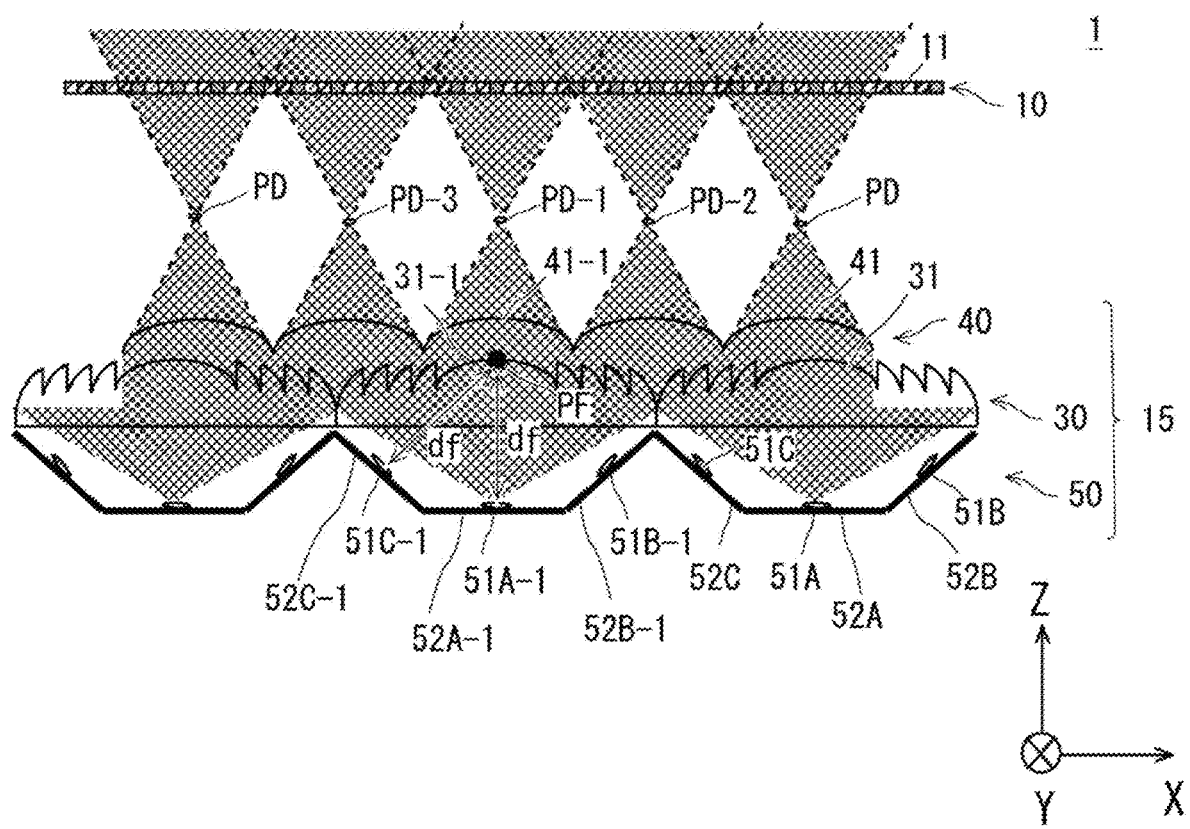
FIG. 8 is a schematic cross-sectional view of a stereoscopic display apparatus according to an embodiment of the disclosure.
Figure 9:
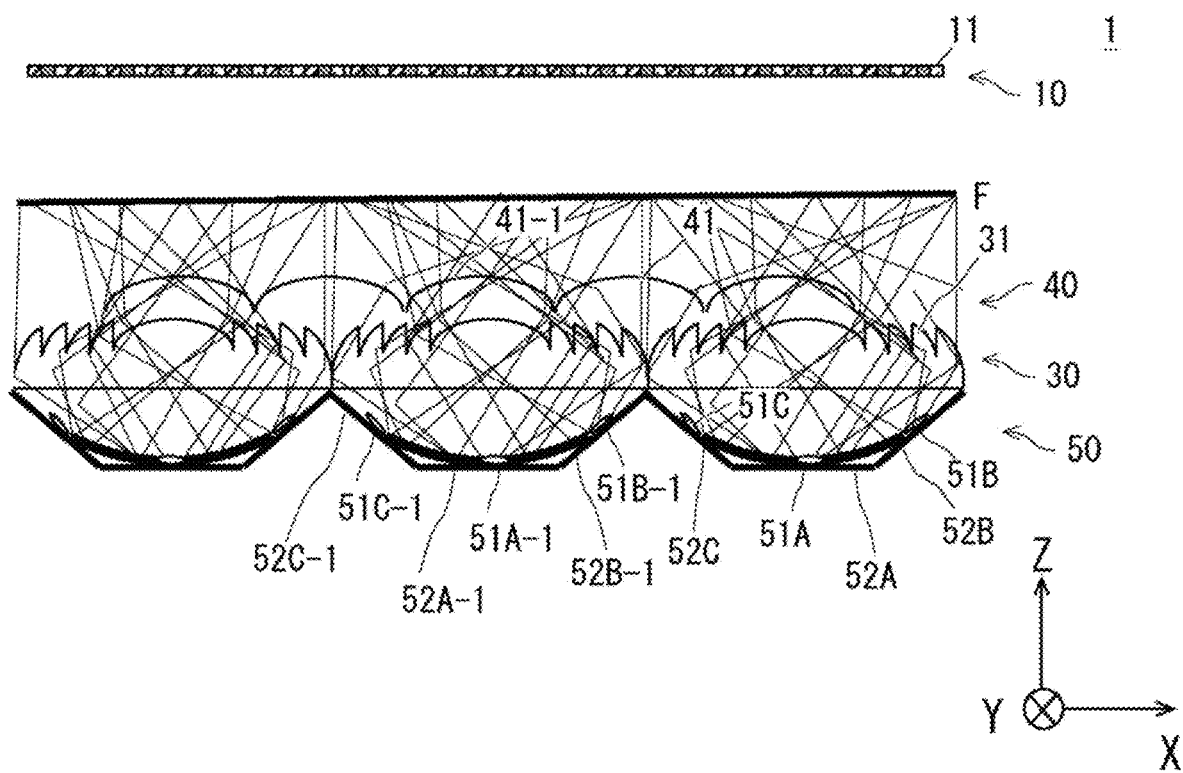
FIG. 9 is a schematic cross-sectional view of a stereoscopic display apparatus according to an embodiment of the disclosure.

Hereinafter, a configuration of the stereoscopic display apparatus 1 that realizes the above-described two types of display methods in one apparatus will be described with reference to FIGS. 8 and 9. FIGS. 8 and 9 are schematic cross-sectional views of the stereoscopic display apparatus 1 according to a first embodiment of the disclosure.

FIG. 8 illustrates a schematic cross-sectional view of a stereoscopic display apparatus according to an embodiment of the disclosure.

Referring to FIG. 8, it illustrates the stereoscopic display apparatus 1 upon application of a parallax display method. The stereoscopic display apparatus 1 may include a light source controller 15, in addition to the display 10 described above.

Upon application of the parallax display method, the display 10 may display a plurality of first images to enable a user to perceive a depth component (stereoscopic image 92) of a display image. Each first image may be a two-dimensional elemental image obtained by synthesizing images corresponding to display angular ranges of fields to which the first image corresponds among multi-view images. As for each first image that is displayed, display directions of the corresponding display images may vary according to fields. The multi-view images may be images obtained by photographing a subject from a plurality of different viewpoints, and include an image generated by computer graphics (CG).

The light source controller 15 may be a member for controlling emission directions of light rays. The light source controller 15 may include a lenticular sheet 40, a cylinder lens array 30, and a plurality of light source units 50.

The lenticular sheet 40 may be also referred to as a first lens array. The lenticular sheet 40 may be positioned on a rear surface of the display 10. The lenticular sheet 40 may include a plurality of first lens elements 41 arranged at a preset pitch. The first lens elements 41 may be exit pupils also called first cylinder lenses. Each of the first lens elements 41 may have a semi-cylindrical shape obtained by cutting a circumference in a plane being parallel to a generatrix. In the first embodiment of the disclosure, the first lens elements 41 may be arranged such that an extending direction of each ridge, that is, an axial direction of the semi-cylindrical shape is substantially parallel to the Y-axis direction.

The cylinder lens array 30 may be also referred to as a second lens array. The cylinder lens array 30 may be positioned on a rear surface of the lenticular sheet 40.

The cylinder lens array 30 may include a plurality of second lens elements 31 arranged at a pitch that is wider than that of the first lens elements 41 included in the lenticular sheet 40. In other words, the first lens elements 41 may be arranged densely, and the second lens elements 31 may be arranged relatively sparsely. The second lens elements 31 may be exit pupils also called second cylinder lenses. The second lens elements 31 may function as collimators that collimate incident light into parallel light. Each second lens element 31 shown in FIG. 8 may be a Fresnel lens in which a plurality of fine saw-toothed protrusions are formed at both ends in X-axis direction of a surface of a semi-cylindrical shape, however, the second lens element 31 may include no saw-toothed protrusions. The Fresnel lens may be used to thin a thickness of the lens.

Each of the plurality of light source units 50 may be positioned on a rear surface of each of the second lens elements 31 included in the cylinder lens array 30. Each light source unit 50 may include a plurality of line light sources 51 and a plurality of shielding walls 52 provided to correspond to the respective line light sources 51. The plurality of line light sources 51 may include, for example, line light sources 51A, 51B, and 51C. The shielding walls 52 may include shielding walls 52A, 52B, and 52C respectively (which include shielding walls 52A-1, 52B-1, and 52C-1) corresponding to the line light sources 51A, 51B, and 51C, which include light sources 51A-1, 51B-1, and 51C-1.

Each line light source 51 may be referred to as a single light source. The line light source 51 may be, for example, a light emitting diode (LED). The line light source 51 may extend along a vertical direction of an arrangement of the pixels 11 of the display 10, that is, along the Y-axis direction. Line light sources 51 included in one light source unit 50 may be provided to correspond to angular ranges (display angular ranges) of different display directions. Specifically, the line light sources 51 may be arranged at preset intervals in a horizontal direction of the arrangement of the pixels 11 of the display 10 in one light source unit 50, that is, in the X-axis direction. Each line light source 51 may be positioned on a concentric circle spaced by a focal distance (If from a principal point PF of the corresponding second lens element 31, as seen from a cross section of the line light source 51. Due to the position, the line light sources 51 may be not easily influenced by spherical aberration.

As an example, the stereoscopic display apparatus 1 may turn on one line light source 51 for each field among the line light sources 51 included in each light source unit 50. As shown in the drawing, light emitted from a line light source 51A-1 may be collimated to be parallel to the +Z-axis direction at a second lens element 31-1 of the cylinder lens array 30. The light collimated into parallel light may be condensed at a point PD-1 by a first lens element 41-1 included in the lenticular sheet 40. The light condensed at the point PD-1 may be then diffused toward the +Z-axis direction to illuminate the display 10 positioned in the +Z-axis direction from the point PD-1. The operation may be also applied in the same way to line light sources 51B-1 and 51C-1.

Accordingly, a point PD may play the same role as the principal point PC of the lens element 201 of FIG. 8. In addition, the point PD may be regarded as a virtual light source.

The display 10 may be positioned at a location spaced about twice a focal distance of the lenticular sheet 40 from the lenticular sheet 40, wherein about twice may be 2 times or 1.9 times to 2.1 times. By the arrangement, different pixels 11 may be illuminated depending on observation directions from a relationship between condensed light and the pixels 11. For example, the pixels 11 may have directivity.

Upon illumination of a first image with one line light source 51, the stereoscopic display apparatus 1 may display the first image with a resolution depending on the pitch of the first lens elements 41 of the lenticular sheet 40.

Generally, because a width of an LED as a light source is larger than that of each pixel 11, light collimated into parallel light may tend to cause great diffusion of light rays. Therefore, by setting the pitch of the second lens elements 31 of the cylinder lens array 30 such that the second lens elements 31 are arranged sparsely to increase the focal distance, diffusion of light rays may be relatively reduced. Accordingly, a width of the point PD condensed by the first lens element 41 of the lenticular sheet 40 may be narrowed. As a result, crosstalk of a displayed image may be reduced.

FIG. 9 illustrates a stereoscopic display apparatus upon application of a high-definition display method according to an embodiment of the disclosure.

Referring to FIG. 9, although an arrangement of components of the stereoscopic display apparatus 1 is the same as that of FIG. 8, a kind of images displayed on the display 10, a turning-on sequence of the light sources, and a traveling state of light may be different from those of FIG. 8.

Upon application of the high-definition display method, the display 10 of the stereoscopic display apparatus 1 may display at least one second image that enables a user to recognize a plane component (two-dimensional image 94) of a stereoscopic image 92. The second image may be a two-dimensional image.

In the high-definition display method, the stereoscopic display apparatus 1 may turn on a wide light source included in one light source unit 50. The wide light source may have a wider light emission width than a single light source. In the first embodiment of the disclosure, the stereoscopic display apparatus 1 may increase a number of line sources 51 that are turned on among line light sources 51 included in one light source unit 50 from a number of line light sources 51 that are turned on in the parallax display method. For example, the stereoscopic display apparatus 1 may turn on three line light sources 51A, 51B, and 51C among line light sources 51 included in each light source unit 50. Accordingly, the plurality of line light sources 51 may function as a surface light source that illuminates a wider range. Upon illumination by a surface light source, a wide range may be illuminated without condensing light to a single point on a focal plane F of the second lens element 31 of the cylinder lens array 30. Accordingly, because all the pixels 11 are uniformly illuminated, all the pixels 11 may be observed from any observation direction. In this case, the stereoscopic display apparatus 1 may display a second image with a display resolution of the display 10. Each light source unit 50 of the stereoscopic display apparatus 1 may include surface light sources that are different from the line light sources 51. In this case, the stereoscopic display apparatus 1 may turn on the corresponding surface light sources as wide light sources in the high-definition display method.

The stereoscopic display apparatus 1 may display a high-definition image having a depth by combining the above-described two illumination methods according to areas.

Figure 10:
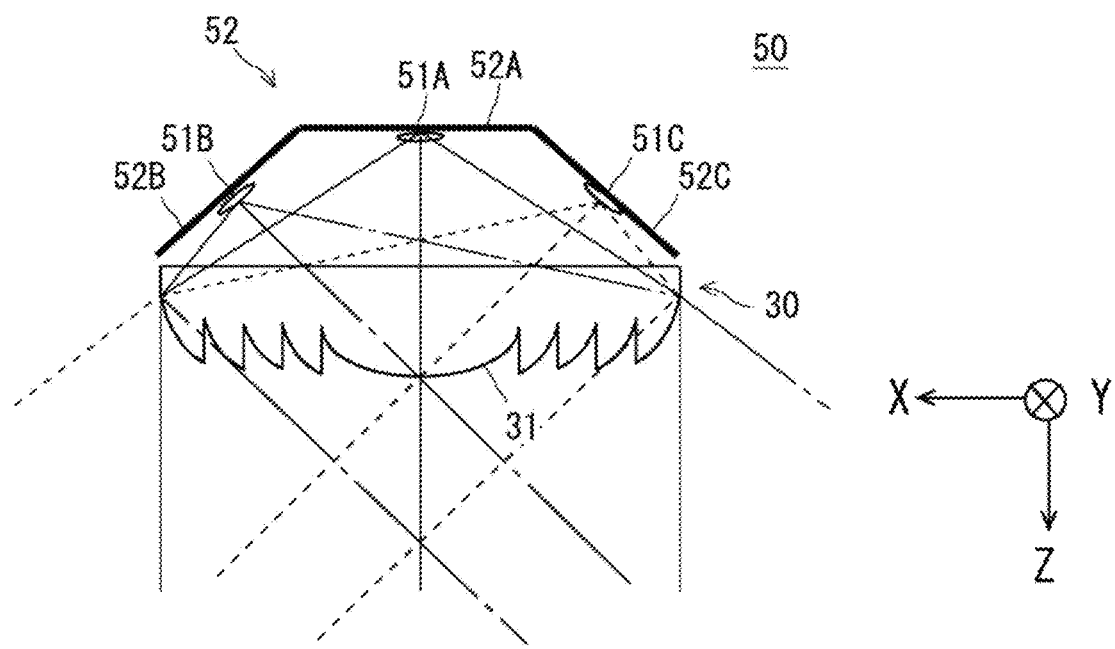
FIG. 10 is a cross-sectional view of a second lens element and a light source unit that are in a corresponding relationship in a stereoscopic display apparatus according to an embodiment of the disclosure.

FIG. 10 is a cross-sectional view of a second lens element and a light source unit that are in a corresponding relationship in a stereoscopic display apparatus according to an embodiment of the disclosure.

Referring to FIG. 10, the second lens element 31 and the light source unit 50, which are in the corresponding relationship, may constitute a closed system by a shielding wall 52.

The shielding wall 52 of the light source unit 50 may be made of a material capable of shielding light, and block incidence of light from the outside. The shielding wall 52 of the light source unit 50 may also function as a support for supporting the plurality of line light sources 51. The shielding wall 52 may support each line light source 51 such that an optical axis of the line light source 51 faces a corresponding main display direction.

The shielding wall 52A may extend along the X-axis direction as seen in the cross section. The shielding wall 52A may support the line light source 51A of which a display angle in the main display direction is 0°. One end of the shielding wall 52A in the +X-axis direction may be connected to a shielding wall 52B, and one end of the shielding wall 52A in the −X-axis direction may be connected to a shielding wall 52C. The shielding wall 52B may be inclined by 45° from the X-axis direction as seen in the cross section. The shielding wall 52B may support the line light source 51B of which a display angle in the main display direction is −45°. The shielding wall 52C may be inclined at −45° from the X-axis direction as seen in the cross section. The shielding wall 52C may support the line light source 51C of which a display angle in the main display direction is 45°.

Figure 11:
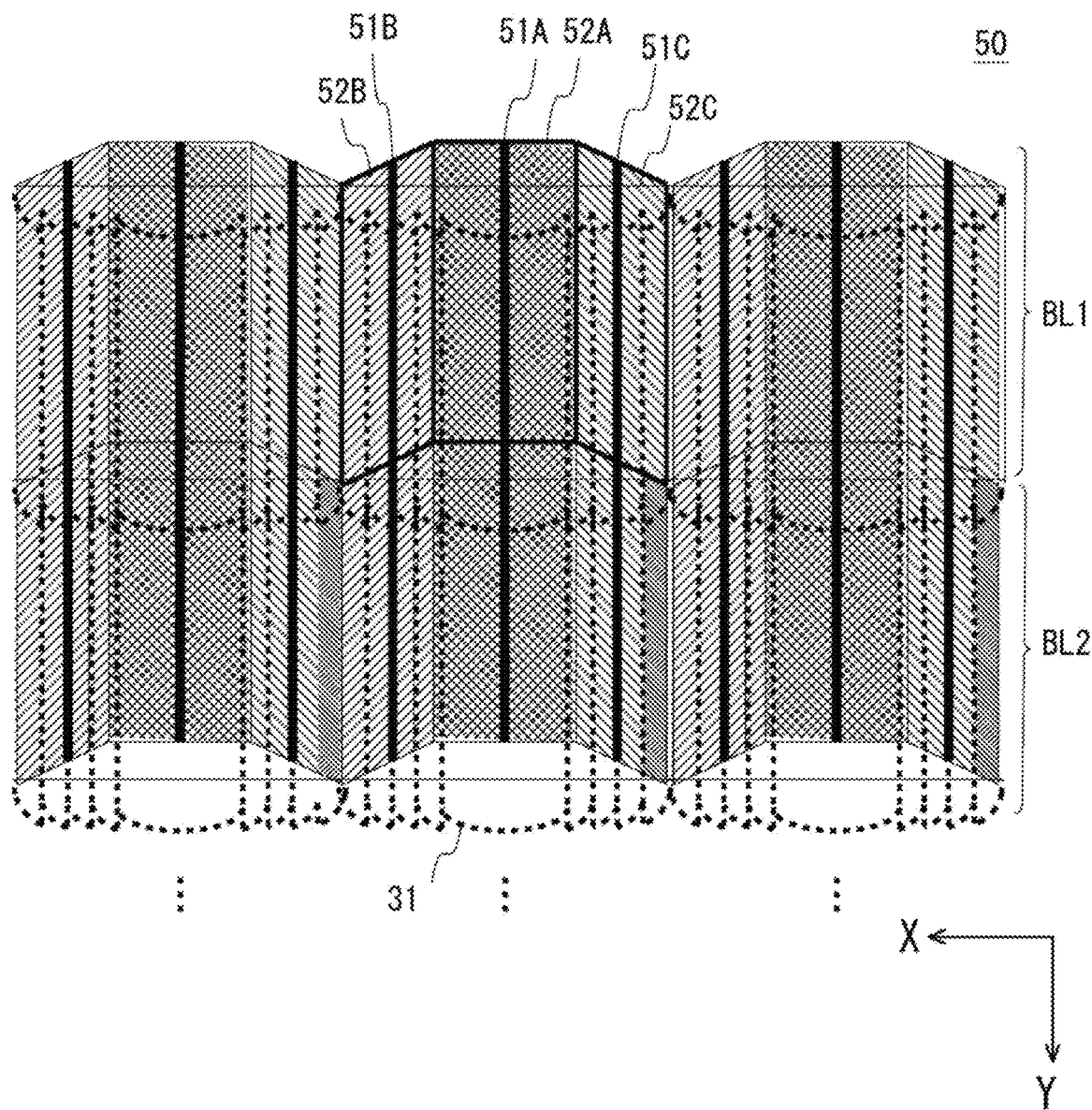
FIG. 11 is a top perspective view of light source units according to an embodiment of the disclosure.

FIG. 11 is a top perspective view of a light source units according to an embodiment of the disclosure.

Referring to FIG. 11, the plurality of light source units 50 may be connected to each other along the X-axis direction, like the second lens elements 31. A distance between the line light sources 51A in neighboring light source units 50 may be equal to the pitch of the second lens elements 31 included in the cylinder lens array 30. A distance between the line light sources 51B and a distance between the line light sources 51C may be also equal to the pitch.

One end of each shielding wall 52B in the +X-axis direction may be connected to a shielding wall 52C of a neighboring light source unit 50. One end of each shielding wall 52C in the −X-axis direction may be connected to a shielding wall 52B of a neighboring light source unit 50. The shielding wall 52B and the shielding wall 52C, which are connected to each other, may become closer to each other in the X-axis direction toward the + axis direction.

For example, the shielding walls 52B and 52C may be positioned between the line light source 51A of the corresponding light source unit 50 and a line light source 51A of a neighboring light source unit 50, and the shielding walls 52B and 52C may be configured to inhibit incidence of light from the neighboring light source unit 50 to the corresponding cylinder lens array 30. Therefore, it is possible to prevent light from a non-corresponding light source unit 50 from being emitted at a non-corresponding angle. Generally, a so-called overlapping three-dimensional image formed by emission of light at a non-corresponding angle may obstruct incidence of parallel light at a corresponding angle by the plurality of light source units 50. However, the above-described configuration may prevent formation of such an overlapping three-dimensional image.

In addition, each of the plurality of light source units 50 may include light source blocks BL1, BL2, . . . , BLn arranged along the Y-axis direction of the display 10. Specifically, light source blocks BL included in each light source unit 50 may be connected to each other along the Y-axis direction. More specifically, ends in +Y-axis direction of shielding walls 52A, 52B, and 52C included in the light source block BL1 may be respectively connected to ends in −Y-axis direction of shielding walls 52A, 52B, and 52C included in the light source block BL2.

Figure 12:
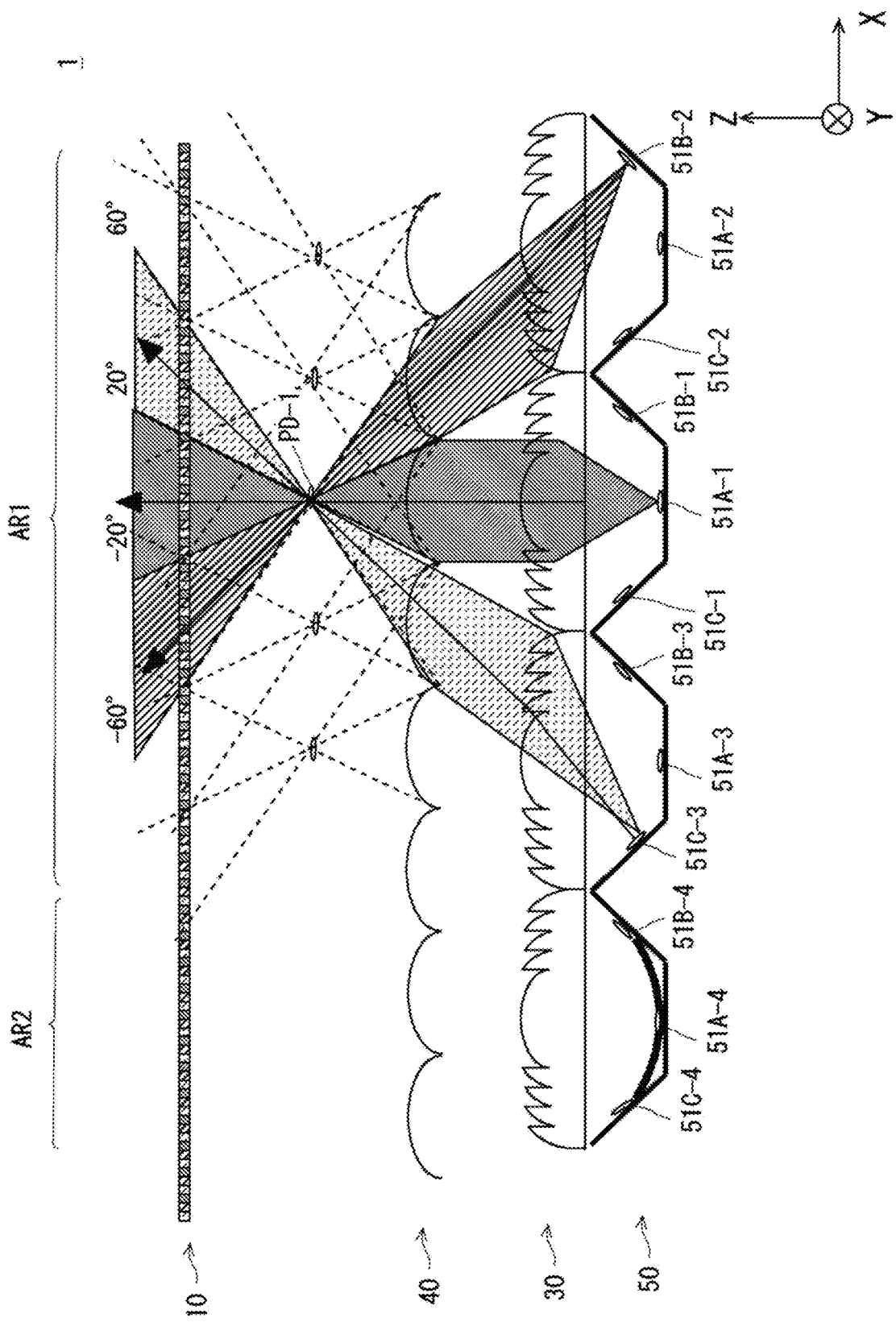
FIG. 12 is a view illustrating an area control according to an embodiment of the disclosure.

FIG. 12 is a view illustrating an area control according to an embodiment of the disclosure.

Referring to FIG. 12, the stereoscopic display apparatus 1 may divide the display 10 into a depth area AR1 and a high-definition area AR2. In addition, the stereoscopic display apparatus 1 may display images according to types of the areas and illuminate light by driving light sources according to the types of the areas.

More specifically, in the depth area AR1, the display 10 of the stereoscopic display apparatus 1 may display a first image corresponding to a current field. In addition, in the depth area AR1, each light source unit 50 of the stereoscopic display apparatus 1 may turn on a line light source 51 corresponding to the current field among three line light sources 51. Moreover, the light source unit 50 include light sources 51A-1, 51A-2, 51A-3, 51A-4, 51B-1, 51B-2, 51B-3, 51B-4, 51C-1, 51-C2, 51C-3, and 51C-4.

In the high-definition area AR2, the display 10 of the stereoscopic display apparatus 1 may display a preset second image regardless of a field. In addition, in the high-definition area AR2, each light source unit 50 of the stereoscopic display apparatus 1 may turn on all of three line light sources 51.

Figure 13:
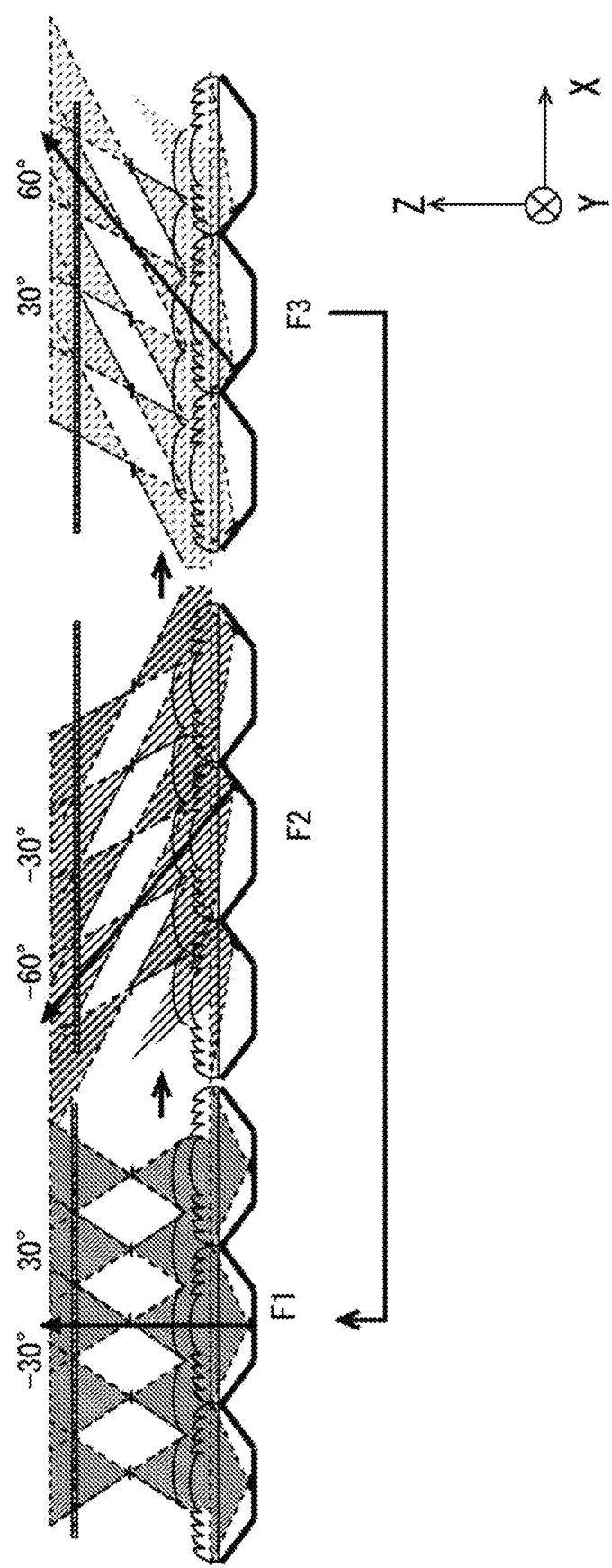
FIG. 13 is a view illustrating a field control of light source driving in a depth area according to an embodiment of the disclosure.

FIG. 13 is a view illustrating a field control of light source driving in a depth area AR1 according to an embodiment of the disclosure.

Referring to FIG. 13, in a field F1, light emitted from a line light source 51A installed on a rear surface of a second lens element 31 of the cylinder lens array 30 may become parallel light facing the front direction from the second lens element 31 of the cylinder lens array 30. The parallel light may be condensed by a first lens element 41 of the lenticular sheet 40. The light may be light in a display angular range that is set by a focal distance of the first lens element 41, a pitch of the first lens element 41, and an angle of the illuminated parallel light, and the light may illuminate the display 10. For example, the stereoscopic display apparatus 1 may reproduce light rays forming a stereoscopic image 92 within the display angular range.

A display angular range of the field F1 may be set to ±30°=60°. In this case, in a field F2, a line light source 51B spaced by the focal distance $d_f$ from the second lens element 31 of the cylinder lens array 30 may be turned on. At this time, light collimated by the second lens element 31 may enter a first lens element 41 of the lenticular sheet 40 at an angle of 45°. Then, the light may illuminate the display 10 as light in a display angular range of −30° to −60°. Accordingly, in this case, the stereoscopic display apparatus 1 may reproduce light rays in a display angular range of −30° to −60°.

In addition, upon turning-on of a line light source 51C in a field F3, the stereoscopic display apparatus 1 may reproduce light rays in a display angular range of 30° to 60° according to the same principle as in the field F2. Because display images are synchronized and repeatedly displayed in these three different fields, the stereoscopic display apparatus 1 may function as a display that reproduces an angular range of 120° from −60° to 60°. Here, the angle of 120° may be referred to as a viewing angle.

Figure 14:
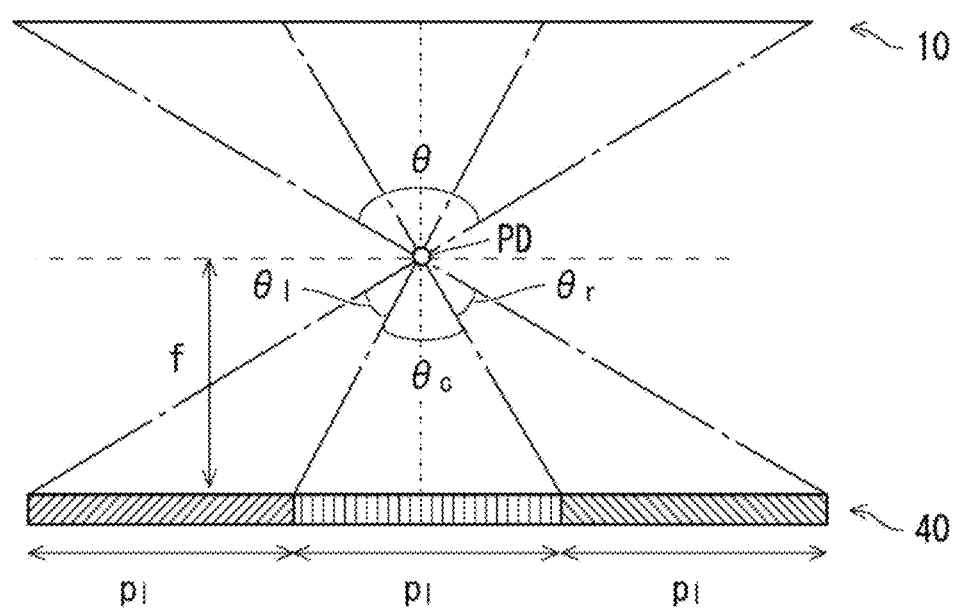
FIG. 14 illustrates a relationship between a lens pitch of a first lens element and a viewing angle according to an embodiment of the disclosure.

FIG. 14 illustrates a relationship between a lens pitch pl of a first lens element and a viewing angle θ according to an embodiment of the disclosure.

Referring to FIG. 14, upon expansion of a field of view to N (N is a natural number) fields to obtain the viewing angle θ, a focal distance of the first lens element 41 of the lenticular sheet 40 may be expressed by Equation 3 below.

$$f = N p_l / (2 \tan(\theta/2)) \qquad (3) \text{ Equation 3}$$

For example, in the case of three fields, an angular range $\theta_c$ of a first lens element 41 located at a center may be expressed by Equation 4 below.

$$\theta_c = 2 \tan^{-1}(p_l/(2f)) \qquad (4) \text{ Equation 4}$$

In addition, an angular range $\theta_r$ of a first lens element 41 located to the right may be expressed by Equation 5 below.

$$\theta_r = (\theta - \theta_c)/2 \qquad (5) \text{ Equation 5}$$

An angular range $\theta_l$ of a first lens element 41 located to the left may be equal to the angular range $\theta_r$.

In a display in which a display angular range is expanded by field division, synchronization with displayed images may play an important role.

Figure 15:
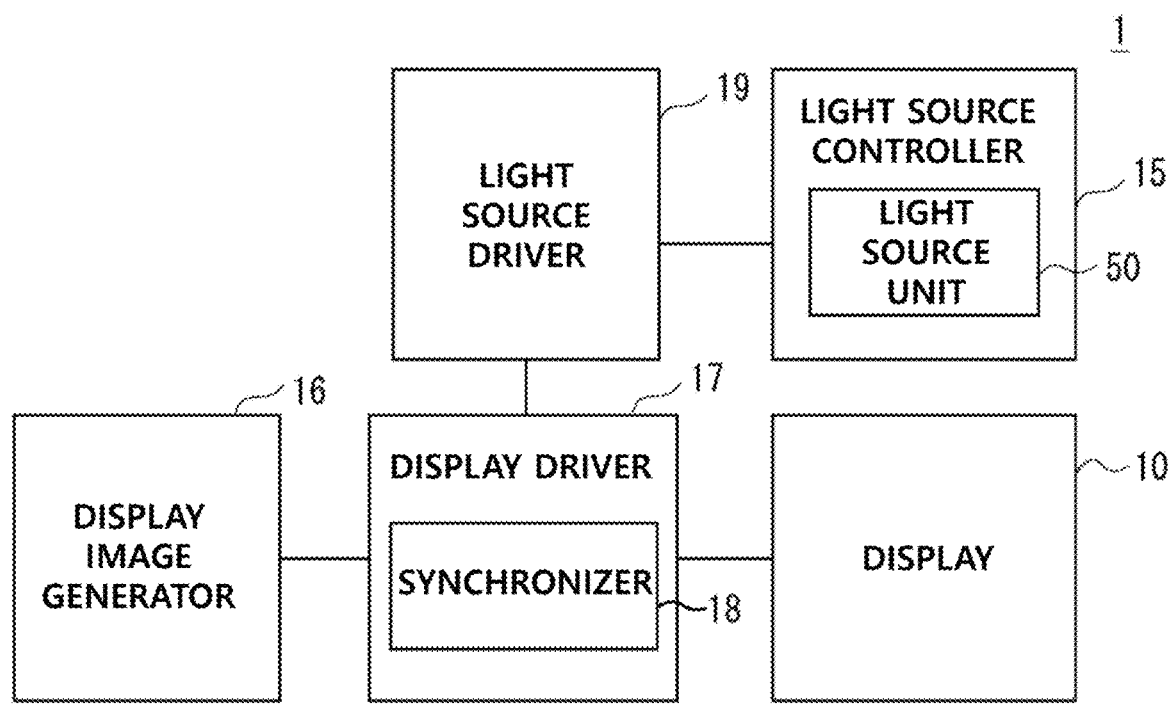
FIG. 15 is a block diagram illustrating functional components of a stereoscopic display apparatus 1 according to an embodiment of the disclosure.

FIG. 15 is a block diagram illustrating functional components of a stereoscopic display apparatus according to an embodiment of the disclosure.

Referring to FIG. 15, the stereoscopic display apparatus 1 may include a display image generator 16, a display driver 17, and a light source driver 19, in addition to the light source controller 15 and the display 10.

The display image generator 16 may generate a first image and a second image based on multi-view images. The display image generator 16 may supply the generated images to the display driver 17. The display image generator 16 may be, for example, a video reproducing device.

The display driver 17 may input the first image corresponding to the parallax display method and the second image corresponding to the high-definition display method to the display 10 by area segmentation, and cause the display 10 to display the first image and the second image. Then, the display driver 17 may convert the first image corresponding to each display angular range through field division for an area in which the first image is displayed, and cause the display 10 to display the first image.

The light source driver 19 may drive the plurality of light source units 50 through an area control such that a number of line light sources used for illuminating the second image among the line light sources 51 included in each light source unit 50 is more than a number of line light sources used for illuminating the first image. The light source driver 19 may be, for example, an LED lighting circuit.

The angular range corresponding to the first image input to the display 10 may need to coincide with an angular range corresponding to a line light source 51 that is turned on. To realize the coincidence of the angular ranges, the display driver 17 may include a synchronizer 18.

The synchronizer 18 may be a synchronizing circuit. The synchronizer 18 may detect a change in an image display and supply a synchronizing signal to the light source driver 19. In the parallax display method, the light source driver 19 may transmit a field signal for driving a line light source 51 corresponding to a display angular range of each field to the light source unit 50. Thereby, the light source driver 19 may turn on a line light source 51 corresponding to a display angular range corresponding to the first image after switching according to field switching. Accordingly, the first image that is displayed on the display 10 may be synchronized with the light source unit 50 to widen a display angular range.

Figure 16:
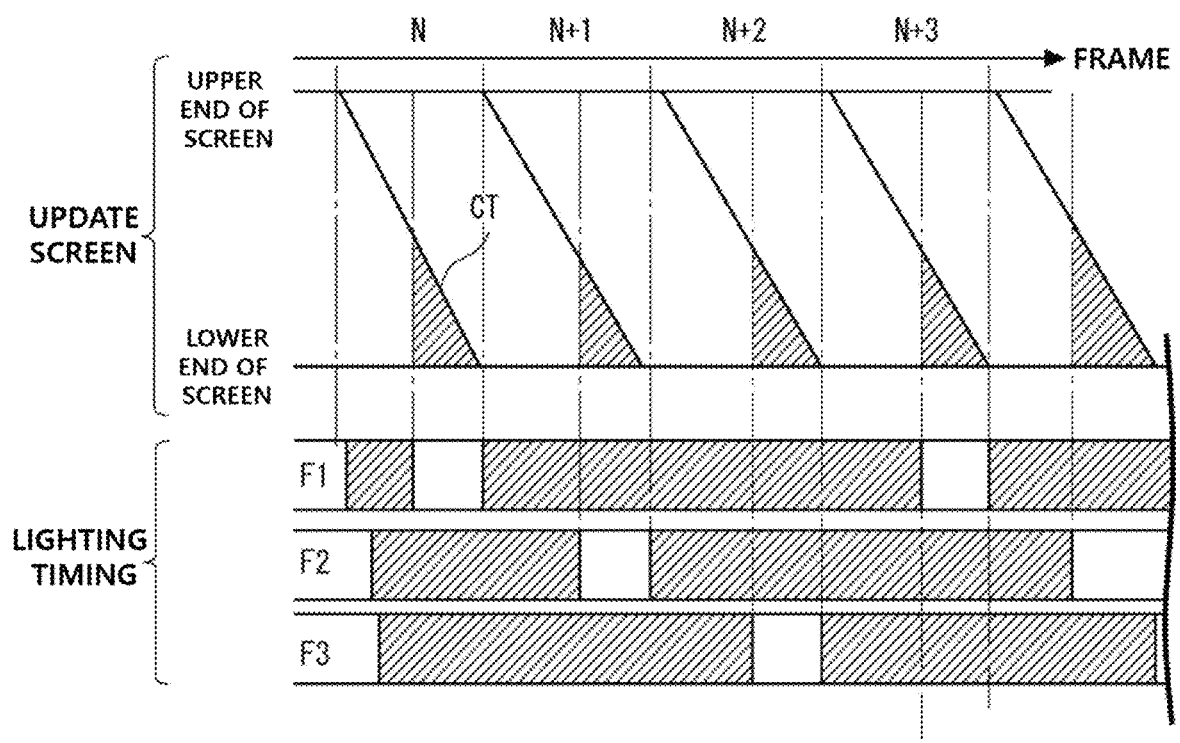
FIG. 16 illustrates timing charts of display driving and light source driving according to an embodiment of the disclosure.
Figure 17:
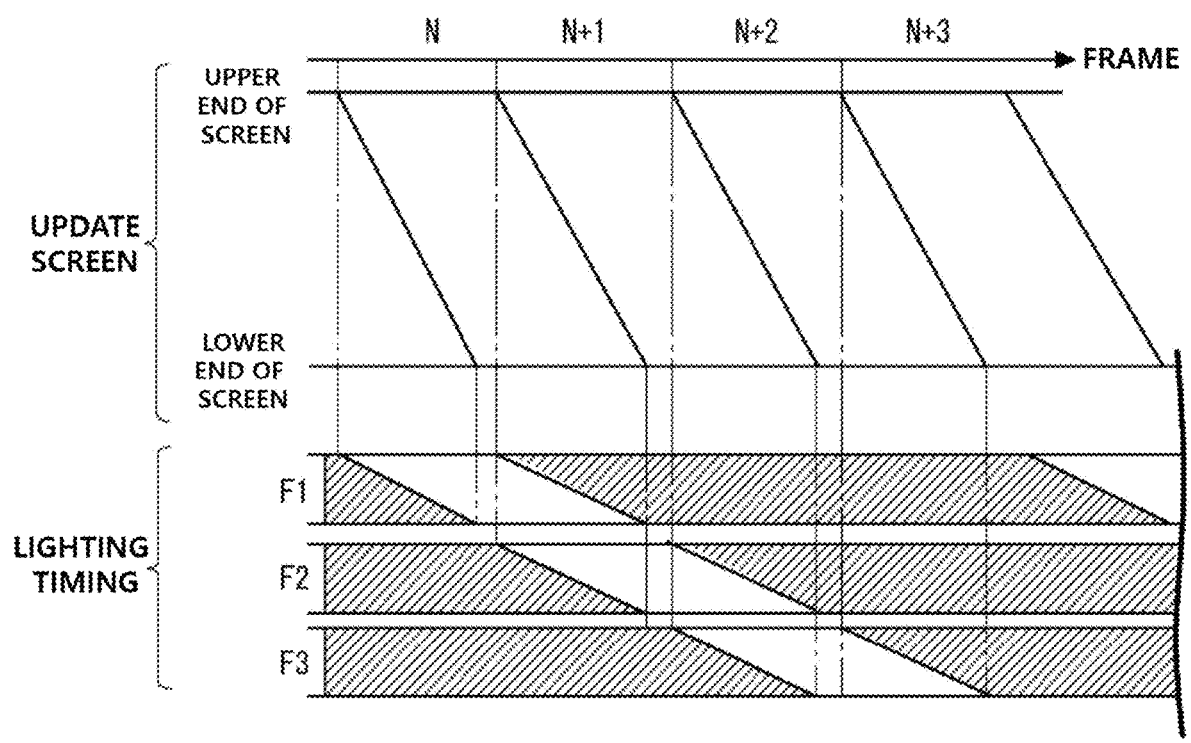
FIG. 17 illustrates timing charts of display driving and light source driving according to an embodiment of the disclosure.

FIGS. 16 and 17 illustrate timing charts of light source driving and display driving according to various embodiments of the disclosure.

Generally, in a LCD, timings of screen switching may deviate from each other at scan positions from an upper end to a lower end (from an end of the display 10 in the +Y-axis direction to another end of the display 10 in the −Y-axis direction in the first embodiment) of a screen. The display driver 17 may convert a first image to be displayed on the display 10 in a vertical scanning period into a first image corresponding to a field. In addition, the light source driver 19 may convert a line light source 51 to be turned on in the vertical scanning period into a line light source 51 corresponding to a field.

Referring to FIG. 16, for example, the light source driver 19 may turn on all light source blocks BL included in a line light source 51 corresponding to a field regardless of positions of the light source blocks BL in the Y-axis direction. In the drawing, areas where oblique lines are drawn represent turned-off times, and areas where no oblique lines are drawn represent turned-on times. In this case, as the turning-on times increase, a driving time of the upper end of the screen may deviate from a driving time of the lower end of the screen, resulting in crosstalk.

Referring to FIG. 17, the synchronizer 18 may synchronize positions of vertical scanning by the display driver 17 with vertical positions of light source blocks BL that are turned on or off by the light source driver 19. Specifically, the light source driver 19 may start turning on a line light source 51 corresponding to a next field at a field switching timing indicated by a synchronization signal, and sequentially turn on light source blocks BL included in the line light source 51 toward the vertical scanning direction based on the synchronization signal. In addition, the light source driver 19 may sequentially turn off light source blocks BL included in a line light source 51 turned on in a previous field toward the vertical scanning direction, based on the synchronization signal. Accordingly, although a turned-on time increases, crosstalk may be not easily generated.

Figure 18:
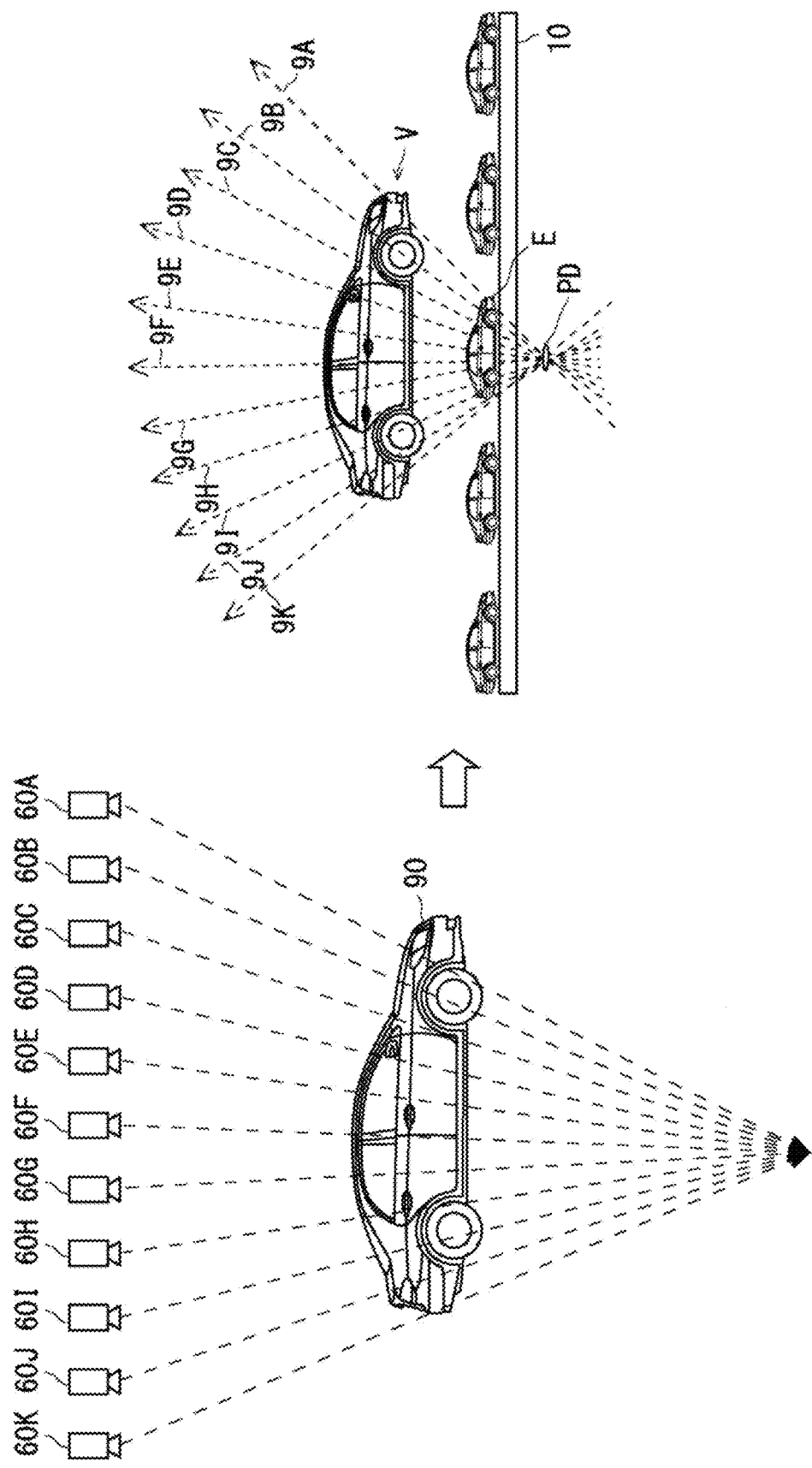
FIG. 18 is a view illustrating a method for generating a first image from multi-view images according to an embodiment of the disclosure.

FIG. 18 is a view illustrating a method for generating a first image from multi-view images according to an embodiment of the disclosure. In the following description, a horizontal direction will be described for clarification.

Referring to FIG. 18, a left part of FIG. 18 illustrates a method for photographing multi-view images. Multi-view images may be generated by photographing an object 90 with a number of cameras 60 corresponding to a number of pixels corresponding to an elemental image width (first image width). For example, in a case in which the first image width corresponds to a length of 11 pixels, multi-view images of 11 directions may be needed. Multi-view images of 11 directions may be obtained by photographing the object 90 with cameras 60A to 60K for photographing the object 90 in the 11 directions from the 11 directions. Likewise, even in computer graphics CG as well as live action, a number of cameras 60 corresponding to a number of pixels corresponding to the first image width may be needed.

A right part of FIG. 18 illustrates a stereoscopic image V reproduced by multi-view images. First, the display image generator 16 may generate a plurality of first images by rearranging pixels of a multi-viewpoint image group having directivity. More specifically, the display image generator 16 may generate the first images by sampling the pixels included in the multi-viewpoint image group in correspondence to positions of the first lens elements 41 of the lenticular sheet 40. For example, the display image generator 16 may generate a first image synthesized from multi-view images corresponding to −30° to −60°, a first image synthesized from multi-view images corresponding to −30° to 30°, and a first image synthesized from multi-view images corresponding to 30° to 60°. Then, the driver 10 driven by the display driver 17 may display the three first images in three fields, sequentially. While a first image E is illuminated during displaying, light rays 9A to 9K corresponding to the cameras 60A to 60K may be emitted from the first image E. Accordingly, the stereoscopic image V may be reproduced.

Then, the display driver 17 may display the three first images in the three fields, sequentially, on the display 10. At this time, the light source driver 19 may turn on line light sources 51 corresponding to display angular ranges of the first images being displayed, synchronizing with the switching of the display.

Figure 19:
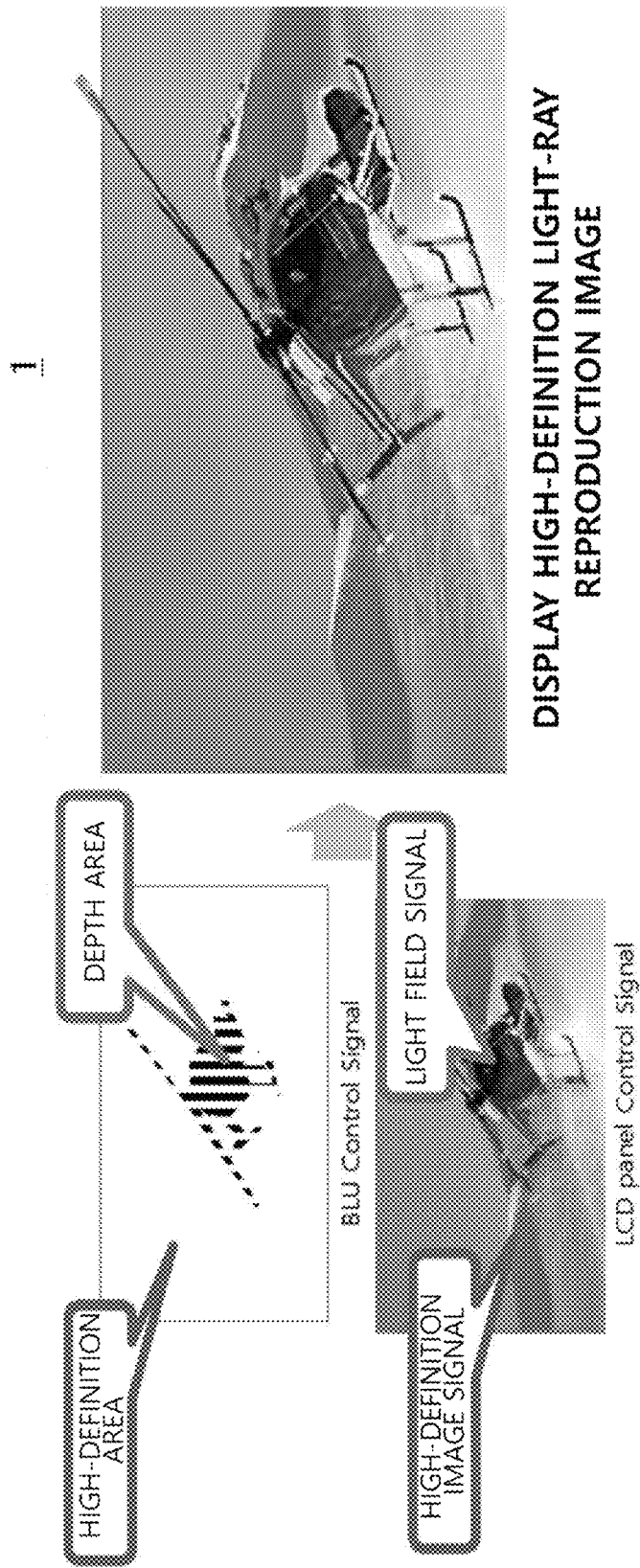
FIG. 19 is a view illustrating area segmentation according to an embodiment of the disclosure.

FIG. 19 is a view illustrating an area segmentation method according to an embodiment of the disclosure.

Referring to FIG. 19, by increasing a number of turned-on line light sources 51 of the light source unit 50 to widen a turned-on range, a high-definition display without parallax may be realized. The display image generator 16 may divide a display image into a high-definition area and a depth area in correspondence to a depth of the display image.

The areas may be optimized by using the depth of the display image. In CG, a depth map may be relatively easily output. Accordingly, the display image generator 16 may easily specify, as a high-definition area, an area with a small depth with respect to a reference plane (near the display 10) of the display image based on information of a depth map. For example, the display image generator 16 may set an image area in which parallax included in a multi-view image is equal to or less than a preset threshold value, to a high-definition area. In addition, for example, the display image generator 16 may set an image area in which parallax included in a multi-view image is greater than the preset threshold value, to a depth area.

Then, with respect to the high-definition area, the display image generator 16 may generate an image obtained by photographing a subject from a preset viewing point, as a second image. The preset viewing point may be, for example, a front direction. With respect to the depth area, the display image generator 16 may generate a first image by the method described above with reference to FIG. 18.

Then, the light source driver 19 may control the light source unit 50 based on the area segmentation to implement a high-definition display by using all the pixels of the display 10 in the high-definition area and express a depth in the depth area. Thereby, a user may perceive a high-definition display having a depth.

Upon generation of display data, the display image generator 16 may position a high-definition display near the reference plane, or the display image generator 16 may designate a reference plane at a depth at which a high-definition image is obtained by interpreting successive frames.

According to the first embodiment of the disclosure, the stereoscopic display apparatus 1 may display the parallax display method and the high-definition display method by area segmentation with a simple configuration into which two types of lens arrays are combined. Accordingly, resolution deterioration caused by the parallax display method may be reduced. Accordingly, it may be possible to appropriately display a clearer three-dimensional image while securing a depth.

The first embodiment may be modified as follows.

First Modified Example of the First Embodiment

Figure 20:
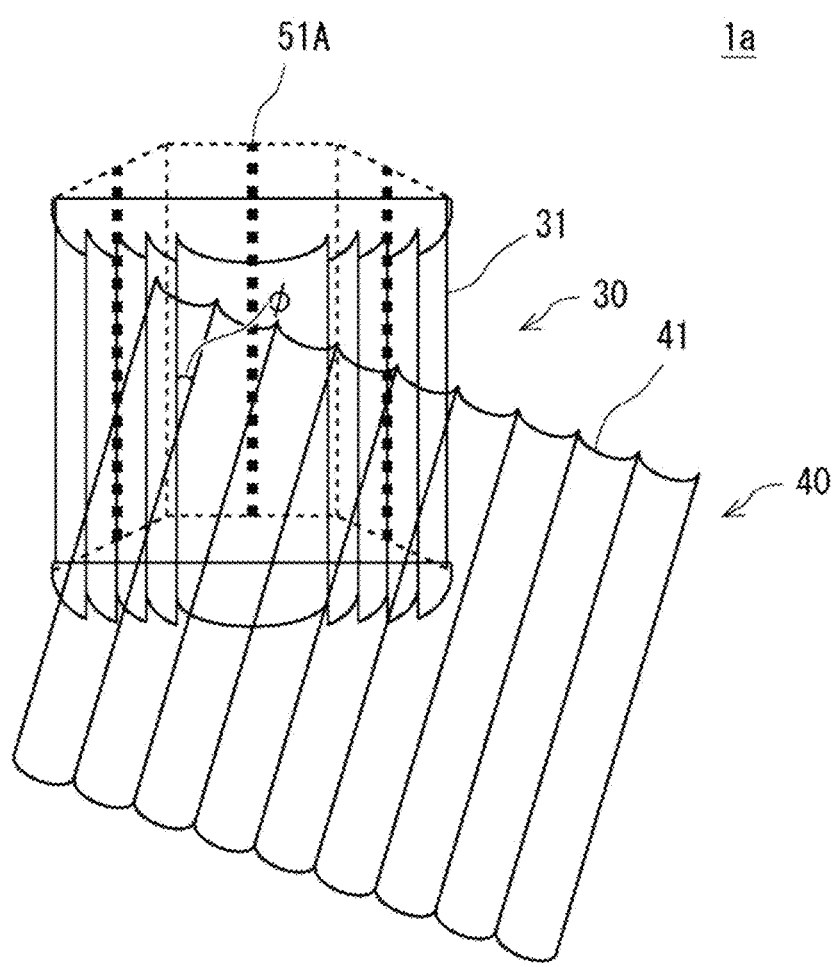
FIG. 20 illustrates an arrangement of a cylinder lens array and a lenticular sheet according to a first modified example of an embodiment of the disclosure.

FIG. 20 illustrates an arrangement of a cylinder lens array and a lenticular sheet according to an embodiment of the disclosure.

Referring to FIG. 20, basically, the cylinder lens array 30, the line light sources 51, and the lenticular sheet 40 may be also arranged along the vertical direction with respect to the screen of the display 10 to provide parallax in the horizontal direction. However, arranging ridges of the lenticular sheet 40 in the vertical direction may cause Moire by interfering with a pattern of the pixels. Each ridge of the lenticular sheet 40 may be a line being parallel to an axis of the semi-cylindrical shape of each first lens element 41.

Accordingly, as shown in FIG. 20, in a stereoscopic display apparatus 1a according to the modified example, Moire may be eliminated by slightly inclining the lenticular sheet 40 from the vertical direction. More specifically, ridges of the cylinder lens array 30 may be arranged along the vertical direction of the arrangement of the pixels 11 of the display 100, and the ridges of the lenticular sheet 40 may be inclined at a preset angle φ with respect to the vertical direction.

In addition, the stereoscopic display apparatus 1a may assign parallax based on an angle of inclination of the lenticular sheet 40 and positions of the pixels in the vertical direction.

Figure 21:
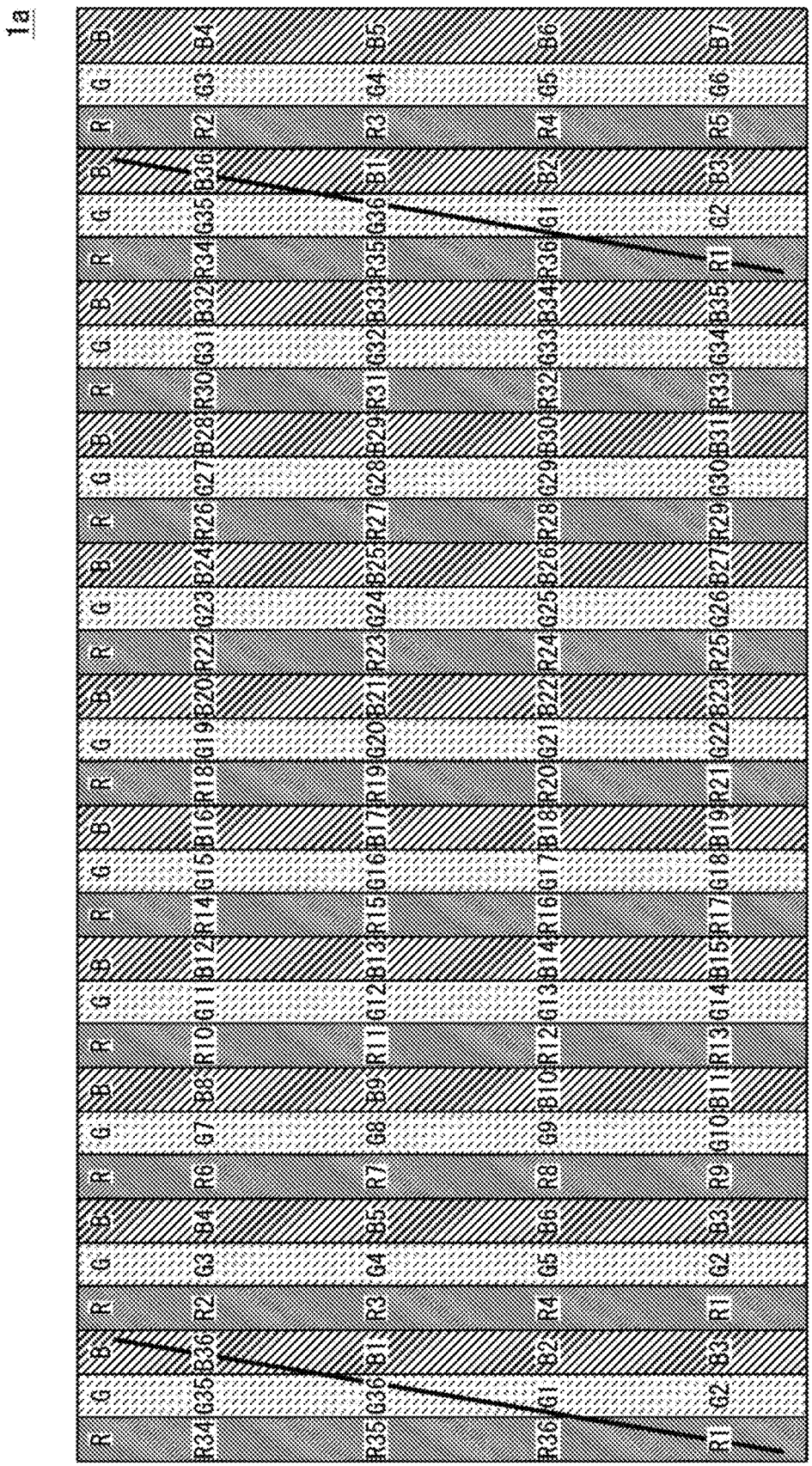
FIG. 21 illustrates an arrangement of a parallax image and first lens elements of a lenticular sheet according to a first modified example of an embodiment of the disclosure.

FIG. 21 illustrates an arrangement of a first image and first lens elements of a lenticular sheet according to an embodiment of the disclosure.

Referring to FIG. 21, one pixel 11 may have three sub pixels of RGB. Because the sub pixels are observed in different directions, the stereoscopic display apparatus 1 may assign parallax to each sub pixel. In addition, because light rays are scattered in different directions due to misalignment of the ridges of the cylinder lens array 30 and the ridges of the lenticular sheet 40 in the Y-axis direction, the stereoscopic display apparatus 1a may also assign a parallax to this. In the current drawing, for example, the lenticular sheet 40 having a width of 9 pixels in the X-axis direction may be inclined by tan ¼. Accordingly, parallax of 36 directions may be assigned. More specifically, although the same display direction is assigned to RGB included in one pixel 11, displacement may occur in the display direction according to a position of the pixel 11. Accordingly, parallax of substantially 108 directions may be assigned. The display image generator 16 may synthesize, as a first image, an image obtained by interpolating 36 multi-view images while displacing the multi-view images by ⅓ for each of RGB. Accordingly, a more accurate display may be performed with the 36 multi-view images.

In addition, in the first modified example of the first embodiment of the disclosure, the stereoscopic display apparatus 1a may further include an anisotropic diffusion sheet in the light source controller 15.

Figure 22:
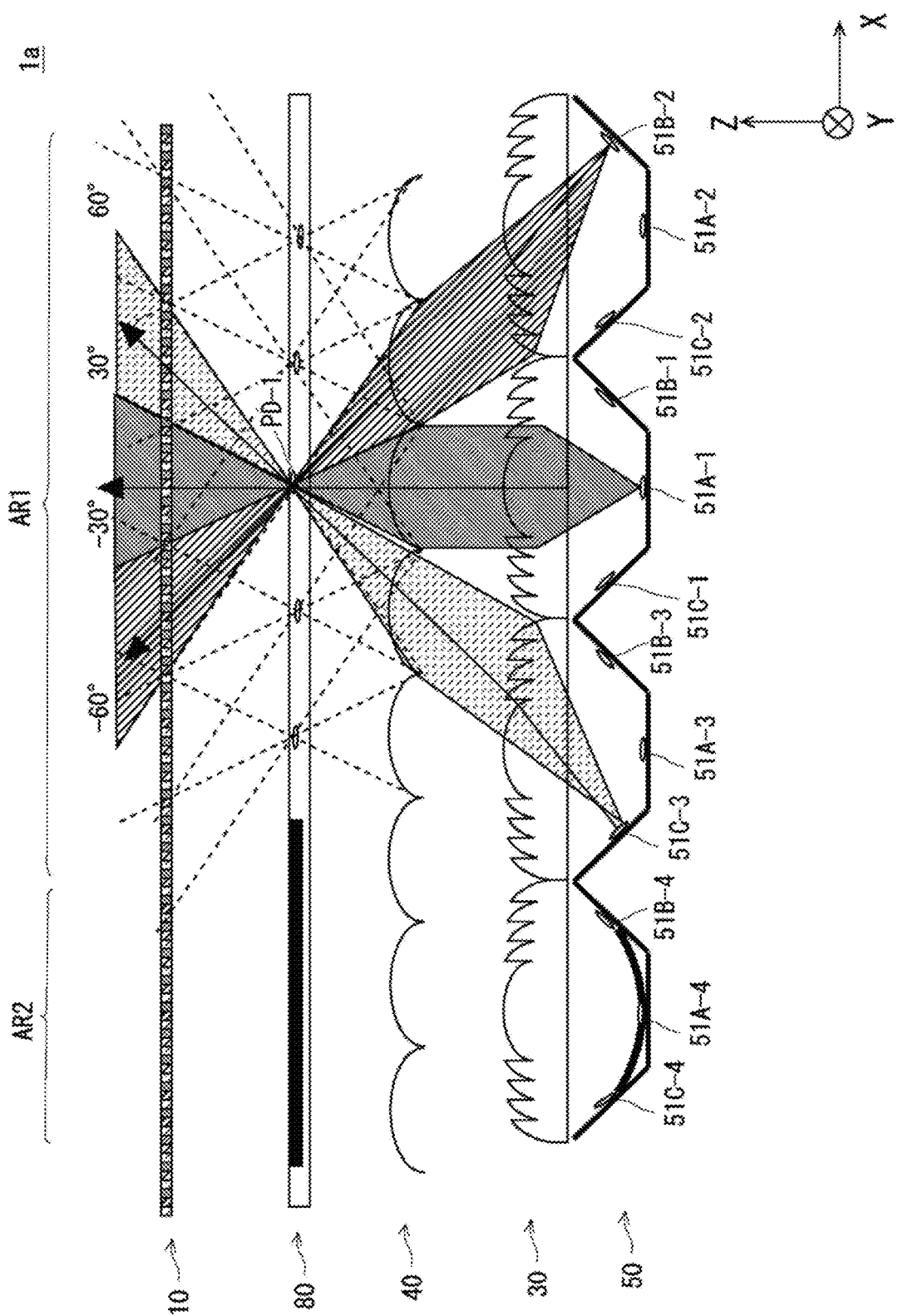
FIG. 22 illustrates an arrangement of an anisotropy diffusion sheet according to a first modified feature of an embodiment of the disclosure.

FIG. 22 illustrates an arrangement of an anisotropy diffusion sheet according to an embodiment of the disclosure.

Referring to FIG. 22, the anisotropy diffusion sheet 80 may be positioned on an XY plane between the lenticular sheet 40 and the display 10. More specifically, the anisotropy diffusion sheet 80 may be positioned at a location spaced by a substantially focal distance of the lenticular sheet 40 from an image formation surface of the lenticular sheet 40, that is, from the lenticular sheet 40 in the Z-axis direction. The substantially focal distance may be a focal distance, or a distance ranging from 0.9 times to 1.1 times of the focal distance. The anisotropic diffusion sheet 80 may more greatly perform an action of diffusing light in a direction of the ridges of the lenticular sheet 40, than an action of diffusing light in a direction being orthogonal to the ridges of the lenticular sheet 40, in a direction being parallel to a main surface of the anisotropic diffusion sheet 80. Accordingly, an effect of a condensation distribution in the direction being orthogonal to the direction of the ridges of the lenticular sheet 40 may be reduced, which makes it difficult to widen a width of the condensation distribution in the direction being orthogonal to the ridges. Accordingly, crosstalk of a display image may be reduced. In addition, because the crosstalk of the display image has no influence in the direction of the ridges of the lenticular sheet 40, it may be possible to actively diffuse light in the direction.

In the cylinder lens array 30, brightness mura may tend to occur around the lenses or on lens bonding surfaces. However, because the ridges of the lenticular sheet 40 are inclined with respect to the ridges of the cylinder lens array 30 to diffuse light in the direction allowing active diffusion, brightness mura that occurs around the lenses of the cylinder lens array 30 or on the lens bonding surfaces may be reduced.

Second Embodiment

Hereinafter, a stereoscopic display apparatus according to a second embodiment of the disclosure will be described. For example, Patent Document 2 discloses technology that enables a high-definition stereoscopic display without glasses by increasing light efficiency and reducing crosstalk through an optical system in which lenses for pixels are combined with a diffusion sheet. However, the technique of Patent Document 2 has an issue that a display resolution is lowered to 1/the number of parallax. In addition, the technique of Patent Document 2 is a method of covering a LCD with lenses, and has an issue that natural motion parallax is not obtained in a wide range.

The stereoscopic display apparatus according to the current embodiment of the disclosure may include a diffusion sheet to implement a wider display range than an angle of view of the lenticular sheet 40.

Figure 23:
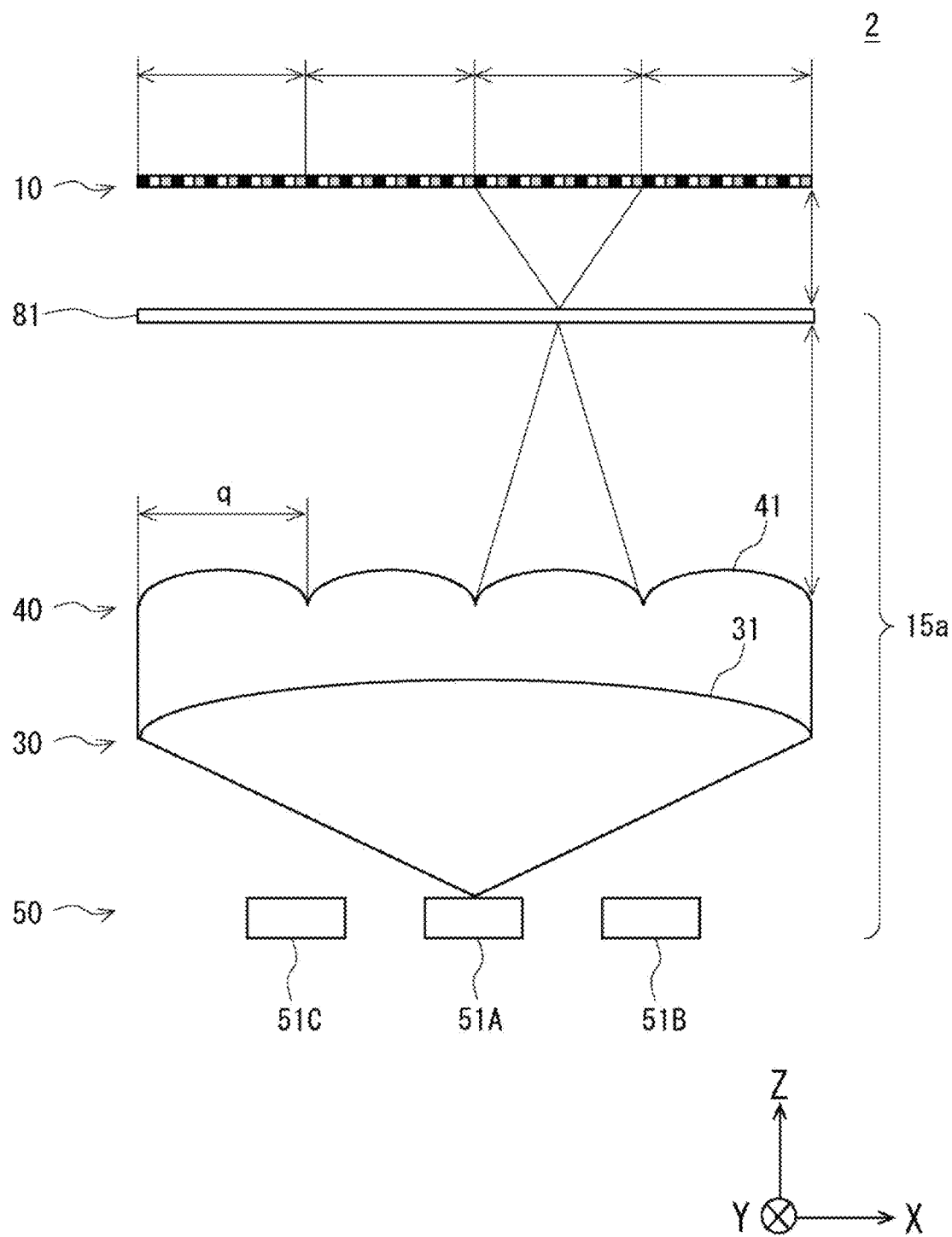
FIG. 23 is a cross-sectional view schematically illustrating a stereoscopic display apparatus according to an embodiment of the disclosure.

FIG. 23 is a cross-sectional view schematically illustrating a stereoscopic display apparatus according to an embodiment of the disclosure.

Referring to FIG. 23, in a stereoscopic display apparatus 2 according to the current embodiment of the disclosure, a light source controller 15a may further include a diffusion sheet 81. The diffusion sheet 81 may be positioned between the display 10 and the lenticular sheet 40, and may be positioned at the position including the focal point of each first lens element 41. More specifically, the diffusion sheet 81 may be positioned on a plane including the focal point of each first lens element 41. The diffusion sheet 81 may isotropically diffuse transmitted light in the X-axis direction and the Y-axis direction. The diffusion sheet 81 may be preferably thin.

Line light sources 51A to 51C may be arranged on the rear surface of each second lens element 31. For example, light emitted from the line light source 51A may be collimated into parallel light by each second lens element 31 of the cylinder lens array 30. The light collimated into parallel light by each second lens element 31 may be condensed by each first lens element 41 of the lenticular sheet 40. The light condensed by each first lens element 41 may be condensed at each focal point at which the diffusion sheet 81 is positioned. The light condensed at each focal point may proceed to spread luminous flux. The diffusion sheet 81 for diffusing light may be positioned at a position including each focal point. Accordingly, diffused light passed through the diffusion sheet 81 may more widen luminous flux than in a case in which there is no diffusion sheet 81. The diffused light passed through the diffusion sheet 81 may enter the display 10.

Figure 24:
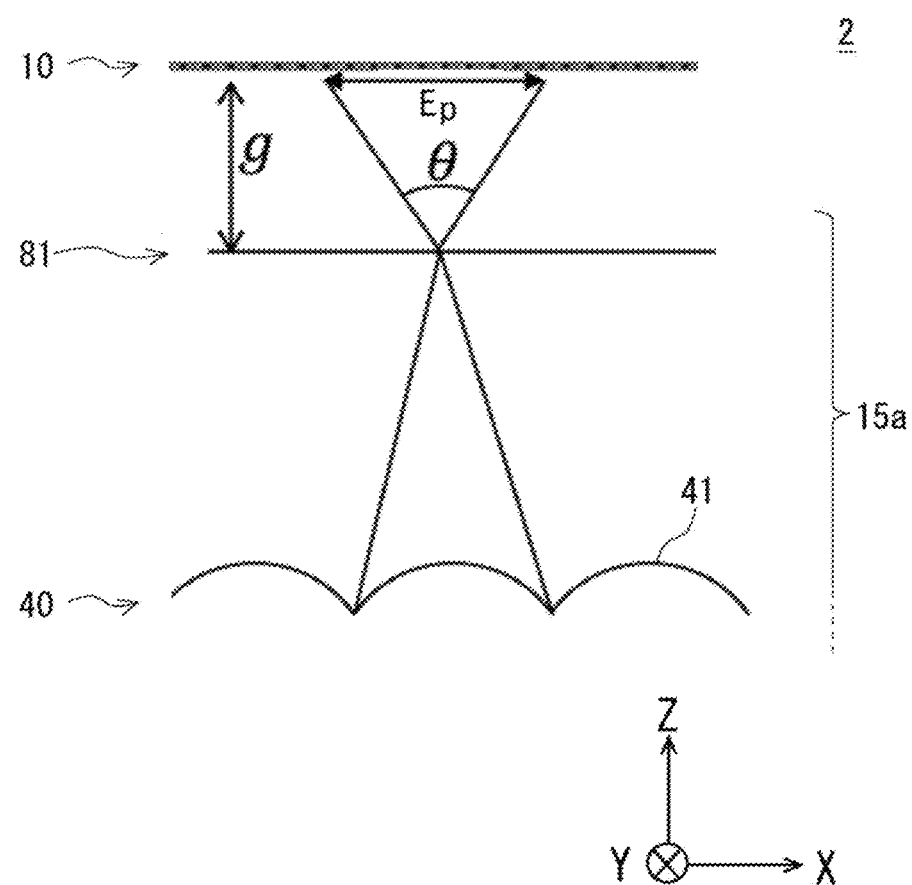
FIG. 24 illustrates a relationship between a diffusion sheet and an element pixel in a stereoscopic display apparatus according to an embodiment of the disclosure.

FIG. 24 illustrates a relationship between a diffusion sheet and an element pixel in a stereoscopic display apparatus according to an embodiment of the disclosure.

Referring to FIG. 24, an angular range θ of a field of view may be expressed by the above Equation 2 by the distance g between the diffusion sheet 81 and the display 10 and the element pixel width Ep. The element pixel width Ep may be arranged at approximately the same intervals as a pitch q of each first lens element 41 of the lenticular sheet 40. The distance between the diffusion sheet 81 and the display 10 may be shorter than a distance between the diffusion sheet 81 and the lenticular sheet 40. Light diffused by the diffusion sheet 81 may illuminate the display 10 over a wider range than the elemental image width Ep. By the arrangement, different pixels may be illuminated in observation directions from a relationship between condensed light and the pixels. In other words, the pixels may have directivity and function as the stereoscopic display apparatus 2 of the light reproduction type as described above.

Generally, a light condensation range by the lenticular sheet 40 is limited to about 45°. Accordingly, a display angular range of a stereoscopic display apparatus configured with the lenticular sheet 40 is limited to 45°. In contrast, the stereoscopic display apparatus 2 according to the current embodiment of the disclosure may include the diffusion sheet 81. Therefore, a display range may be expanded by spreading light through the diffusion sheet 81.

Third Embodiment

Hereinafter, a third embodiment of the disclosure will be described. In the current embodiment of the disclosure, a shielding plate may be used.

Figure 25:
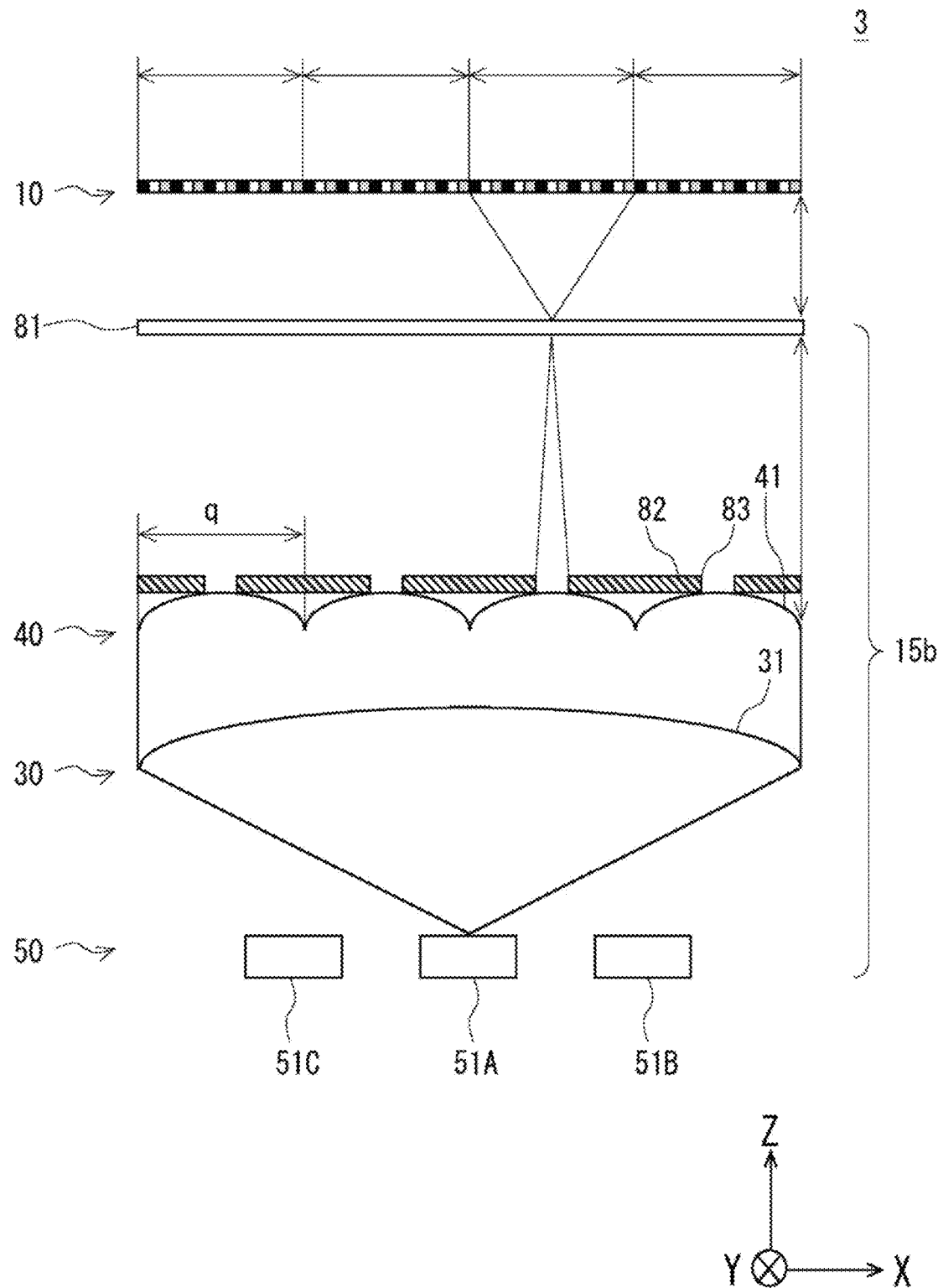
FIG. 25 is a cross-sectional view schematically illustrating a shielding plate having slits in a stereoscopic display apparatus according to an embodiment of the disclosure.

FIG. 25 is a cross-sectional view schematically illustrating a shielding plate having slits in a stereoscopic display apparatus according to an embodiment of the disclosure.

Referring to FIG. 25, in a stereoscopic display apparatus 3 according to the current embodiment of the disclosure, the light source controller 15b may further includes a shielding plate 82. The shielding plate 82 may be positioned on the surface of the lenticular sheet 40. A plurality of slits 83 may be provided in the shielding plate 82. Each slit 83 may be positioned at a central portion of each first lens element 41. Accordingly, the shielding plate 82 shields light transmitted through an edge portion of each first lens element 41, and a plurality of slits 83 are formed in the shielding plate 82 that transmit light through the central portion of each first lens element 41.

Upon condensing of light by the lenticular sheet 40, light transmitted through the edge portion of each first lens element 41 may spread around the focal point of the diffusion sheet 81 without being condensed at the focal point, due to aberration of the first lens element 41. While a periphery of the focal point is illuminated, pixels that do not correspond to a display direction may be illuminated. Accordingly, light transmitted through the edge portion of each first lens element 41 may become crosstalk of a stereoscopic image, resulting in quality deterioration of a stereoscopic display. Accordingly, light passing through the edge portion of each first lens element 41 may be limited by using the shielding plate 82 including the slits 83. Accordingly, crosstalk may be reduced and quality of a stereoscopic display may be improved.

In a stereoscopic display using an existing barrier, there is no need to condense light, and accordingly, narrow openings may be used to reduce crosstalk. Accordingly, the stereoscopic display using the barrier has very poor light efficiency. For a bright display, light sources, such as LEDs need to illuminate strong light, resulting in high power consumption. In contrast, in the current embodiment of the disclosure, because light is condensed by each first lens element 41 although the shielding plate 82 is used, a light converging point that is narrower than a width of each opening may be created. Accordingly, light efficiency may be improved to reduce power consumption.

Fourth Embodiment

Hereinafter, a fourth embodiment of the disclosure will be described. The current embodiment of the disclosure may be an example in which the second lens elements 31 of the cylinder lens array 30 are arranged in a zigzag pattern.

Figure 26:
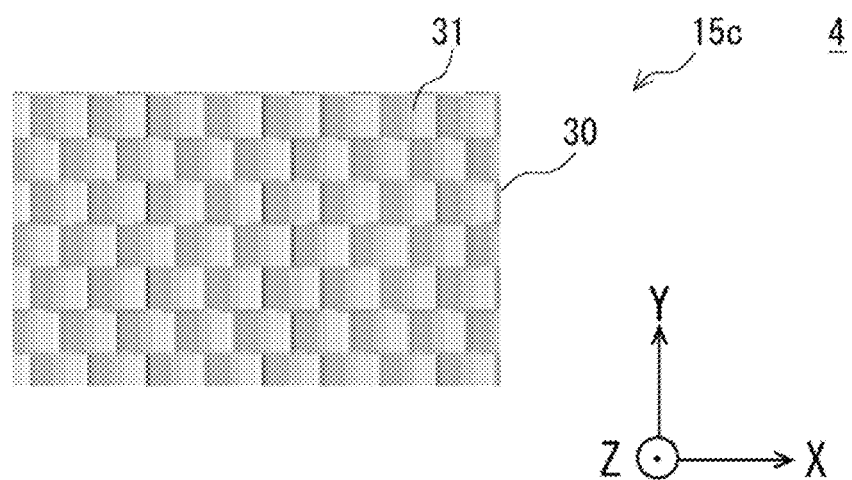
FIG. 26 is a top view illustrating an arrangement of second lens elements of a cylinder lens array in a stereoscopic display apparatus according to an embodiment of the disclosure.
Figure 27:
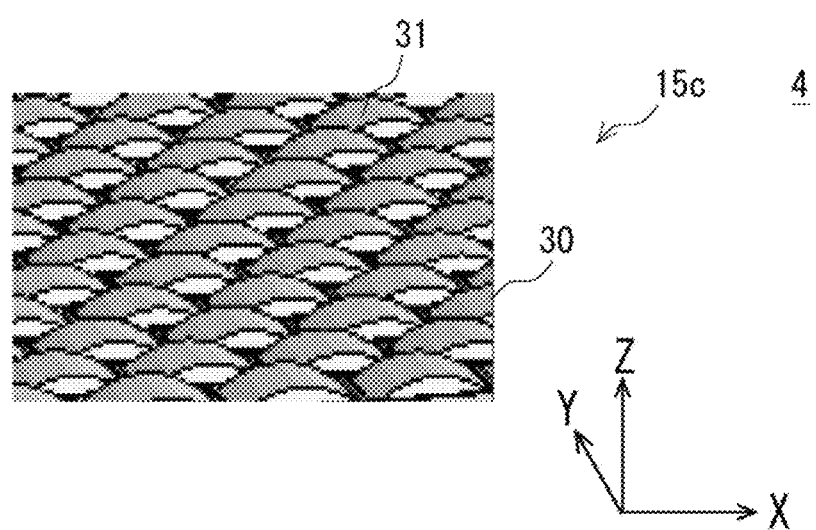
FIG. 27 is a perspective view illustrating an arrangement of second lens elements of a cylinder lens array in a stereoscopic display apparatus according to an embodiment of the disclosure.
Figure 28:
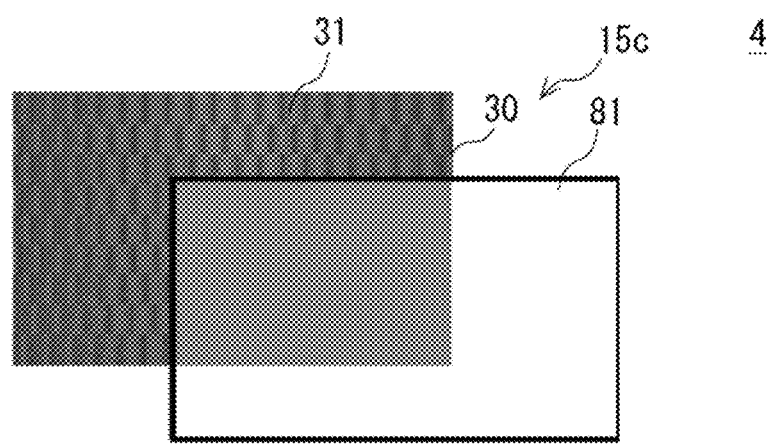
FIG. 28 is a top view illustrating a cylinder lens array seen through a diffusion sheet in a stereoscopic display apparatus according to an embodiment of the disclosure.

FIG. 26 is a top view illustrating an arrangement of second lens elements of a cylinder lens array in a stereoscopic display apparatus according to an embodiment of the disclosure. FIG. 27 is a perspective view illustrating an arrangement of second lens elements of a cylinder lens array in a stereoscopic display apparatus according to an embodiment of the disclosure. FIG. 28 is a top view illustrating a cylinder lens array seen through a diffusion sheet in a stereoscopic display apparatus according to an embodiment of the disclosure.

Referring to FIGS. 26 and 27, a light source controller 15*c* according to the current embodiment of the disclosure may include the cylinder lens array 30 including the plurality of second lens elements 31 arranged in the zigzag pattern. For example, in the cylinder lens array 30, the plurality of second lens elements 31 may be arranged in the zigzag pattern in the X-axis direction and in the Y-axis direction. For example, each second lens element 31 in a row in which the plurality of second lens elements 31 are arranged in the X-axis direction may be dislocated by half a pitch from each second lens element 31 in an adjacent row in the Y-axis direction.

In the cylinder lens array 30 seen in the +Z-axis direction, a quantity of light at the ridge of each second lens element 31 may be different from a quantity of light at an end portion of the second lens element 31. Accordingly, in-plane uniformity of a quantity of light transmitted through the cylinder lens array 30 may be reduced. However, as shown in FIG. 28, by passing light through the diffusion sheet 81, the in-plane uniformity of a quantity of light transmitted through the cylinder lens array 30 may be improved. In this way, the stereoscopic display apparatus 3 according to the current embodiment of the disclosure may illuminate the display 10 by diffusing light in the horizontal and vertical directions using the diffusion sheet 81. In addition, by arranging the plurality of second lens elements 31 in the zigzag pattern and using the diffusion sheet 81, a quantity of light at the ridges of the second lens elements 31 may supplement an insufficient quantity of light at the end portions of the second lens elements 31, thereby improving the in-plane uniformity.

According to the current embodiment of the disclosure, by passing light emitted from each line light source 51 of the light source unit 50 through the cylinder lens array 30, the lenticular sheet 40, and the diffusion sheet 81, a display range may become wider than an angle of view of the lenticular sheet 40. In addition, by passing light through the above-described components, a high-definition display may be possible. Accordingly, by dividing light emission from the light source unit 50 into fields and optimizing display content, a high-definition stereoscopic display having a depth may be implemented.

Fifth Embodiment

Thereafter, a stereoscopic display apparatus according to a fifth embodiment of the disclosure will be described. The stereoscopic display apparatus according to the current embodiment of the disclosure may display a stereoscopic image by time multiplexing.

Figure 29:
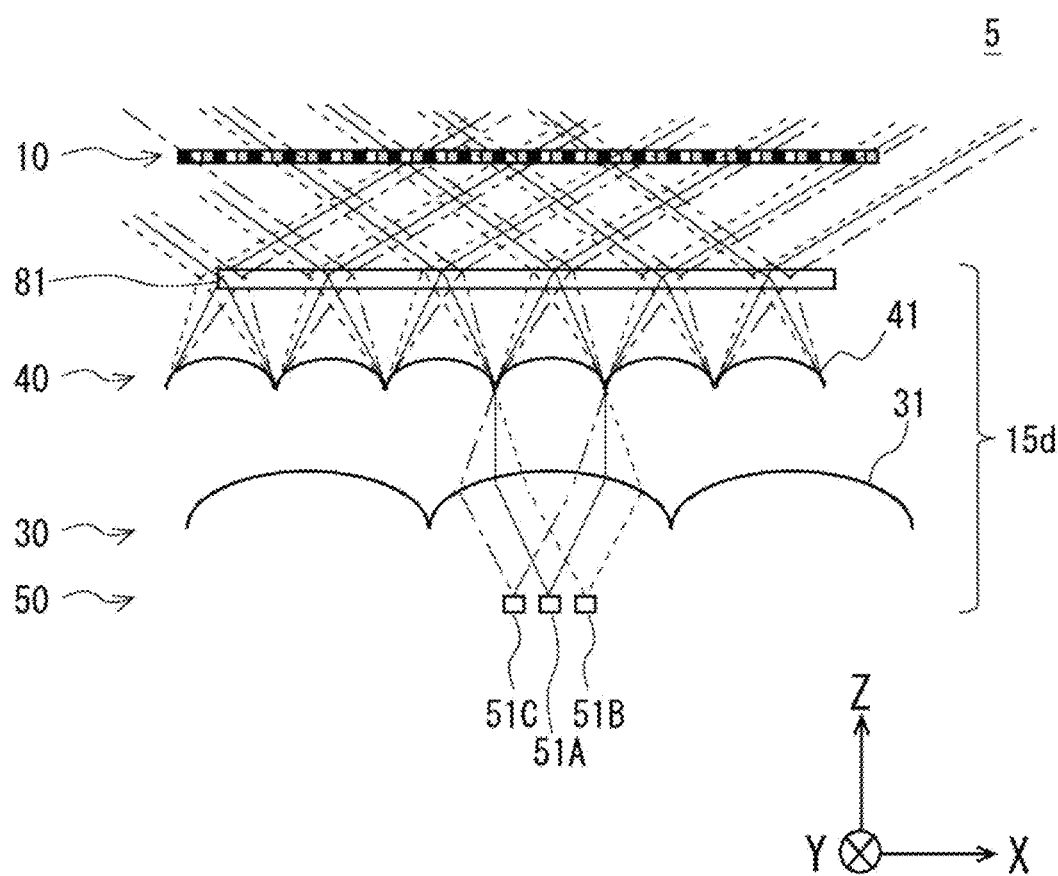
FIG. 29 is a cross-sectional view schematically illustrating a stereoscopic display apparatus according to an embodiment of the disclosure.

FIG. 29 is a cross-sectional view schematically illustrating a stereoscopic display apparatus according to an embodiment of the disclosure.

Referring to FIG. 29, a stereoscopic display apparatus 5 according to the current embodiment of the disclosure may include the display 10, the display driver 17, a light source controller 15*d*, and the light source driver 19.

The display driver 17 may display an elemental image of a stereoscopic image 92 on the display 10. The display driver 17 may display a plurality of elemental images that display the stereoscopic image 92 in different display directions, on the display unit 10. The display driver 17 may display a plurality of elemental images representing different angles or display positions of a stereoscopic image. The plurality of elemental images may be, for example, a plurality of first images. The light source controller 15*d* may include the lenticular sheet 40, the cylinder lens array 30, the plurality of line light sources 51, and the diffusion sheet 81. A plurality of line light sources 51 may be positioned on the rear surface of each second lens element 31. For example, the plurality of line light sources 51 may be arranged in the X-axis direction in an XY plane being parallel to the display 10. The light source driver 19 may sequentially drive the plurality of line light sources 51 that illuminate each elemental image. The light source driver 19 may sequentially drive each line light source 51 that illuminate each elemental image.

The light source driver 19 may cause the line light sources 51 positioned at relatively same positions on the rear surface of the cylinder lens array 30 to emit light. Light emitted from the line light sources 51A is indicated, for example, by solid lines in the drawing. Light emitted from the line light sources 51B is indicated, for example, by dotted lines. Light emitted from the line light sources 51C is indicated, for example, by alternated long and short dash lines in the drawing.

Light emitted from each line light source 51 may be collimated into parallel light by each second lens element 31 of the cylinder lens array 30. The light collimated into parallel light by each second lens element 31 may be condensed by each first lens element 41 of the lenticular sheet 40. The light condensed by each first lens element 41 may be condensed at each focal point at which the diffusion sheet 81 is positioned. The light condensed at each focal point may proceed to spread luminous flux. The diffusion sheet 81 for diffusing light may be positioned at a position including each focal point. Accordingly, diffused light transmitted through the diffusion sheet 81 may more widen luminous flux than in a case in which there is no diffusion sheet 81. The diffused light transmitted through the diffusion sheet 81 may enter the display 10. In this way, by using the diffusion sheet 18, a wide stereoscopic image may be displayed.

Referring to FIG. 29, three line light sources 51A to 51C are shown on the rear surface of one second lens element 31. A number of the line light sources 51 positioned on the rear surface of the second lens element 31 is not limited to three, but may be two or four or more.

While the line light source 51A on an optical axis of the second lens element 31 of the cylinder lens array 30 emits light, the light may be condensed at a light converging point on an optical axis of each first lens element 41 of the lenticular sheet 40. While the line light source 51B slightly deviating from the optical axis of the second lens element 31 emits light, an angle of parallel light may slightly deviate. The light may be condensed at a position deviating from the light converging point of the line light source 51A described above. Likewise, while the line light source 51C slightly deviating from the optical axis of the second lens element 31 emits light, an angle of the parallel light may slightly deviate. The light may be condensed at a position deviating from the light converging points of the line light sources 51A and 51B described above.

Accordingly, in the current embodiment of the disclosure, light converging points at which light from the plurality of line light sources 51 is condensed on the diffusion sheet 81 may deviate from each other. Light rays of elemental images may be reproduced from the light converging points. The stereoscopic image 92 may be recognized by a condensing pattern of the light converging points. The light emitted by the line light sources 51A-51C is synchronized with the display on the display 10, and the display is switched sequentially.

Figure 30:
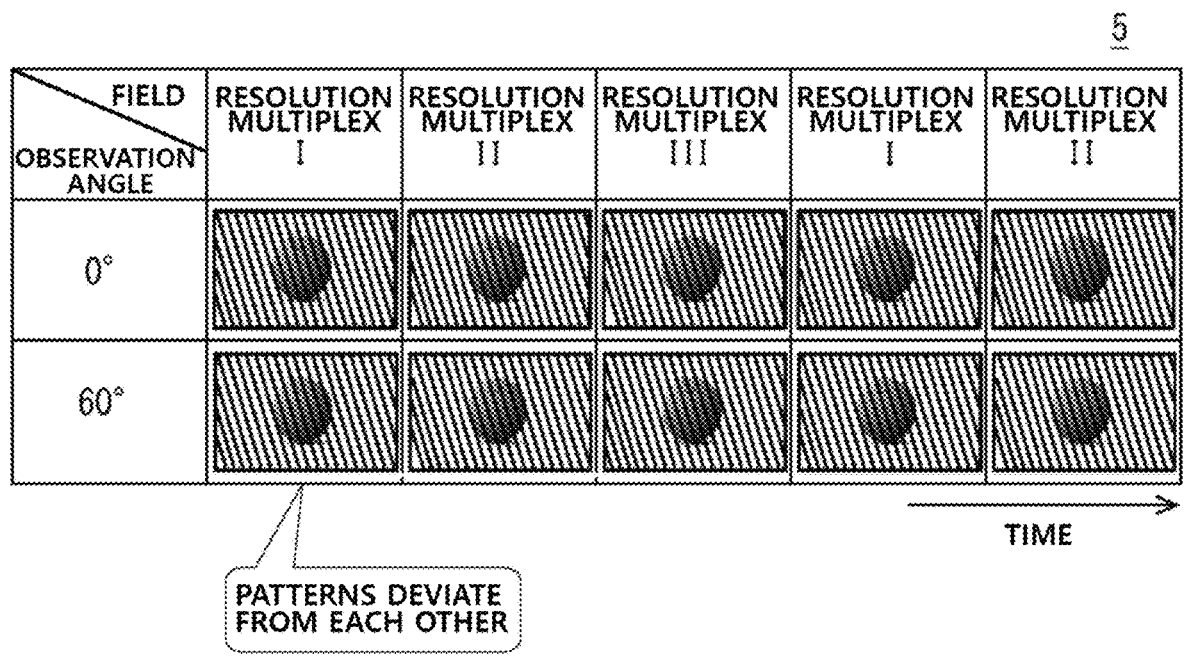
FIG. 30 illustrates a time multiplexed field control according to an embodiment of the disclosure.

FIG. 30 illustrates a time multiplexed field control according to an embodiment of the disclosure.

Referring to FIG. 30, a horizontal axis represents elapse of time. An upper part represents an observation angle of 0°, and a lower part represents an observation angle of 60°. Referring to FIG. 30, the stereoscopic display apparatus 5 may sequentially display an elemental image of resolution multiplex I by the line light source 51A, an elemental image of resolution multiplex II by the line light source 51B, and an elemental image of resolution multiplex III by the line light source 51C. Condensing patterns of the respective elemental images are observed to deviate from each other in each field. Referring to FIG. 30, for example, an apple stem is visible in the elemental image of resolution multiplex I and hidden in the elemental image of resolution multiple II. Accordingly, because pixels are interpolated between patterns of elemental images in a stereoscopic image according to light condensing positions, a stereoscopic image 92 with resolution multiplexing may be displayed.

In this way, the display driver 17 may display a plurality of elemental images indicating display positions of the stereoscopic image 92. The display driver 17 may display a plurality of elemental images including a first elemental image and a second elemental image on the display 10 while switching the plurality of elemental images. The light source driver 19 may drive light sources that illuminate the elemental images. Specifically, the light source driver 19 may sequentially drive the plurality of light sources that illuminate the respective elemental images. The light source driver 19 may sequentially drive a plurality of line light sources 51 including a first line light source 51 for illuminating the first elemental image and a second light source for illuminating the second elemental image. The display driver 17 may also display the plurality of elemental images by switching the elemental images through field division. The light source driver 19 may turn on a line light source 51 corresponding to an elemental image after switching according to field switching.

Figure 31:
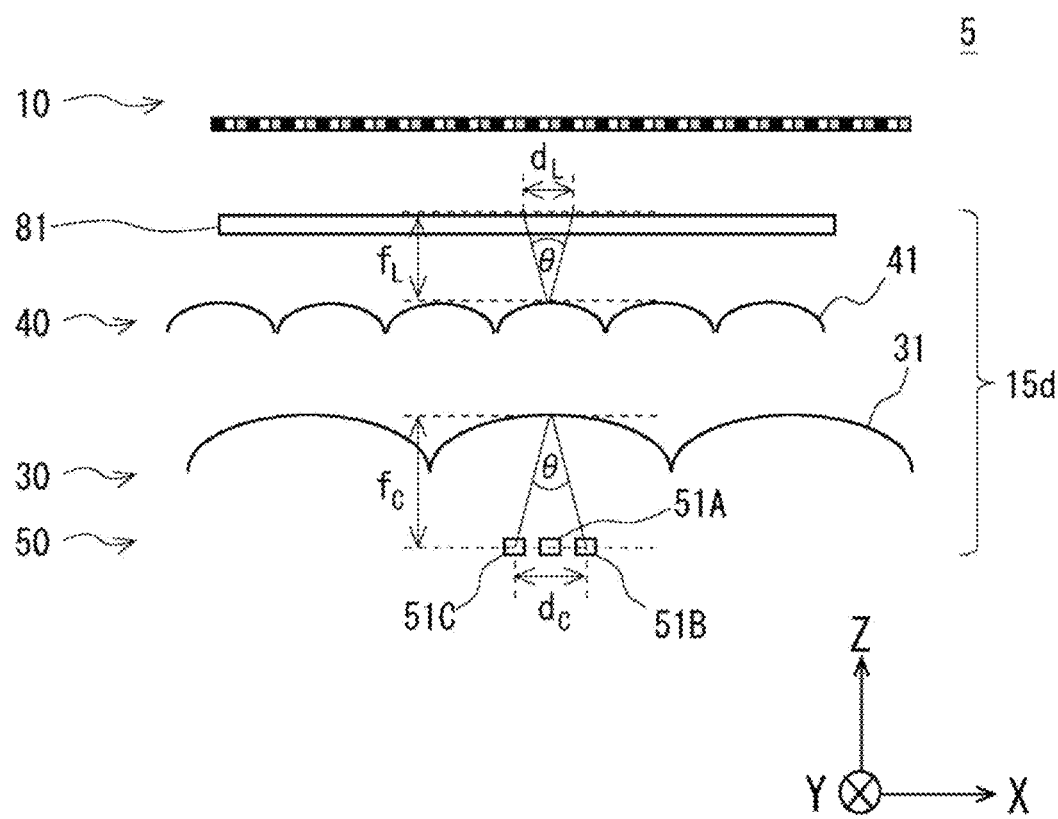
FIG. 31 illustrates a light converging point displacement width and an installation width of a light source of a light source controller in a stereoscopic display apparatus according to an embodiment of the disclosure.

FIG. 31 illustrating a light converging point displacement width $d_L$ and an installation width $d_C$ of a line light source of a light source controller in a stereoscopic display apparatus according to an embodiment of the disclosure.

Referring to FIG. 31, by using a width capable of correcting an elemental image width of the lenticular sheet 40 as a light converging point displacement width $d_L$, a focal distance $f_L$, of the lenticular sheet 40, which generates no crosstalk without installing the shielding plate 82, may be set. In addition, in a case in which the installation width $d_C$ of the line light source 51 is set to a size of the line light source 51, a focal distance $f_C$ of the cylinder lens array 30 may be expressed by Equations 6 and 7 because each triangle has a similarity relation.

$$d_L/f_L = d_c/f_c \qquad \text{(6) Equation 6}$$

$$f_c = f_L d_c/d_L \qquad \text{(7) Equation 7}$$

As such, a ratio of the distance $f_C$ between the cylinder lens array 30 and columns of the plurality of line light sources 51 with respect to the installation width $d_C$ between line light sources 51 located at both ends of the plurality of line light sources 51 arranged in one direction (X-axis direction) in a plane being parallel to the display 10 may be identical to a ratio of the distance $f_L$, between the diffusion sheet 81 and the lenticular sheet 40 with respect to the light converging point displacement width dL between light converging points located at both ends of light converging points of the plurality of line light sources 51 on the diffusion sheet 81. The meaning of 'identical in distance and ratio' should be interpreted to include, as well as 'exactly identical', 'identical within an error range by the shapes of members' and 'identical within a manufacturing error range'.

Figure 32:
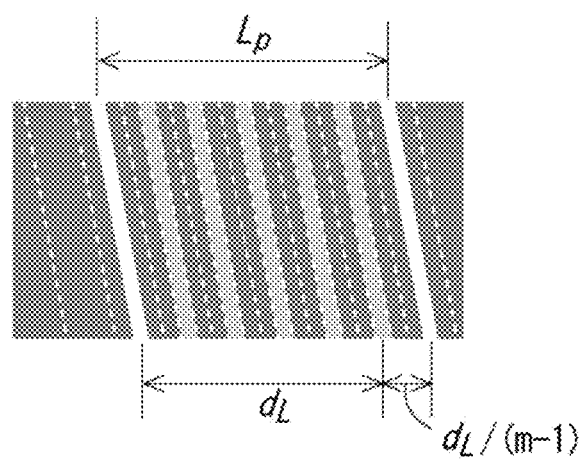
FIG. 32 illustrates a condensing pattern in a stereoscopic display apparatus according to an embodiment of the disclosure.

FIG. 32 illustrates a condensing pattern in a stereoscopic display apparatus according to an embodiment of the disclosure.

Referring to FIG. 32, the light converging point displacement width $d_L$ between the light converging points on the diffusion sheet 81 may be represented by a lens pitch $L_p$ of the lenticular sheet 40. In this case, upon time multiplexing in m fields wherein m is an arbitrary integer, line light sources may be arranged at equal intervals obtained by dividing the lens pitch $L_p$ by m, thereby supplementing a resolution at equal intervals. In this case, because the distance between the line light sources 51 is $d_L/(m-1)$, the light converging point displacement width $d_L$ may be expressed by Equations 8 and 9. To design a light converging surface arranged in this way, a focal distance of the cylinder lens may be designed by substituting the light converging point displacement width $d_L$ obtained by Equations 8 and 9 into Equation 7.

$$d_L + d_L/(m-1) = L_p \quad \text{(8) Equation 8}$$

$$d_L = L_p/(1 + 1/(m-1)) \quad \text{(9) Equation 9}$$

In a case in which an element pixel pitch is 3 pixels, by supplementing pixels at equal intervals with an elemental image width of 3 fields, a stereoscopic display with the same resolution as that of the display 10 may be possible. There is a limit to reaction speed of liquid crystal in the display 10, such as LCD, and it is easy to feel flicker when time multiplexing is performed with view field multiplexing.

Figure 33:
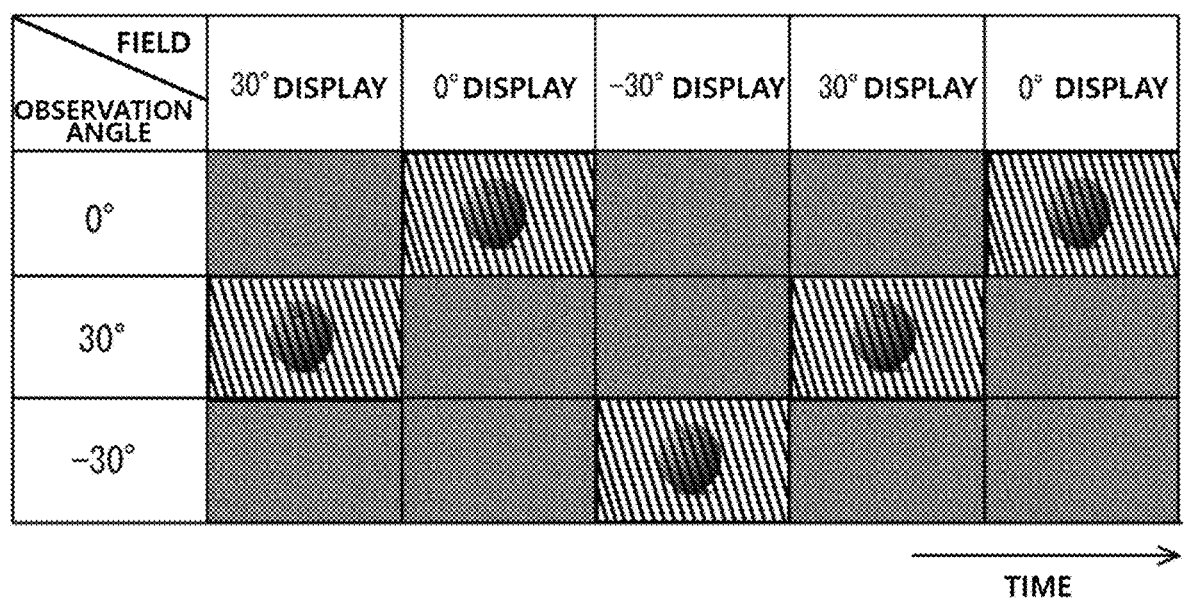
FIG. 33 illustrates screen displays resulting from time multiplexing on view field multiplexing in a stereoscopic display apparatus according to an embodiment of the disclosure.

FIG. 33 illustrates screen displays resulting from time multiplexing on view field multiplexing in a stereoscopic display apparatus according to an embodiment of the disclosure.

Referring to FIG. 33, as a result of angle multiplexing with three fields of −30°, 0°, and +30°, other displays except for those of angles being displayed may be recognized as black screens. Because great brightness changes appear in the entire screen, flicker may be easily felt in the stereoscopic display apparatus according to the comparative example. Meanwhile, referring to FIG. 30, the stereoscopic display apparatus 5 according to the current embodiment of the disclosure, which corresponds to the case of resolution multiplexing, may have small brightness changes in the entire screen and hardly show flicker even while displaying using the same fields.

According to the current embodiment of the disclosure, a resolution may be improved by using time multiplexing by resolution multiplexing. Other configurations and effects than the above-described those of the current embodiment of the disclosure may be included in the above description about the first to fourth embodiments of the disclosure.

Sixth Embodiment

Hereinafter, a stereoscopic display apparatus according to a sixth embodiment of the disclosure will be described.

Figure 34:
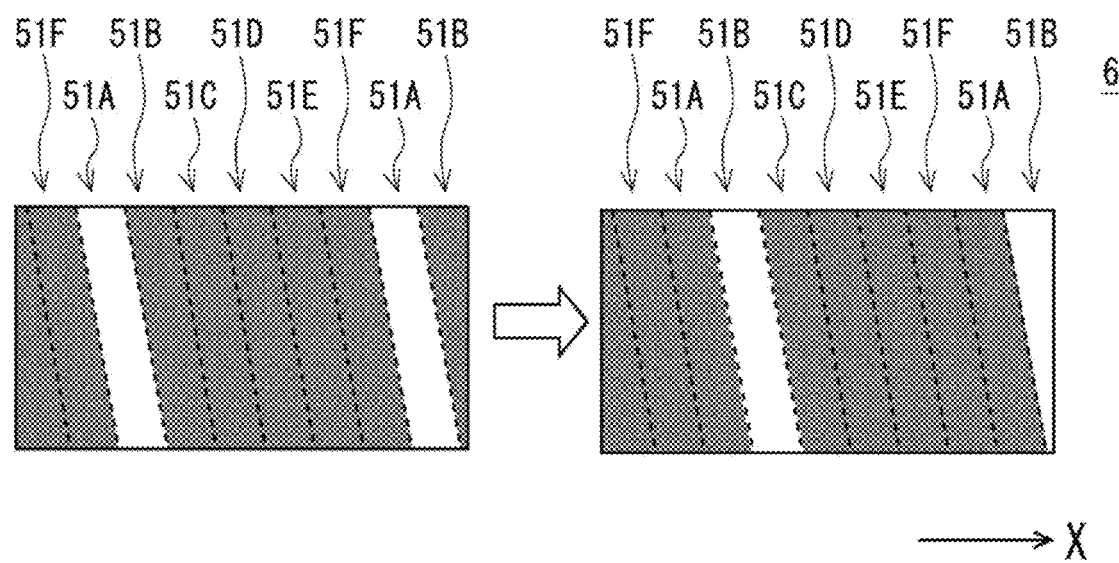
FIG. 34 illustrates a condensing pattern in a stereoscopic display apparatus according to an embodiment of the disclosure.
Figure 35:
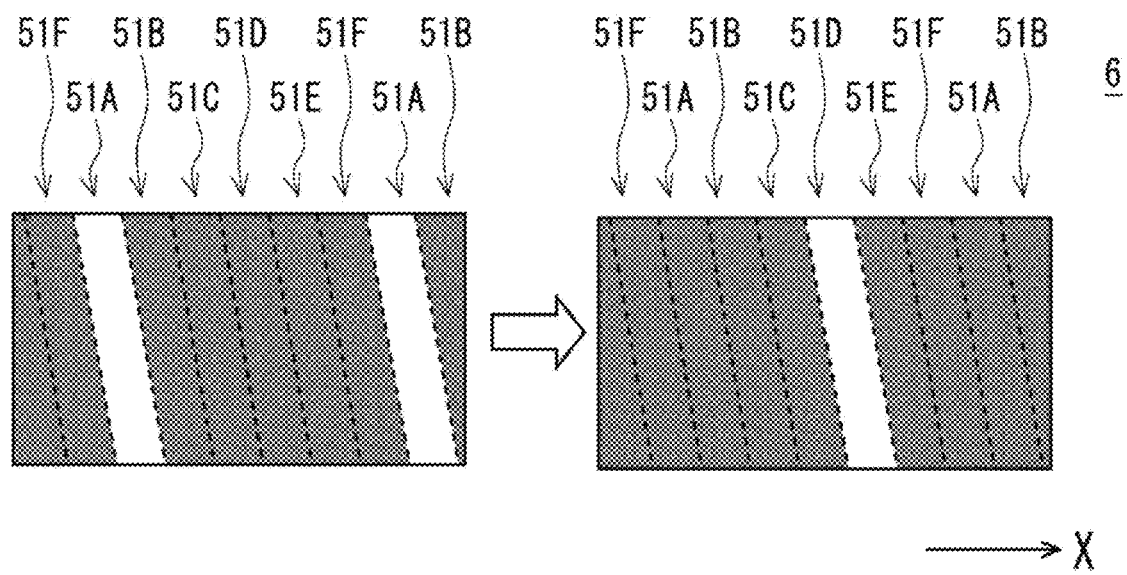
FIG. 35 illustrates a condensing pattern in a stereoscopic display apparatus according to an embodiment of the disclosure.

FIGS. 34 and 35 illustrate condensing patterns in a stereoscopic display apparatus according to various embodiments of the disclosure. For example, in a stereoscopic display apparatus 6 according to the current embodiment of the disclosure, six line light sources 51A to 51F may be arranged on the rear surface of each second lens element 31 of the cylinder lens array 30. The line light sources 51A to 51F may be arranged in this order in the X-axis direction.

Referring to FIG. 34, the line light sources 51A may emit light at a preset time to display an elemental image. At a next timing, the line light sources 51B next to the line light sources 51A in the +X-axis direction may emit light to display an elemental image. In this way, in a case in which a pitch of an elemental image is divided into 6, a condensing pattern may be turned on upon a field change to an adjacent position. In this case, because an amount of displacement of the condensing pattern is small and the speed is low, there may be a possibility that the moving line light sources 51 are followed with the eyes.

Referring to FIG. 35, the line light sources 51A may emit light at a preset time to display an elemental image. At a next timing, the line light sources 51D being third ones from the line light sources 51A in the +X-axis direction may emit light to display an elemental image. In this way, in a case in which a pitch of an elemental image is divided into 6, a condensing pattern may be turned on at about ½ pitch position of the pitch of the elemental image. Through such turning-on, an absolute value of an amount of displacement of a condensing pattern may become a maximum, and accordingly, it may be difficult to follow the moving line light sources 51 with the eyes.

For example, in a case in which a width between the line light sources 51 at both ends of the plurality of line light sources 51 positioned on the rear surface of each second lens element 31 is one pitch, the light source driver 19 may drive line light sources 51 and then drive line light sources 51 located at positions spaced by at least half a pitch from the driven line light sources 51. At this time, while the light source driver 19 sequentially drives the plurality of line light sources 51, the light source driver 19 may drive line light sources 51 and then drive line light sources 51 spaced by at least one line light source 51 from the driven line light sources 51.

By performing such a control of a condensing pattern and performing a display incapable of being followed with the eyes as possible, an effect of resolution multiplexing may be improved. In addition, by identifying a motion of a displayed image as a control of a condensing pattern and applying resolution multiplexing only to a part being in a still state, resolution deterioration of video may be prevented.

Seventh Embodiment

Hereinafter, a stereoscopic display apparatus according to a seventh embodiment of the disclosure will be described. The stereoscopic display apparatus 100 according to the current embodiment of the disclosure may use a Holographic Optical Element (HOE). The stereoscopic display apparatus may be configured with an imaging optical system including the cylinder lens array 30 and the lenticular sheet 40. In this case, the cylinder lens array 30 and the lenticular sheet 40 may need to be spaced apart to improve uniformity. As a result, a thickness of the light source controller 15 may increase. Therefore, the imaging optical system including the cylinder lens array 30 and the lenticular sheet 40 may be replaced with a HOE. The HOE may reduce the thickness of the light source controller 15 by inversely calculating mura occurring during reproduction and recording the mura during recording, thereby reducing mura during reproduction.

Figure 36:
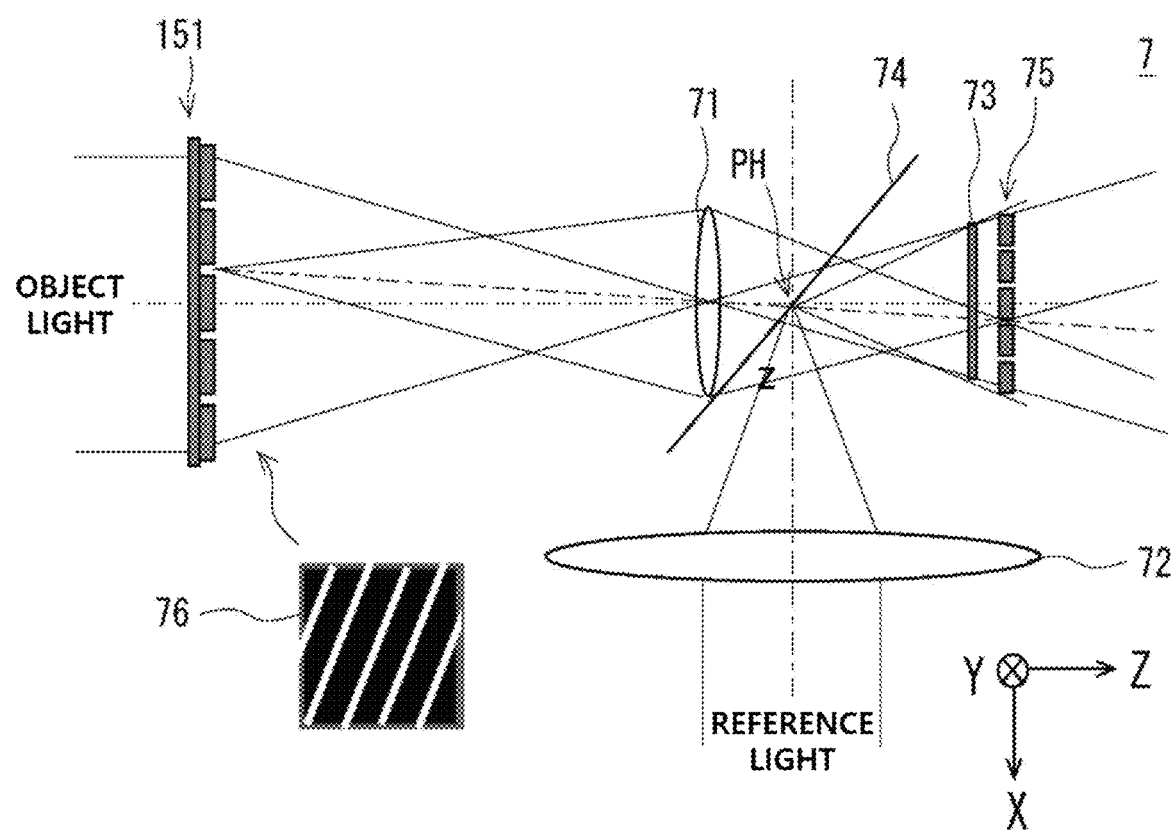
FIG. 36 is a configuration view illustrating a recording optical system in a stereoscopic display apparatus according to an embodiment of the disclosure.
Figure 37:
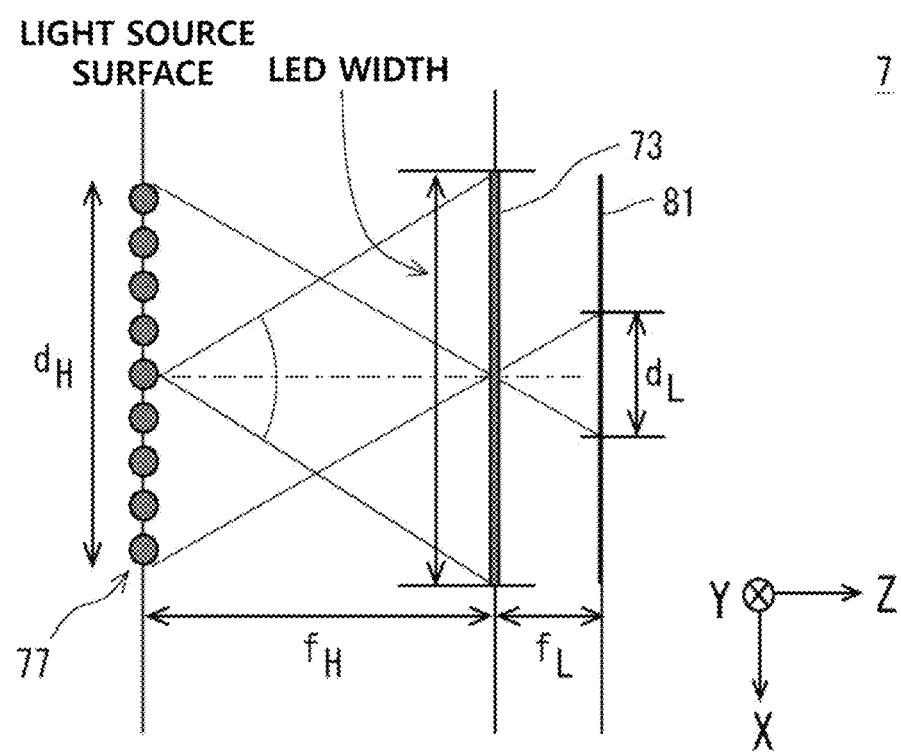
FIG. 37 is a configuration view illustrating a reproduction optical system in a stereoscopic display apparatus according to an embodiment of the disclosure.

FIG. 36 is a configuration view illustrating a recording optical system of a HOE in a stereoscopic display apparatus according to an embodiment of the disclosure. FIG. 37 is a configuration view illustrating a reproduction optical system in a stereoscopic display apparatus according to an embodiment of the disclosure.

Referring to FIGS. 36 and 37, a stereoscopic display apparatus 7 according to the current embodiment of the disclosure may include, as a reproduction optical system, a HOE recorded by a recording optical system. The recording optical system may record a condensing pattern formed by, for example, the cylinder lens array 30 and the lenticular sheet 40 in a HOE, such as a photopolymer 73. The reproduction optical system may reproduce the condensing pattern recorded in the HOE by point light sources, such as LEDs.

Referring to FIG. 36, the recording optical system may include a lens 71, a lens 72, the photopolymer 73, and a half mirror 74. The photopolymer 73 may function as a HOE by recording a hologram. A plurality of line light sources 151 of a condensing pattern 76 that is formed by the lenticular sheet 40 may be created. Then, object light including the line light sources 151 may be formed as a real image 75 inside the photopolymer 73 by the lens 71. At this time, light from the lens 71 on an optical axis of the object light including the line light sources 151 may interfere with reference light condensed at a point PH by the lens 72 toward the photopolymer 73. Accordingly, an interference fringe formed by the real image 75 of the condensing pattern of the line light sources 151 and the reference light may be recorded on the photopolymer 73. Because the real image 75 of the line light sources 151 is designed to have the same magnification as the condensing pattern formed by the cylinder lens array 30 and the lenticular sheet 40 in the stereoscopic display apparatus 7, the condensing pattern formed by the cylinder lens array 30 and the lenticular sheet 40 may be reproduced upon illumination of point light sources, by recording reference light of the same convergent light as the point light sources upon reproduction.

Referring to FIG. 37, the reproduction optical system may include a LED 77, the photopolymer 73, and the diffusion sheet 81. In the actual stereoscopic display apparatus 7, the reproduction optical system may be installed on rear surfaces of a plurality of displays as a backlight to display stereoscopic images as in the stereoscopic display apparatus described above. In the reproduction optical system, the LED 77 may be arranged at a position corresponding to the point PH of the recording optical system. A plurality of LEDs 77 may be arranged at approximately the same distance as the point PH. Each LED 77 may be regarded as a point light source for reproducing the real image 75, and illuminate the photopolymer 73. By illuminating the photopolymer 73 with each LED 77, the real image 75 of the line light source 151 recorded on the photopolymer 73 may be reproduced. The diffusion sheet 81 may be positioned to one side of the photopolymer 73 in the +Z-axis direction. The display 10 may be positioned on one side of the diffusion sheet 81 in the +Z-axis direction. Accordingly, the reproduced real image 75 illuminates the display 10 after forming an image on the diffusion sheet 81 and being diffused. Because positions of the line light sources 151 to be reproduced change according to illumination positions of the LEDs 77, it may be possible to reproduce different condensing pattern positions. Therefore, a stereoscopic display with resolution multiplexing may be possible.

Under an assumption that a LED installation width of a light source surface on which the LEDs 77 are arranged is dx, a distance from the photopolymer 73 to the diffusion sheet 81 is $f_L$, and an elemental image width is $d_L$, a distance $f_H$ from the light source surface to the photopolymer 73 may be expressed by Equations 10 and 11 below. In this case, like the case of non-hologram, as shown in FIG. 32, a light converging point displacement width $d_L$ between light converging points on the diffusion sheet 81 may be represented by the lens pitch $L_p$ of the lenticular sheet 40. At this time, upon time multiplexing into m fields wherein m is an arbitrary integer, the line light sources may be arranged at equal intervals obtained by dividing $L_p$ by m to thereby supplement a resolution at equal intervals. In this case, because a distance between the line light sources is $d_L/(m-1)$, the light converging point displacement width dL may be expressed by Equations 8 and 9. To design a light condensing surface arranged in this way, a focal distance of the cylinder lens may be designed by substituting the light converging point displacement width dL obtained from Equations 8 and 9 into Equation 11.

$$f_H/d_H = f_1/d_L \quad (10) \text{ Equation 10}$$

$$f_H = d_H f_1/d_L \quad (11) \text{ Equation 11}$$

The use of thick holograms with high efficiency may raise angular selectivity and reduce the width dx. A case in which the light source installation range is reduced with respect to the width of the HOE may also be considered. Reproduction using a monolithic micro LED display that allows a fine control may be also considered. Therefore, the stereoscopic display apparatus 7 according to the current embodiment of the disclosure may record functions of the first cylinder lens and the second cylinder lens in the HOE to be reproduced by the light sources, and may further include the HOE positioned between the light sources and the display 10, instead of the first cylinder lens and the second cylinder lens. Accordingly, a stereoscopic display may be performed using the HOE.

According to the stereoscopic display apparatuses of the first to seventh embodiments described above, a display range of the line light sources 51 may be wider than an angle of view of the lenticular sheet 40 by the cylinder lens array 30, the lenticular sheet 40, and the diffusion sheet 81. In addition, it is possible to display different elemental images by light from different condensing positions by illumination of the respective line light sources 51, and light emission of the line light sources 51 may be divided according to fields and displayed. Accordingly, a high-resolution and high-definition stereoscopic display having a depth may be possible.

Eighth Embodiment

Hereinafter, an eighth embodiment of the disclosure will be described. The current embodiment of the disclosure is an example of making it difficult to feel flicker by setting a turning-on pattern of light sources in the sixth embodiment described above with a specific shift amount.

Figure 38:
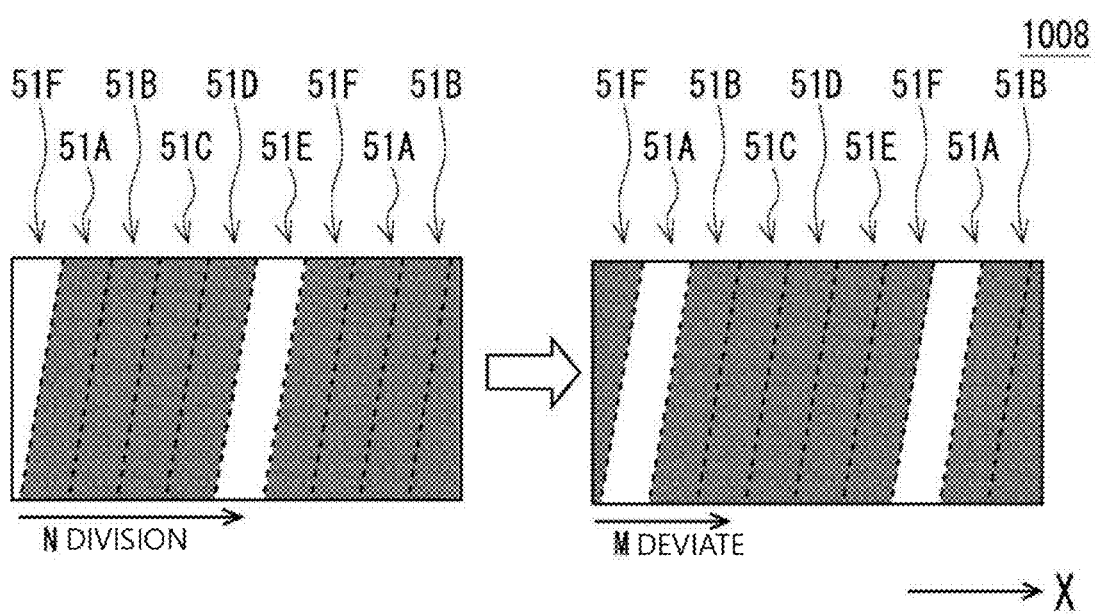
FIG. 38 illustrates a condensing pattern in a stereoscopic display apparatus according to an embodiment of the disclosure.

FIG. 38 illustrates a condensing pattern in a stereoscopic display apparatus according to an embodiment of the disclosure.

Referring to FIG. 38, the condensing pattern may be repeatedly illuminated at intervals of the lenticular sheet 40, and divided by a number of the light sources and illuminated. A number into which the condensing pattern is divided is represented by N. A state in which N columns of light sources are arranged on a rear surface of a condensing lens is assumed. In a case in which illumination is switched by field division and displayed, and a light source next to a light source illuminated in a previous field is illuminated, a left view in FIG. 38 corresponds to an illumination condition of the previous field and an illumination condition of the next field corresponds to a right view in FIG. 38. Because illumination is performed with adjacent light sources divided into N as a condensing pattern, a part shifted by one may be illuminated. The shift amount is represented by M. Accordingly, M and N are integers.

Figure 39:
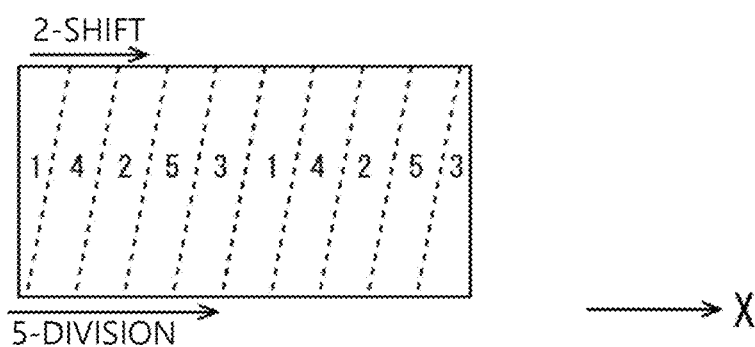
FIG. 39 illustrates a 5-division and 2-shift turning-on sequence in a stereoscopic display apparatus according to an embodiment of the disclosure.

FIG. 39 illustrates a 5-division 2-shift turning-on sequence in a stereoscopic display apparatus according to an embodiment of the disclosure.

Referring to FIG. 39, numbers denoted in the drawing represent numbers of fields that are turned on. In this example, number 1 to number 5 are turned on sequentially, and then again number 1 is turned on. Because the greater shift number results in a greater turning-on interval between fields, visual speed may increase. Referring to FIG. 38, N-division and M-shift, which satisfy the following conditions, may be considered.

1) mod (M, N)≠0, that is, the rest of M/N is not zero.
2) The absolute value of M is a maximum value of N/2 or less. However, if M>N/2, mod (M, N) is equal to (N−M) to be considered as negative, and the maximum value of |M| (absolute value) is N/2.

Conditions satisfying both conditions (1) and (2) may be preferable.

For example, turning-on sequences of light sources, such as 10-division and 4-shift, 9-division and 4-shift, 8-division and 3-shift, 7-division and 3-shift, and 5-division and 2-shift, may satisfy the conditions. FIG. 39 represents 5-division and 2-shift that satisfies the conditions.

A reason of condition (1) may be as follows. For example, if M/N is divisible, lighting cannot be performed at regular intervals, so the speed becomes discontinuous and flicker is easily perceived.

A reason of condition (2) may be as follows. For example, the reason may be because visual speed increases as M increases.

As such, in a case in which there are N light sources in a width between light sources located at both ends of a plurality of light sources arranged in one direction in a plane being parallel to the display 10, the light source driver 19 may sequentially drive light sources located at positions shifted by a shift amount M from driven light sources, wherein N is an integer incapable of being divided by M, and the absolute value of M is a maximum value of N/2 or less. In a case in which M is greater than or equal to N/2, M may be considered as a negative integer of (N−M).

According to the stereoscopic display apparatus 1008 according to the current embodiment of the disclosure, it may be possible to make it difficult to perceive flicker. Generally, humans feel flicker at 50 Hz or less. However, even in the case of 50 Hz or less, it may be difficult to feel flicker because fine patterns being below a range of human visual acuity are incapable of being resolved, and similarly, because motion patterns being below dynamic visual acuity are incapable of being recognized, it may be difficult to feel flicker. Generally, in a case in which a pattern interval is less than or equal to visual acuity (visual acuity 1.0 per minute), the pattern may be not resolved. Patterns of 5° (Degree)/s as dynamic visual acuity may be not recognized. Observing a display from a distance may reduce an angular interval of a pattern, and observing the display closely may increase an angular velocity of the pattern. Therefore, it is possible to make it difficult to feel flicker by increasing visual speed by a specified shift number and maintaining a pattern at constant speed.

Ninth Embodiment

Hereinafter, a ninth embodiment of the disclosure will be described.

Figure 40:
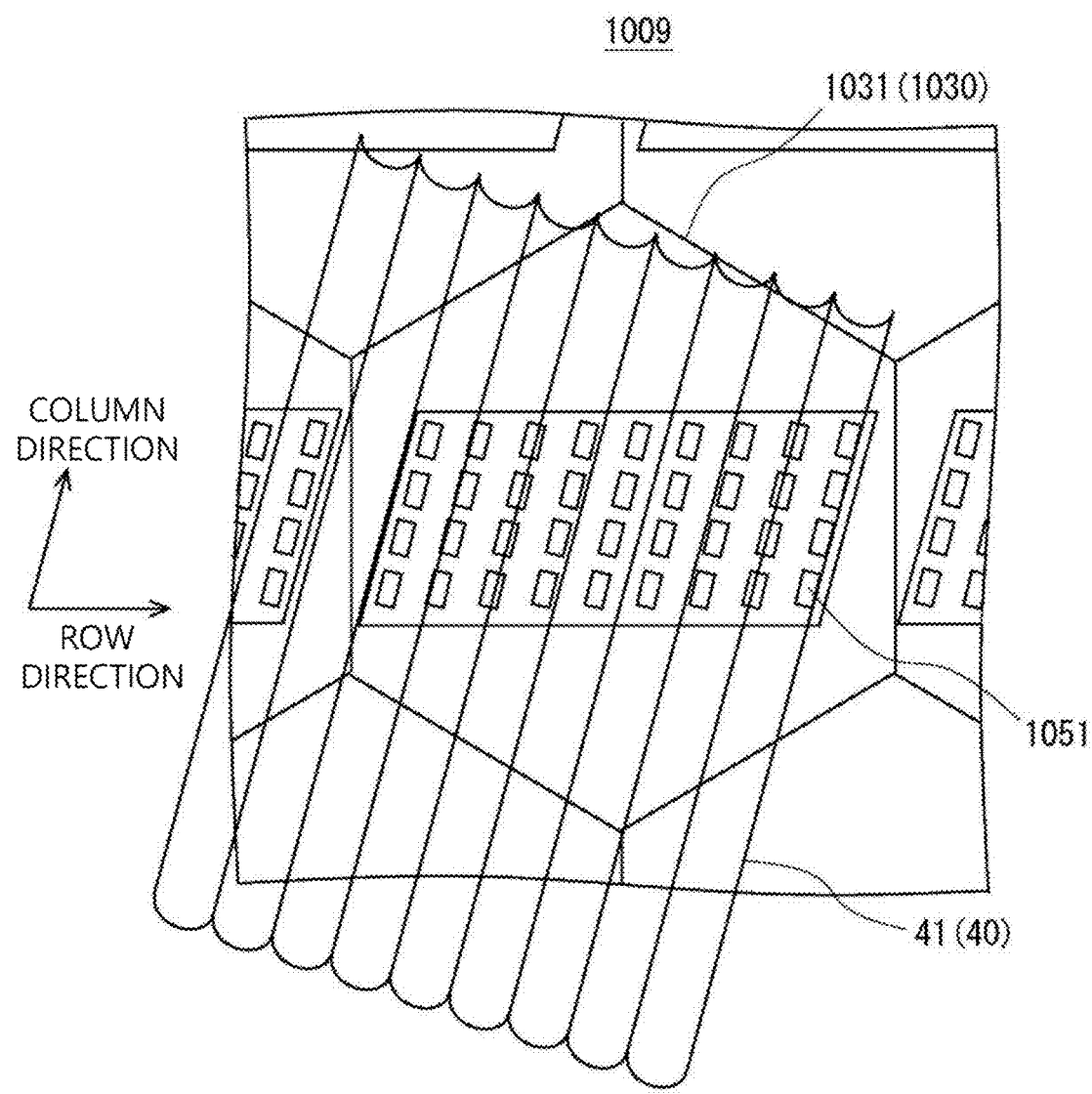
FIG. 40 is a plane view illustrating an arrangement of a lenticular sheet of a first lens array, condensing lenses of a second lens array, and light sources in a stereoscopic display apparatus according to an embodiment of the disclosure.
Figure 41:
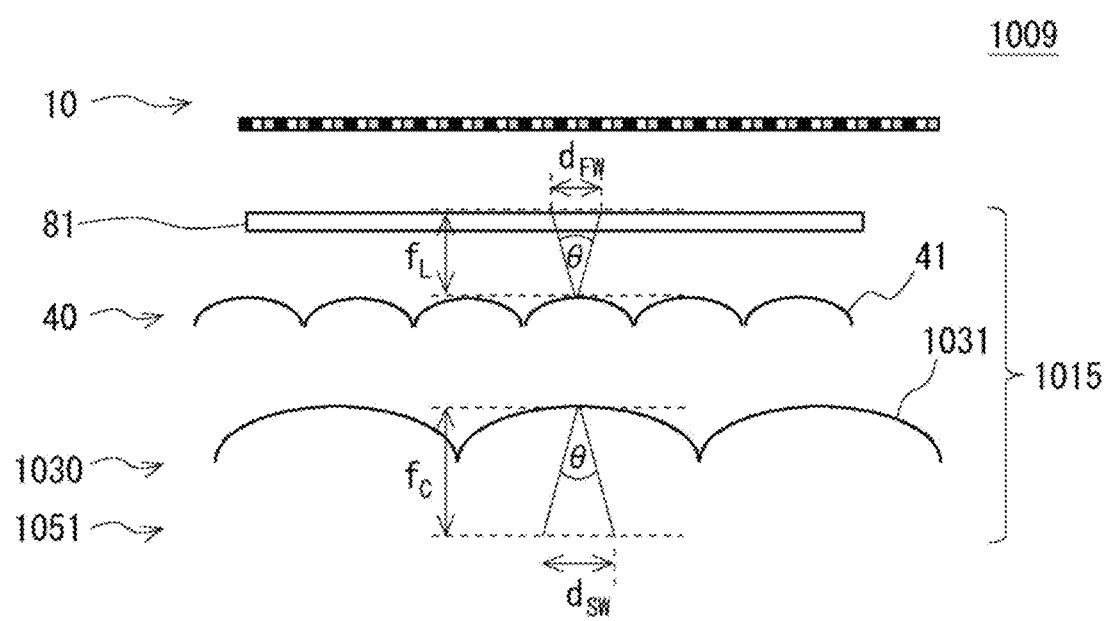
FIG. 41 is a cross-sectional view schematically illustrating an arrangement of a display, a diffusion sheet, a lenticular sheet of a first lens array, condensing lenses of a second lens array, and light sources in a stereoscopic display apparatus according to an embodiment of the disclosure.
Figure 42:
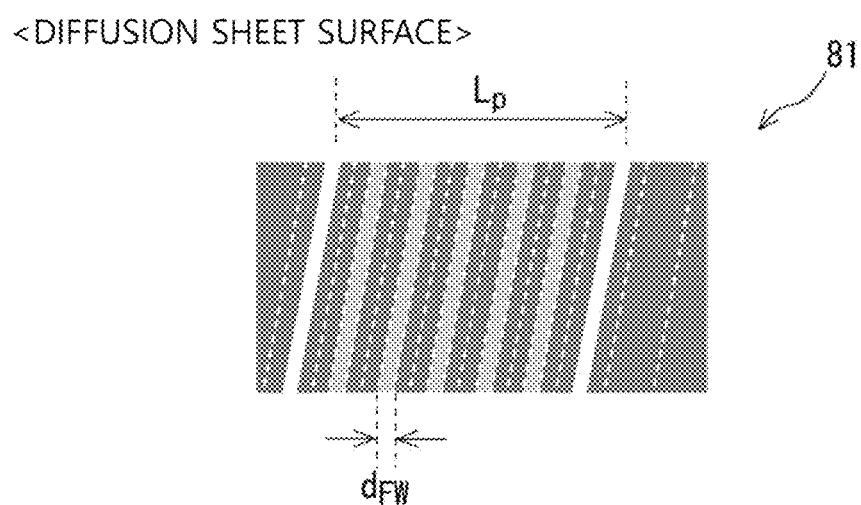
FIG. 42 illustrates a condensing pattern of a diffusion sheet surface in a stereoscopic display apparatus according to an embodiment of the disclosure.
Figure 43:
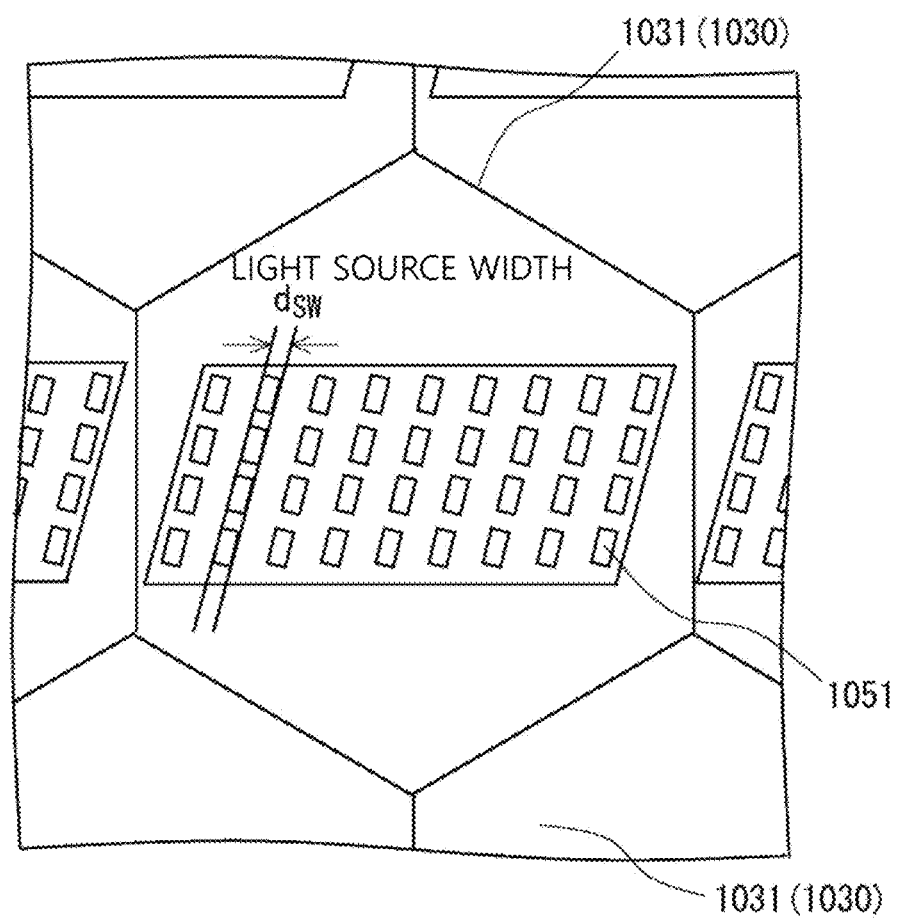
FIG. 43 is a plane view illustrating an arrangement of light sources and condensing lenses of a second lens array in a stereoscopic display apparatus according to an embodiment of the disclosure.
Figure 44:
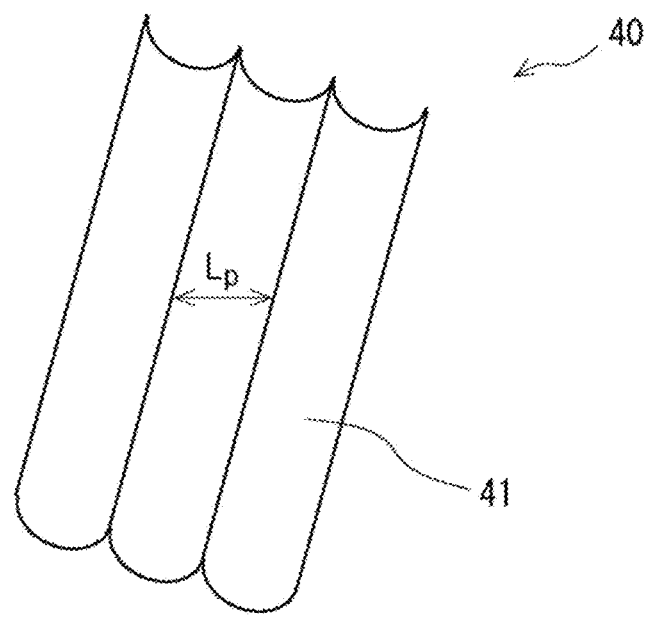
FIG. 44 is a plane view illustrating an arrangement of a lenticular sheet of a first lens array in a stereoscopic display apparatus according to an embodiment of the disclosure.
Figure 45:
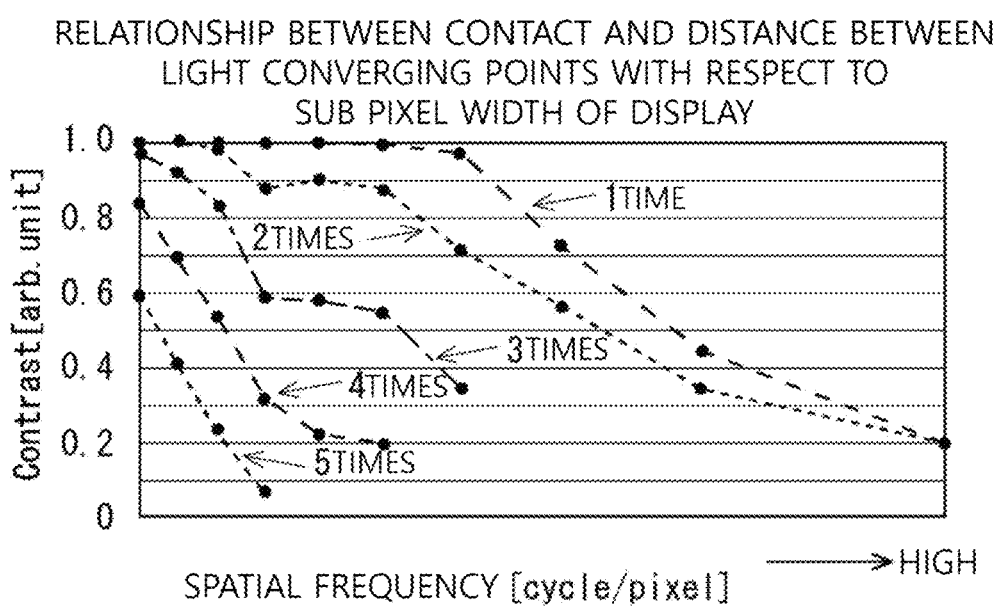
FIG. 45 is a graph illustrating contrast in a stereoscopic display apparatus, wherein a horizontal axis represents spatial frequency and a vertical axis represents contrast according to an embodiment of the disclosure.

FIG. 40 is a plane view illustrating an arrangement of a lenticular sheet of a first lens array, condensing lenses of a second lens array, and light sources in a stereoscopic display apparatus according to an embodiment of the disclosure. FIG. 41 is a cross-sectional view schematically illustrating an arrangement of a display, a diffusion sheet, a lenticular sheet of a first lens array, condensing lenses of a second lens array, and light sources in a stereoscopic display apparatus according to an embodiment of the disclosure. FIG. 42 illustrates a condensing pattern of a diffusion sheet surface in a stereoscopic display apparatus according to an embodiment of the disclosure. FIG. 43 is a plane view illustrating an arrangement of light sources and condensing lenses of a second lens array in a stereoscopic display apparatus according to an embodiment of the disclosure. FIG. 44 is a plane view illustrating an arrangement of a lenticular sheet of a first lens array in a stereoscopic display apparatus according to an embodiment of the disclosure. FIG. 45 is a graph illustrating contrast in a stereoscopic display apparatus according to an embodiment of the disclosure, wherein a horizontal axis represents spatial frequency and a vertical axis represents contrast.

Referring FIGS. 40 and 41, in the stereoscopic display apparatus 1009 according to the current embodiment of the disclosure, a light source controller 1015 may include the diffusion sheet 81, the lenticular sheet 40 as the first lens array, and a plurality of second condensing lenses 1030 as the second lens array, and a plurality of light sources 1051. The second lens array may be configured with a honeycomb lens array. The plurality of condensing lenses 1030 included in the second lens array may be regular hexagonal lenses 1031. Accordingly, the second lens array may include a plurality of regular hexagonal lenses 1031 arranged at a pitch that is wider than that of the first lens elements (first cylinder lenses) 41 of the lenticular sheet 40. The plurality of regular hexagonal lenses 1031 may be arranged in a zigzag pattern in a pixel arrangement direction of the display 10.

In the current embodiment of the disclosure, each light source 1051 may have a minute rectangular shape or a point shape. The plurality of light sources 1051 may be arranged in a plurality of rows and columns in a matrix form in a column direction and in a row direction crossing the column direction in a plane being parallel to the display 10. A plurality of light sources 1051 arranged in the same column may be driven to be turned on simultaneously. The ridges of the plurality of first lens elements (first cylinder lenses) 41 of the first lens array may extend in the column direction. By the configuration, the stereoscopic display apparatus 1009 according to the current embodiment of the disclosure may have characteristics as follows.

1) The condensing lenses 1030 of the second lens array may be arranged in a honeycomb lens array, that is, a honeycomb-shaped array. Therefore, an efficient arrangement of the lenses 1030 may be possible. Accordingly, a quantity of light may be improved without mura.
2) The light sources 1051 may be arranged along an inclination of the ridges of the lenticular sheet 40. Accordingly, a quantity of light entering the condensing lenses 1031 may be improved. Because the arrangement of the light sources 1051 along the inclination of the ridges of the lenticular sheet 40 prevents a condensing width from being widened, crosstalk may be reduced. Accordingly, crosstalk may be reduced without any slit. The reason may be because the rows of the light sources 1051 positioned along the inclination of the ridges of the lenticular sheet 40 is located at substantially focal distances of the condensing lenses 1030, and parallel light from each of the light sources 1051, illuminating the diffusion sheet 81 positioned at a substantially focal distance of the lenticular sheet 40 by the lenticular sheet 40, becomes light condensed on the ridges of the lenticular sheet 40.

As described above, in a case in which the plurality of light sources 1051 are installed at the substantially focal distances of the condensing lenses 1030, light from each of the light sources 1051 is illuminated as parallel light, and the diffusion sheet 81 is installed at the substantially focal distance of the lenticular sheet 40, a positional relationship between the light sources 1051 and the condensing lenses 1030 may be similar to a positional relationship between the lenticular sheet 40 and the diffusion sheet 81. Accordingly, as shown in FIGS. 41 to 44, a ratio $d_{SW}/f_C$ of a distance $f_C$ between the second lens array and the columns of the plurality of light sources 1051 with respect to a width $d_{SW}$ between light sources 1051 located at both ends of a plurality of light sources 1051 arranged in another direction in a plane being parallel to the display 10 may be identical to a ratio $d_{FW}/f_L$ of a distance $f_L$ between the diffusion sheet 81 and the first lens array with respect to a width $d_{FW}$ between light converging points located at both ends of light converging points of the plurality of light sources 1051 on the diffusion sheet 81. For example, the following Equation 12 may be satisfied.

$$d_{FW}/f_L = d_{SW}/f_c$$

$$f_c = f_L d_{SW}/d_{FW} \qquad \text{Equation 12}$$

Referring to FIG. 45, in a case in which a width between light converging points is one or two times of a sub pixel width of the display 10, contrast may increase from a range shown in the drawing. Meanwhile, in a case in which the width between the light converging points is 3 times or more of the sub pixel width of the display 10, contrast may be maintained in a low level. Accordingly, in a case in which the width d F w between the light converging points is two times or less of the sub pixel width of the display 10, contrast may be improved. In this way, a high-definition 3D display may be possible with low crosstalk. In addition, because crosstalk is proportional to a light condensing width and a minimum unit of a sampling interval of the display 10 is the sub pixel width, the sub pixel width or less of the display 10 may be not proportional. Accordingly, by considering the relationship, optimal condensing lenses 32 may be optically designed.

Tenth Embodiment

Hereinafter, a stereoscopic display apparatus according to a tenth embodiment of the disclosure will be described.

Figure 46:
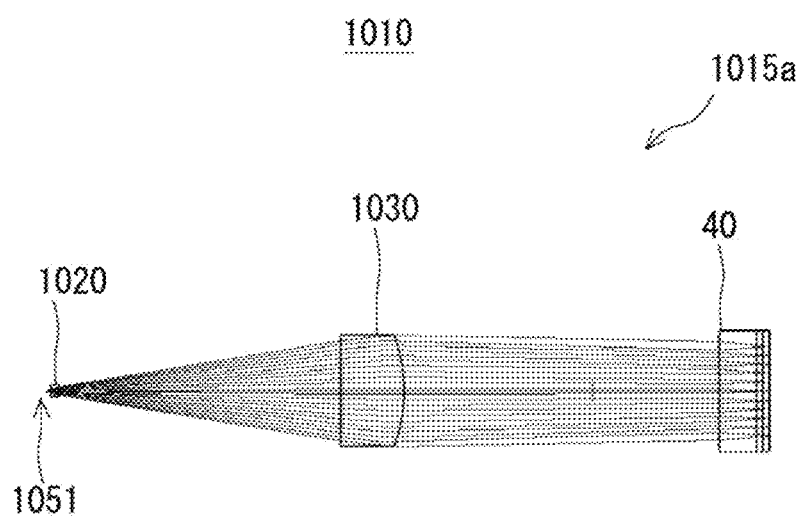
FIG. 46 is a cross-sectional view illustrating a light source controller in a stereoscopic display apparatus according to an embodiment of the disclosure.
Figure 47:
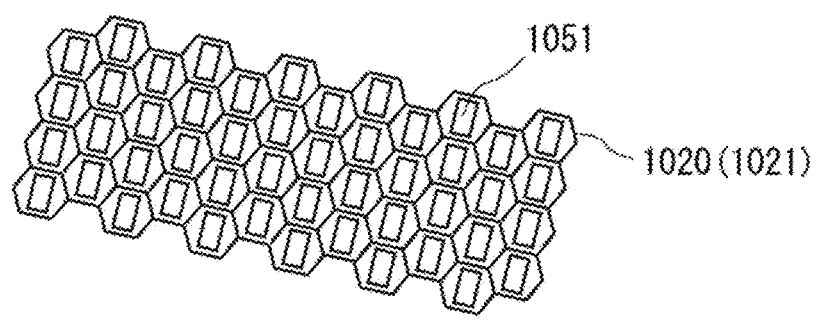
FIG. 47 is a plane view illustrating a honeycomb lens array as a third lens array in a stereoscopic display apparatus according to an embodiment of the disclosure.
Figure 48:
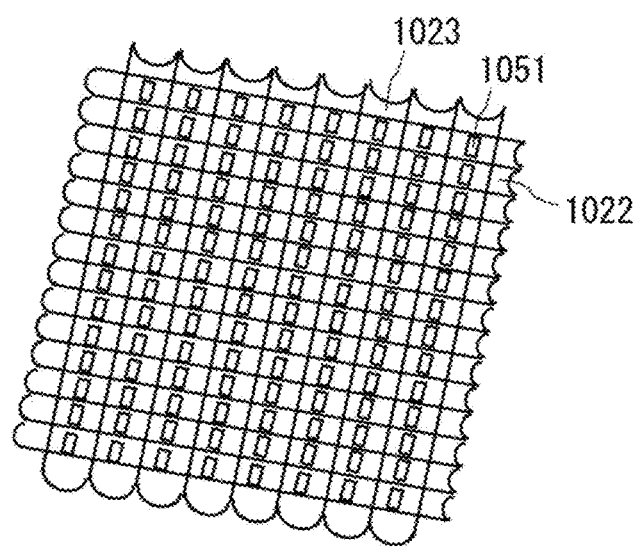
FIG. 48 illustrates two-layered lenticular sheets as a third lens array in a stereoscopic display apparatus according to an embodiment of the disclosure.
Figure 49:
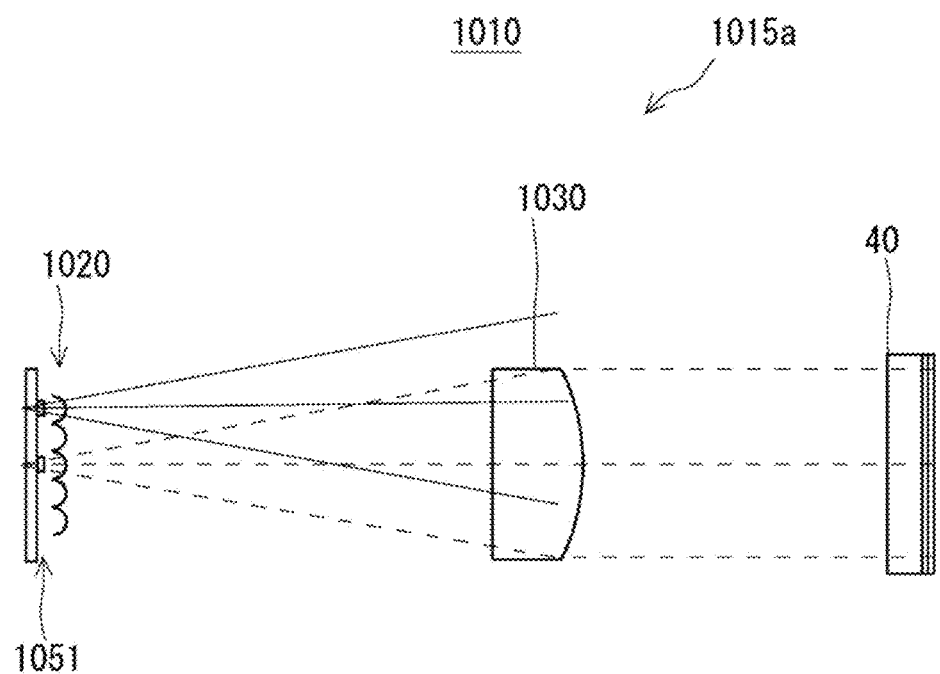
FIG. 49 is a cross-sectional view illustrating a light source controller in a stereoscopic display apparatus according to an embodiment of the disclosure.
Figure 50:
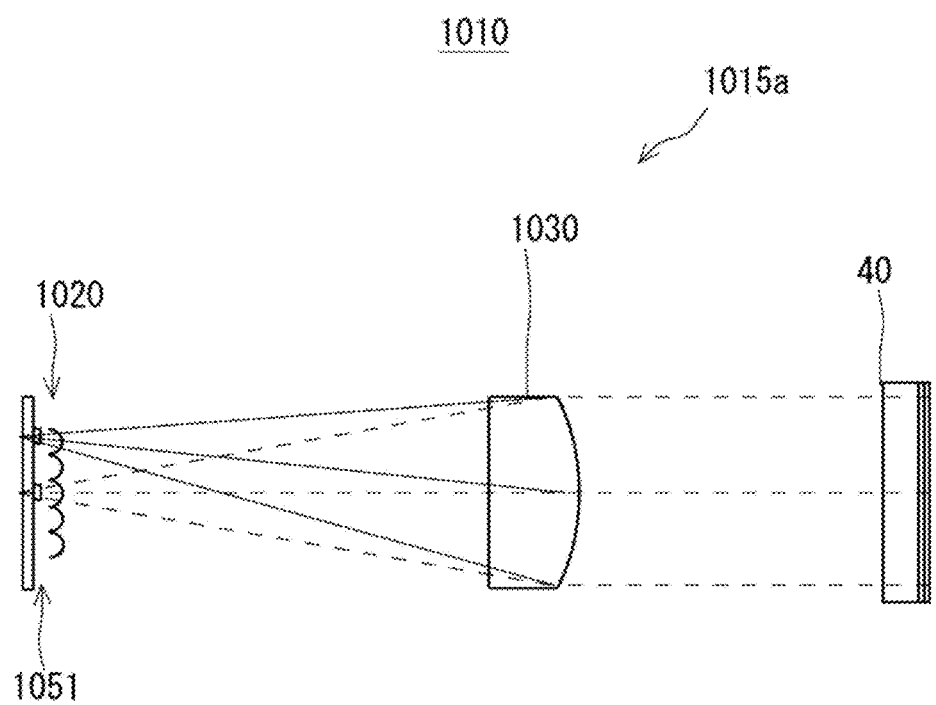
FIG. 50 is a cross-sectional view illustrating a light source controller in a stereoscopic display apparatus according to an embodiment of the disclosure.
Figure 51:
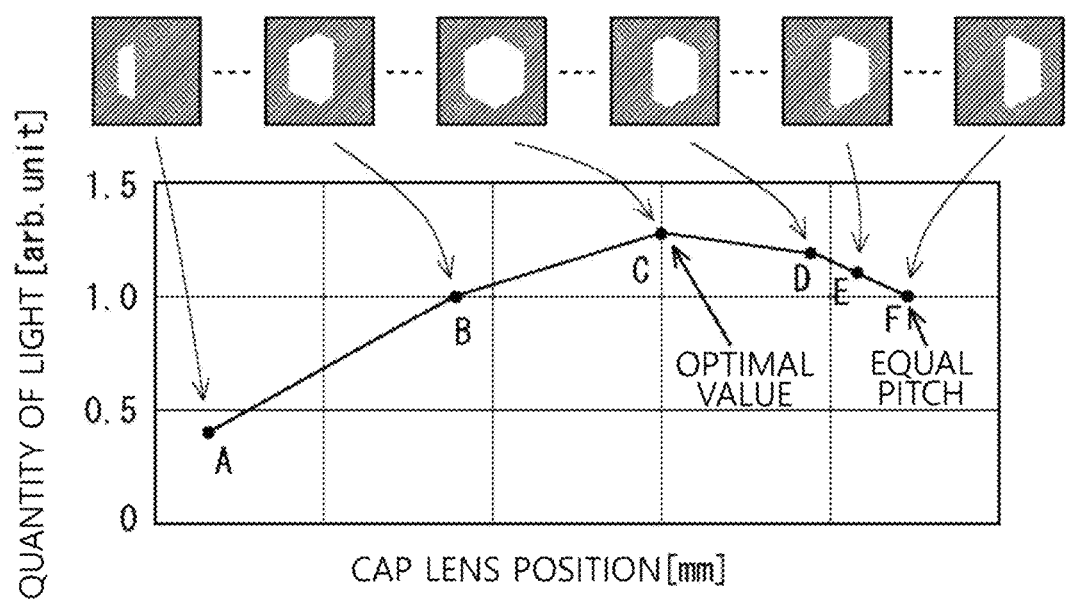
FIG. 51 is a graph illustrating a relationship between a cap lens position of a third lens array and a quantity of light in a stereoscopic display apparatus, wherein a horizontal axis represents cap lens position and a vertical axis represents quantity of light according to an embodiment of the disclosure.
Figure 52:
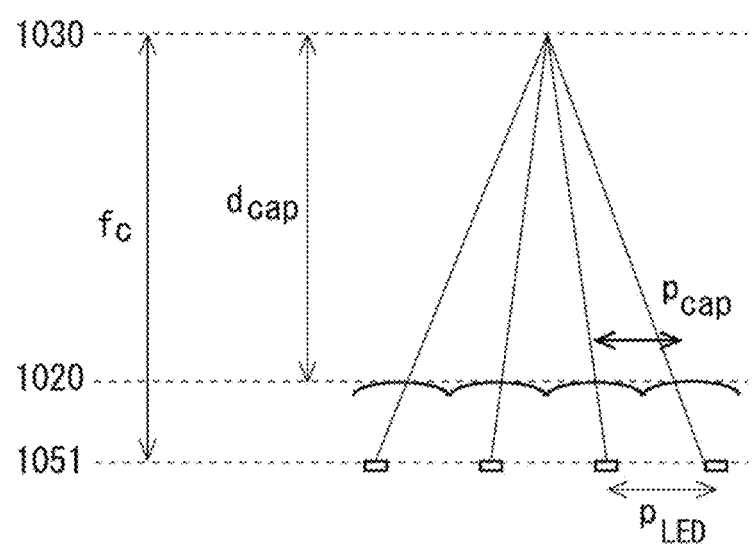
FIG. 52 illustrates a relationship between a distance between light sources and a cap lens in a stereoscopic display apparatus according to an embodiment of the disclosure.

FIG. 46 is a cross-sectional view illustrating a light source controller in a stereoscopic display apparatus according to an embodiment of the disclosure. FIG. 47 is a plane view illustrating a honeycomb lens array as a third lens array in a stereoscopic display apparatus according to an embodiment of the disclosure. FIG. 48 illustrates two-layered lenticular sheets as third lens array in a stereoscopic display apparatus according to an embodiment of the disclosure. FIGS. 49 and 50 are cross-sectional views illustrating a light source controller in a stereoscopic display apparatus according to various embodiments of the disclosure. FIG. 51 is a graph illustrating a relationship between a position of a cap lens of a third lens array and a quantity of light in a stereoscopic display apparatus according to an embodiment of the disclosure, wherein a horizontal axis represents a position of a cap lens and a vertical axis represents a quantity of light. FIG. 52 illustrates a relationship between a distance between light sources and a distance between cap lenses in a stereoscopic display apparatus according to an embodiment of the disclosure.

Referring to FIGS. 46 to 50, in the stereoscopic display apparatus 1010 according to the current embodiment of the disclosure, the light source controller 1015*a* may further include a third lens array positioned between the second lens array including the condensing lenses 1030 and the plurality of light sources 1051. The third lens array may include a plurality of cap lenses 1020 corresponding to the plurality of light sources 1051.

The cap lenses 1020 may be positioned around the light sources 1051. Each cap lens 1020 may be positioned to correspond to one light source 1051. The cap lenses 1020 may function to condense light diffused from the light sources 1051 at the condensing lenses 1030. Accordingly, a quantity of light that is obtained from the light sources 1051 may increase, resulting in an improvement of light efficiency.

Referring to FIG. 47, in the light source controller 1015*a*, the plurality of light sources 1051 may be arranged in a zigzag pattern in one direction. In addition, each cap lens 1020 may be a regular hexagon lens. The plurality of light sources 1051 may be arranged in the zigzag pattern in at least one of a column direction or a row direction crossing the column direction in the plane being parallel to the display 10, and in this case, the plurality of cap lenses 1020 may be components of the honeycomb lens array 1021.

Meanwhile, referring to FIG. 48, the plurality of light sources 1051 may be arranged in a matrix form in the column direction and in the row direction, and in this case, the plurality of cap lenses 1020 may be a double lenticular sheet obtained by overlapping a lenticular sheet 1022 including a plurality of cylinder lenses of which ridges extend in the column direction with a lenticular sheet 1023 including a plurality of cylinder lenses of which ridges extend in the row direction.

More specifically, in the light source controller 1051*a*, the third lens array may be a two-layered laminated cylindrical lens array, and include an upper cylinder lens array positioned on a rear surface of the second lens array and a lower cylinder lens array positioned on a rear surface of the upper cylinder lens array. The plurality of light sources 1051 may be arranged in a plurality of rows and a plurality of columns in a matrix form in the column direction and in the row direction crossing the column direction in the plane being parallel to the display 10. Ridges of cylinder lenses included in the upper cylinder lens array may extend in the column direction or the row direction. Ridges of cylinder lenses included in the lower cylinder lens array may extend in a direction between the column direction and the row direction, the direction being different from a direction in which the ridges of the cylinder lenses of the upper cylinder lens array extend.

In this case, the cap lenses 1020 may be portions at which the cylinder lenses included in the upper cylinder lens array overlap with the cylinder lenses included in the lower cylinder lens.

Referring to FIG. 49, a pitch at which the plurality of cap lenses 1020 are arranged may be equal to a pitch at which the plurality of light sources 1051 are arranged. In addition, referring to FIG. 50, a pitch at which the plurality of cap lenses 1020 are arranged may be shorter than a pitch at which the plurality of light sources 1051 are arranged. By shortening the pitch of the plurality of cap lenses 1020 compared to the pitch of the plurality of light sources 1051, as shown in FIG. 50, a quantity of light that is obtained from the light sources 1051 may increase, thereby improving light efficiency. A method for setting a pitch will be described below.

Referring to FIG. 51, as a result of changing a pitch of the cap lens 1020 by moving a position of the cap lens 1020, an illumination distribution biased to the left as in case A of the drawing may change to an illumination distribution in which the left expands as in case B of the drawing. In addition, an illumination distribution in case C of the drawing shows an optimum value, and a quantity of light shows a maximum value at an optimal pitch among pitches of the cap lens 1020, which is shorter than the pitch of the light source 1051.

As a result of further moving the position of the cap lens 1020 such that the pitch of the cap lens 1020 is close to the pitch of the light source 1051, an illumination distribution may be shifted to the right and a quantity of light may be reduced, as shown in case D to case F of the drawing. A pitch of the cap lens 1020 may be set at a position at which a maximum quantity of light is obtained.

Referring to FIG. 52, a pitch (interval) of the light sources 1051 in the light source controller 1015*a* is referred to as an interval PLED, and a distance between the second lens array including the condensing lenses 1030 and the columns of the plurality of light sources 1051 is referred to as fc. In addition, a distance between the third lens array including the cap lenses 1020 and the second lens array is referred to as a distance $d_{cap}$. In this case, a pitch (interval) $P_{cap}$ of the cap lenses 1020 of the third lens array may be obtained from Equation 13 below.

$$P_{cap}/d_{cap} = P_{LED}/f_c$$

$$P_{cap} = d_{cap} P_{LED}/f_c \quad (13) \text{ Equation 13}$$

According to the stereoscopic display apparatus 1010 of the current embodiment of the disclosure, because the third lens array including the plurality of cap lenses 1020 is included, a quantity of light obtained from the light sources 1051 may increase to improve light efficiency. In addition, by using the third lens array, the condensing lenses 1030 may be uniformly illuminated. By appropriately setting the pitch of the cap lenses 1020, light efficiency may be improved by further increasing a quantity of light obtained from the light sources 1051.

Eleventh Embodiment

Hereinafter, an eleventh embodiment of the disclosure will be described. The eleventh embodiment of the disclosure is a higher conceptualized example in which the second lens elements (second cylinder lenses) 31 and the regular hexagonal lenses 1031 are used as the condensing lenses 1030 in the second lens array.

Figure 53:
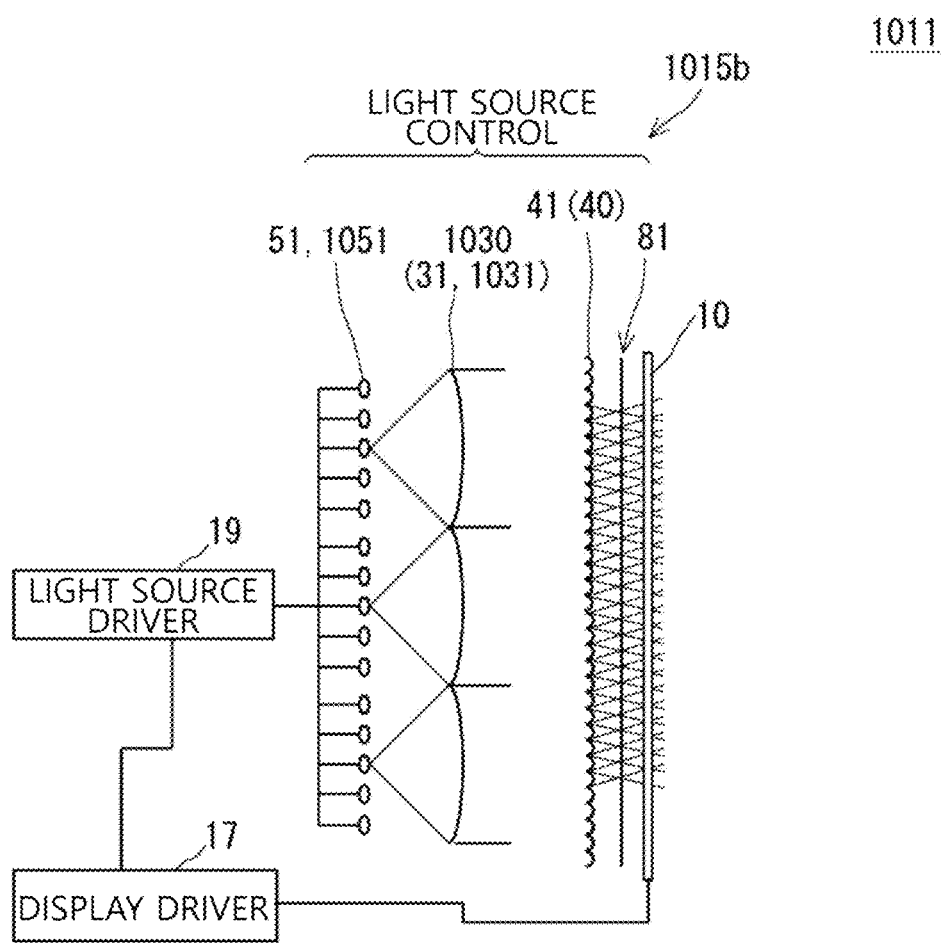
FIG. 53 is a configuration view illustrating a stereoscopic display apparatus according to an embodiment of the disclosure.

FIG. 53 is a configuration view illustrating a stereoscopic display apparatus according to an embodiment of the disclosure.

Referring to FIG. 53, a stereoscopic display apparatus 1011 may include the display 10, the display driver 17 for displaying elemental images of a stereoscopic image on the display 10, the light source controller 1015*b*, and the light source driver 19 for driving the plurality of light sources illuminating the elemental images, wherein the light source controller 1015 may include the lenticular sheet 40 including the plurality of first lens elements (first cylinder lenses) 41 arranged at a preset pitch, as a first lens array positioned on the rear surface of the display 10, a second lens array including the plurality of condensing lenses 1030 arranged at a pitch which is wider than that of the first cylinder lenses, as the second lens array positioned on the rear surface of the first lens array, the plurality of light sources 1051 respectively arranged on the rear surfaces of the condensing lenses 1030, and the diffusion sheet 81 positioned at a position including a focal distance of each first lens element (first cylinder lens) 41 between the display 10 and the first lens array.

Each condensing lens 1030 may be a second lens element (second cylinder lens) 31. In this case, the second lens array may include a plurality of second lens elements (second cylinder lenses) 31 arranged at a pitch that is wider than that of the first cylinder lenses.

In addition, each condensing lens 1030 may be a regular hexagonal lens 1031. In this case, the second lens array may include a plurality of regular hexagonal lenses 1031 arranged at a pitch that is wider than that of the first cylinder lenses.

According to the disclosure, there are provided a stereoscopic display apparatus and a stereoscopic display method for appropriately displaying a clearer three-dimensional image while securing depth.

So far, the embodiments of the disclosure have been described. However, the disclosure is not limited to the first to eleventh embodiments and the modified examples, and appropriate modifications within the scope of the purpose may be possible. For example, the components shown in the first to eleventh embodiments and the modified examples may be appropriately combined. In addition, when combined, the components may change within the scope of the purpose.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A stereoscopic display apparatus comprising:
   a display;
   a display driver configured to display an elemental image of a stereoscopic image on the display;
   a light source controller comprising:
      a first lens array positioned on a rear surface of the display and including a plurality of first cylinder lenses arranged at a preset pitch,
      a second lens array positioned on a rear surface of the first lens array and including a plurality of condensing lenses arranged at a pitch that is wider than the preset pitch of the plurality of first cylinder lenses,
      a plurality of light sources positioned on shielding walls disposed on a rear surface of each condensing lens of the plurality of condensing lenses, each of the plurality of light sources of each condensing lens being positioned on a concentric circle spaced by a focal distance of a corresponding condensing lens, and
      a diffusion sheet positioned between the display and the first lens array at a position including a focal point of each first cylinder lens of the plurality of first cylinder lenses; and
   a light source driver configured to drive the plurality of light sources illuminating the elemental image.

2. The stereoscopic display apparatus of claim 1,
   wherein the plurality of condensing lenses are a plurality of second cylinder lenses, and
   wherein the second lens array includes the plurality of second cylinder lenses arranged at a pitch that is wider than the preset pitch of the plurality of first cylinder lenses.

3. The stereoscopic display apparatus of claim 2,
   wherein the display driver is further configured to:
      display a plurality of elemental images representing a display location of the stereoscopic image, and display the plurality of elemental images including a first elemental image and a second elemental image on the display while switching the plurality of elemental images, and wherein the light source driver is further configured to:
sequentially drive the plurality of light sources illuminating respective elemental images, and
sequentially drive the plurality of light sources including a first light source illuminating the first elemental image and a second light source illuminating the second elemental image.

4. The stereoscopic display apparatus of claim 3,
wherein the display driver is further configured to display the plurality of elemental images by switching the plurality of elemental images through field division, and
wherein the light source driver is further configured to turn on a light source corresponding to an elemental image after switching according to field switching.

5. The stereoscopic display apparatus of claim 2, wherein points at which light from the plurality of light sources is condensed on the diffusion sheet deviate from each other.

6. The stereoscopic display apparatus of claim 5, wherein a ratio of a distance between the second lens array and columns of a plurality of light sources with respect to a width between light sources at both ends of the plurality of light sources arranged in one direction in a plane being parallel to the display is identical to a ratio of a distance between the diffusion sheet and the first lens array with respect to a width between light converging points at both ends of light converging points of the plurality of light sources on the diffusion sheet.

7. The stereoscopic display apparatus of claim 2, wherein the light source controller further comprises;
a shielding plate positioned on a surface of each first cylinder lens and configured to block light passing through an edge portion of each first cylinder lens, the shielding plate including a slit configured to transmit light passing through a center portion of each first cylinder lens.

8. The stereoscopic display apparatus of claim 2, wherein, in the second lens array, the plurality of second cylinder lenses are arranged in a zigzag pattern in a vertical direction and a horizontal direction of a pixel arrangement of the display.

9. The stereoscopic display apparatus of claim 2, wherein, while the light source driver sequentially drives the plurality of light sources arranged in one direction in a plane being parallel to the display, the light source driver is further configured to drive a light source and then drive another light source located at a position spaced by at least one light source from the driven light source.

10. The stereoscopic display apparatus of claim 2, wherein, in a case in which a width between light sources at both ends of the plurality of light sources arranged in one direction in a plane being parallel to the display is one pitch, the light source driver is further configured to drive a light source and then drive another light source located at a position spaced by at least half a pitch from the driven light source.

11. The stereoscopic display apparatus of claim 2, further comprising:
a holographic optical element in which functions of the first cylinder lenses and the second cylinder lenses are recorded to be reproduced by the plurality of light sources, wherein the holographic optical element is positioned between the plurality of light sources and the display, instead of the first cylinder lenses and the second cylinder lenses.

12. The stereoscopic display apparatus of claim 1,
wherein each of the plurality of condensing lenses is a regular hexagonal lens,
wherein the second lens array includes a plurality of regular hexagonal lenses arranged at a pitch that is wider than a pitch of the first cylinder lenses, and
wherein the plurality of regular hexagonal lenses are arranged in a zigzag pattern in a pixel arrangement direction of the display.

13. The stereoscopic display apparatus of claim 12,
wherein, in a case in which N light sources exist in a width between light sources at both ends of a plurality of light sources arranged in one direction in a plane being parallel to the display, the light source driver is further configured to drive a light source and then drive another light source located at a position shifted by a shift amount M from the driven light source, and
wherein N is an integer incapable of being divided by M, M is a negative integer of (N−M) in a case in which M is greater than or equal to N/2, and an absolute value of M is a maximum value of N/2 or less.

14. The stereoscopic display apparatus of claim 12,
wherein the plurality of light sources are arranged in a plurality of rows and a plurality of columns in a matrix form in a column direction and a row direction crossing the column direction in a plane being parallel to the display,
wherein a plurality of light sources arranged in a same column are driven to be turned on simultaneously, and
wherein ridges of the plurality of first cylinder lenses of the first lens array extend in the column direction.

15. The stereoscopic display apparatus of claim 12,
wherein a ratio of a distance between the second lens array and columns of the plurality of light sources with respect to a width between plurality of light sources at both ends in row direction of the plurality of light sources arranged in a matrix form in the column direction and in the row direction crossing the column direction in a plane being parallel to the display is equal to a ratio of a distance between the diffusion sheet and the first lens array with respect to a width between light converging points at both ends of light converging points of the plurality of light sources on the diffusion sheet, and
wherein the width between the light converging points is two times or less of a sub pixel width of the display.

16. A method performed by a stereoscopic display apparatus, the method comprising:
displaying, by a display driver of the stereoscopic display apparatus on a display of the stereoscopic display apparatus, an elemental image of a stereoscopic image,
wherein a light source controller of the stereoscopic display apparatus comprises:
a first lens array positioned on a rear surface of the display and including a plurality of first cylinder lenses arranged at a preset pitch;
a second lens array positioned on a rear surface of the first lens array and including a plurality of condensing lenses arranged at a pitch that is wider than the preset pitch of the plurality of first cylinder lenses;
a plurality of light sources positioned on shielding walls disposed on a rear surface of each condensing lens of the plurality of condensing lenses, each of the plurality of light sources of each condensing lens being positioned on a concentric circle spaced by a focal distance of a corresponding condensing lens, and a diffusion sheet positioned between the display and the first lens array at a position including a focal point of each first cylinder lens of the plurality of first cylinder lenses; and driving, by a light source driver of the stereoscopic display apparatus, the plurality of light sources illuminating the elemental image.

17. The method of claim 16, wherein the driving of the light sources comprises:

displaying, by the stereoscopic display apparatus on the display, a plurality of elemental images; and sequentially driving, by the light source driver of the stereoscopic display apparatus, the plurality of light sources.

18. The method of claim 16, wherein the plurality of condensing lenses are a plurality of second cylinder lenses, and wherein the second lens array includes the plurality of second cylinder lenses arranged at a pitch that is wider than the preset pitch of the plurality of first cylinder lenses.

19. The method of claim 17, further comprising:

displaying, by the stereoscopic display apparatus, a plurality of elemental images representing a display location of the stereoscopic image;

displaying, by the stereoscopic display apparatus, the plurality of elemental images including a first elemental image and a second elemental image on the display while switching the plurality of elemental images;

sequentially driving, by the light source driver of the stereoscopic display apparatus, the plurality of light sources illuminating respective elemental images; and sequentially driving, by the light source driver of the stereoscopic display apparatus, the plurality of light sources including a first light source illuminating the first elemental image and a second light source illuminating the second elemental image.

20. One or more non-transitory computer-readable storage media storing computer-executable instructions that, when executed by one or more processors of a stereoscopic display apparatus individually or collectively, cause the stereoscopic display apparatus to preform operations, the operations comprising:

displaying, by a display driver of the stereoscopic display apparatus on a display of the stereoscopic display apparatus, an elemental image of a stereoscopic image, wherein a light source controller of the stereoscopic display apparatus comprises:

a first lens array is positioned on a rear surface of the display and including a plurality of first cylinder lenses arranged at a preset pitch, a second lens array positioned on a rear surface of the first lens array and including a plurality of condensing lenses arranged at a pitch that is wider than the preset pitch of the plurality of first cylinder lenses;

a plurality of light sources positioned on shielding walls disposed on a rear surface of each condensing lens of the plurality of condensing lenses, each of the plurality of light sources of each condensing lens being positioned on a concentric circle spaced by a focal distance of a corresponding condensing lens, and a diffusion sheet positioned between the display and the first lens array at a position including a focal point of each first cylinder lens; and driving, by a light source driver of the stereoscopic display apparatus, the plurality of light sources illuminating the elemental image.

* * * * *